Figure 1:
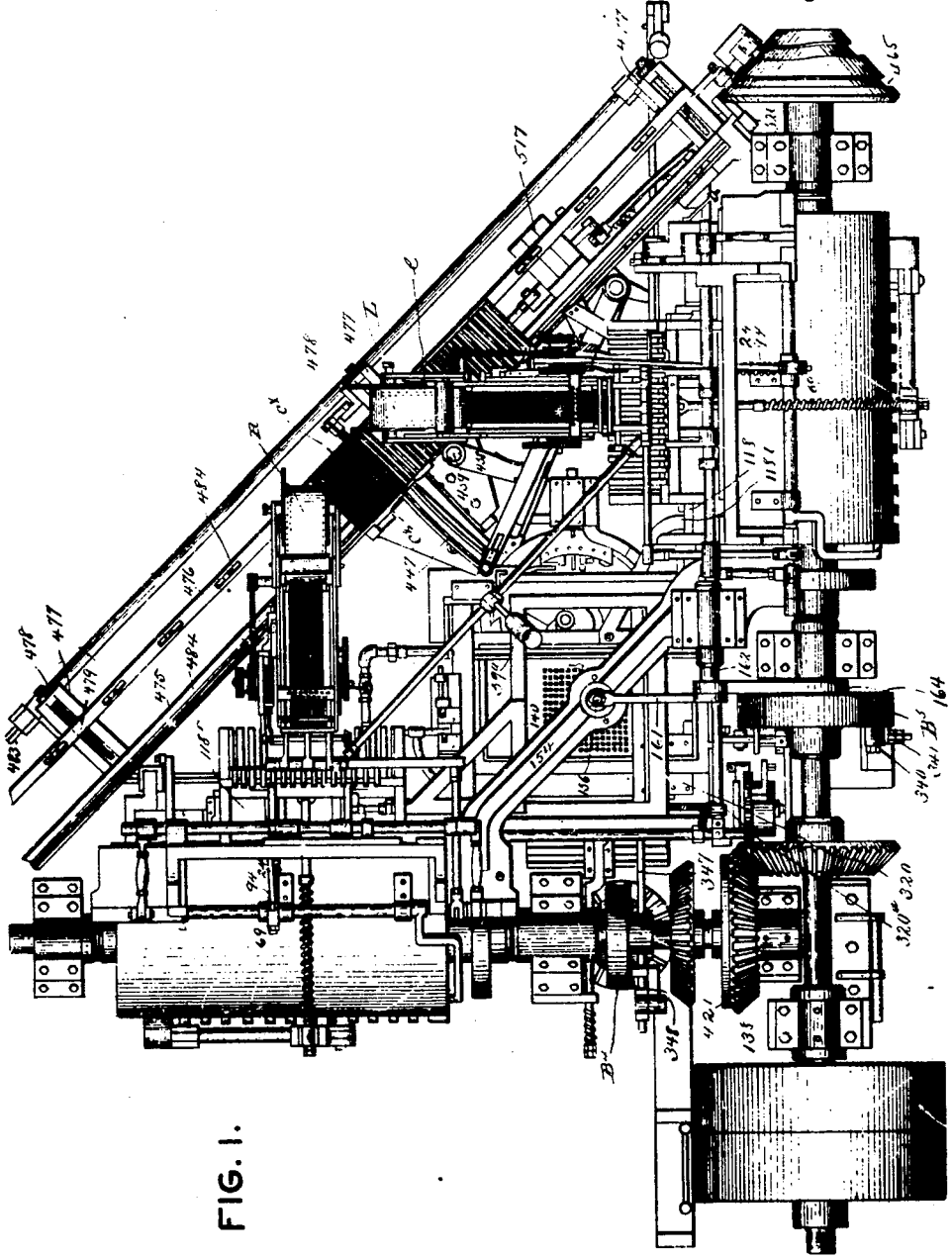

(No Model.)

T. LANSTON.
MACHINE FOR MAKING JUSTIFIED LINES OF TYPE.

No. 557,994. Patented Apr. 7, 1896.

WITNESSES.
J. Henry Kaiser
E. D. Smith

INVENTOR
Tolbert Lanston
By Church & Church (No Model.) 76 Sheets—Sheet 2.
T. LANSTON.
MACHINE FOR MAKING JUSTIFIED LINES OF TYPE.

No. 557,994. Patented Apr. 7, 1896.

Witnesses
F. L. Durand
E. D. Smith

Inventor
Tolbert Lanston
By his Attorneys
Church & Church (No Model.) 76 Sheets—Sheet 5.
T. LANSTON.
MACHINE FOR MAKING JUSTIFIED LINES OF TYPE.
No. 557,994. Patented Apr. 7, 1896.

Witnesses
Franck L. Durand
E. D. Smith

Inventor
Tolbert Lanston
By his Attorneys
Church & Church (No Model.)　　　　　　　T. LANSTON.　　　　76 Sheets—Sheet 6.
MACHINE FOR MAKING JUSTIFIED LINES OF TYPE.

No. 557,994.　　　　　　　　　　　　　Patented Apr. 7, 1896.

(No Model.) T. LANSTON. 76 Sheets—Sheet 8.
MACHINE FOR MAKING JUSTIFIED LINES OF TYPE.
No. 557,994. Patented Apr. 7, 1896.

(No Model.) T. LANSTON. 76 Sheets—Sheet 11.
MACHINE FOR MAKING JUSTIFIED LINES OF TYPE.
No. 557,994. Patented Apr. 7, 1896.

(No Model.)  76 Sheets—Sheet 12.
T. LANSTON.
MACHINE FOR MAKING JUSTIFIED LINES OF TYPE.

No. 557,994.  Patented Apr. 7, 1896.

WITNESSES  INVENTOR
Tolbert Lanston
His Attorneys

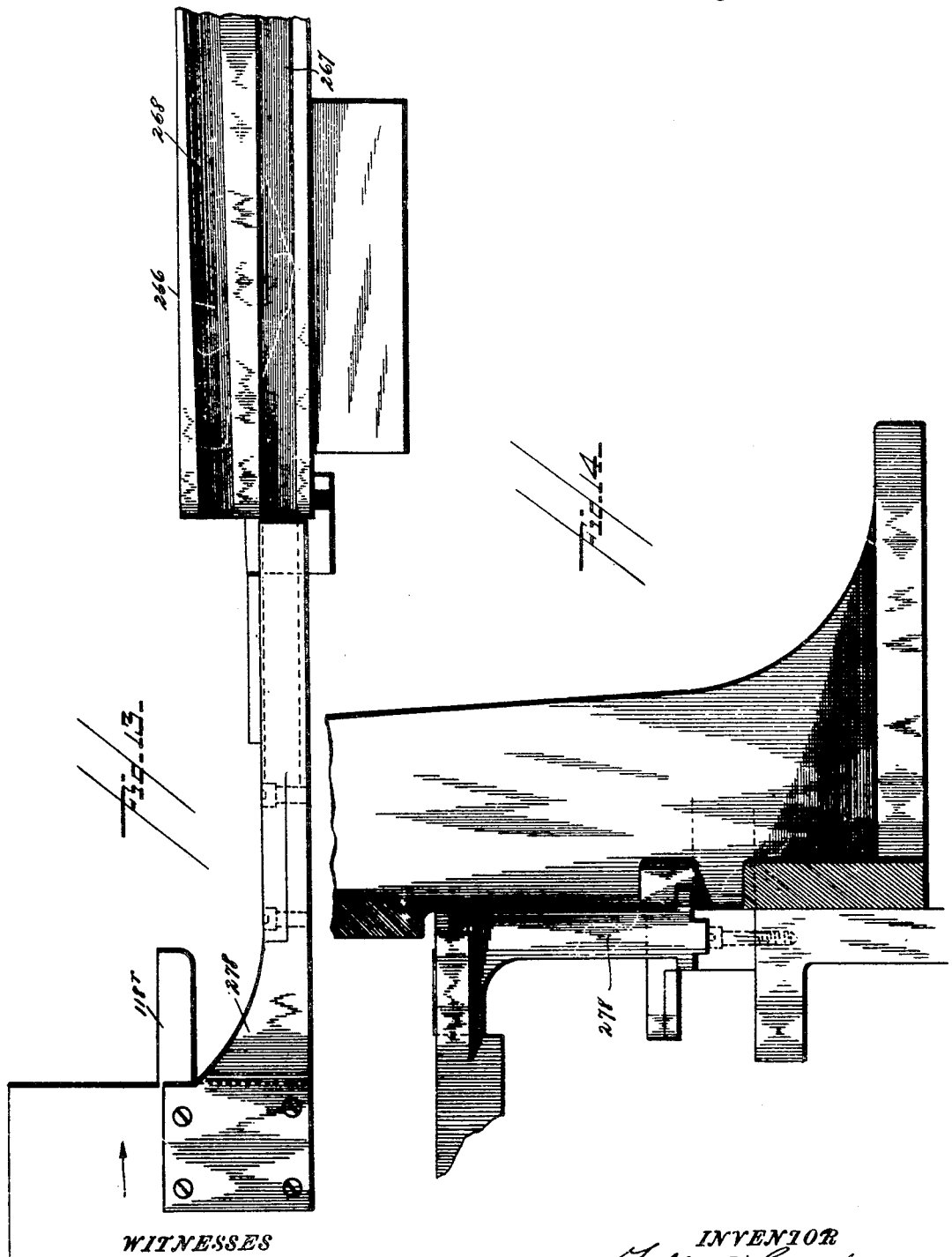

(No Model.)
76 Sheets—Sheet 14.

T. LANSTON.
MACHINE FOR MAKING JUSTIFIED LINES OF TYPE.

No. 557,994.
Patented Apr. 7, 1896.

WITNESSES.
J. Henry Kaiser
O. D. Smith

INVENTOR.
Tolbert Lanston
By
Church & Church
his Attys (No Model.)

T. LANSTON.
MACHINE FOR MAKING JUSTIFIED LINES OF TYPE.

No. 557,994. Patented Apr. 7, 1896.

(No Model.) 76 Sheets—Sheet 16.

T. LANSTON.
MACHINE FOR MAKING JUSTIFIED LINES OF TYPE.

No. 557,994. Patented Apr. 7, 1896.

Witnesses
Frank L. Ourand
E. D. Smith

Inventor
Tolbert Lanston
By his Attorneys
Church & Church

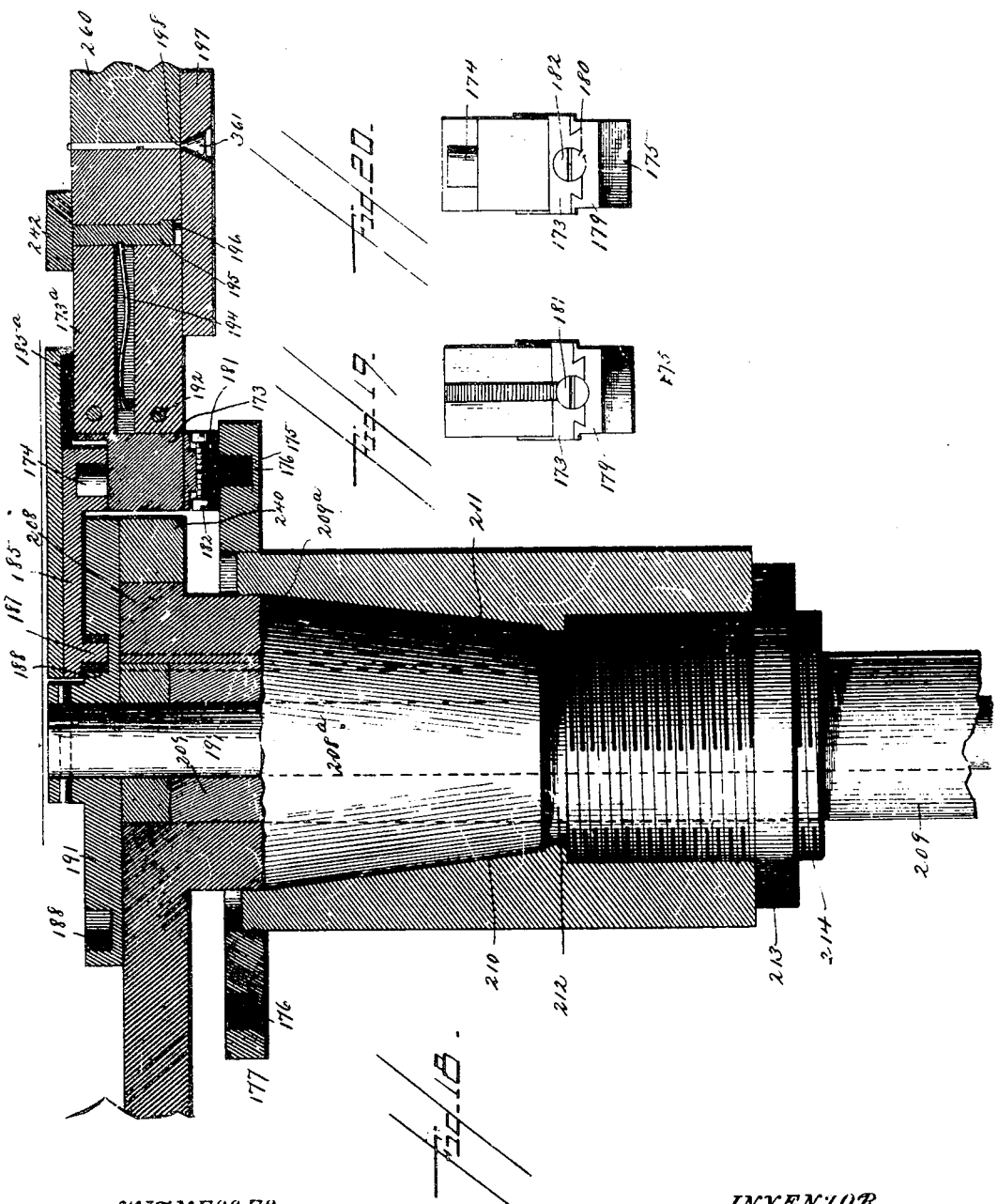

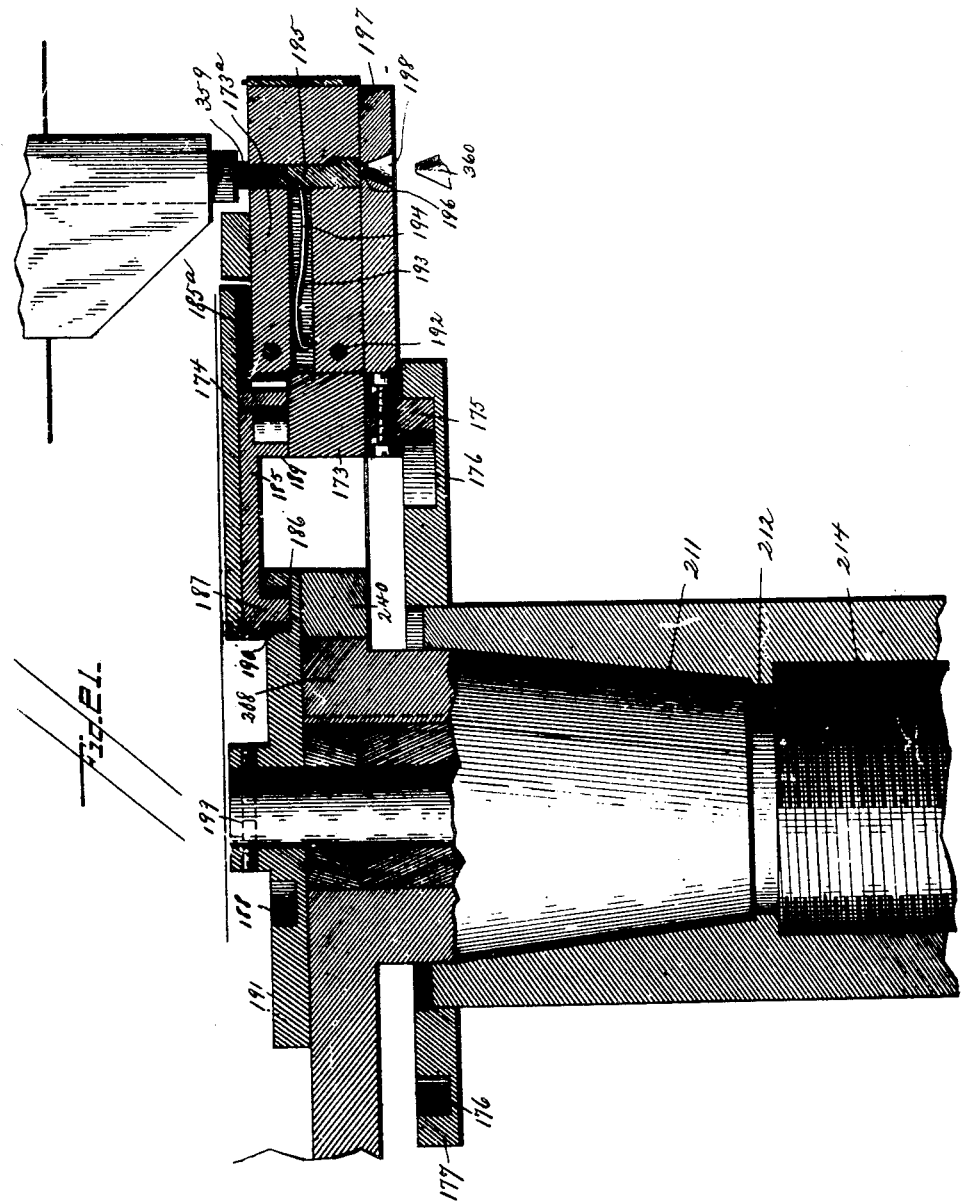

(No Model.)  76 Sheets—Sheet 20.
T. LANSTON.
MACHINE FOR MAKING JUSTIFIED LINES OF TYPE.
No. 557,994.  Patented Apr. 7, 1896.
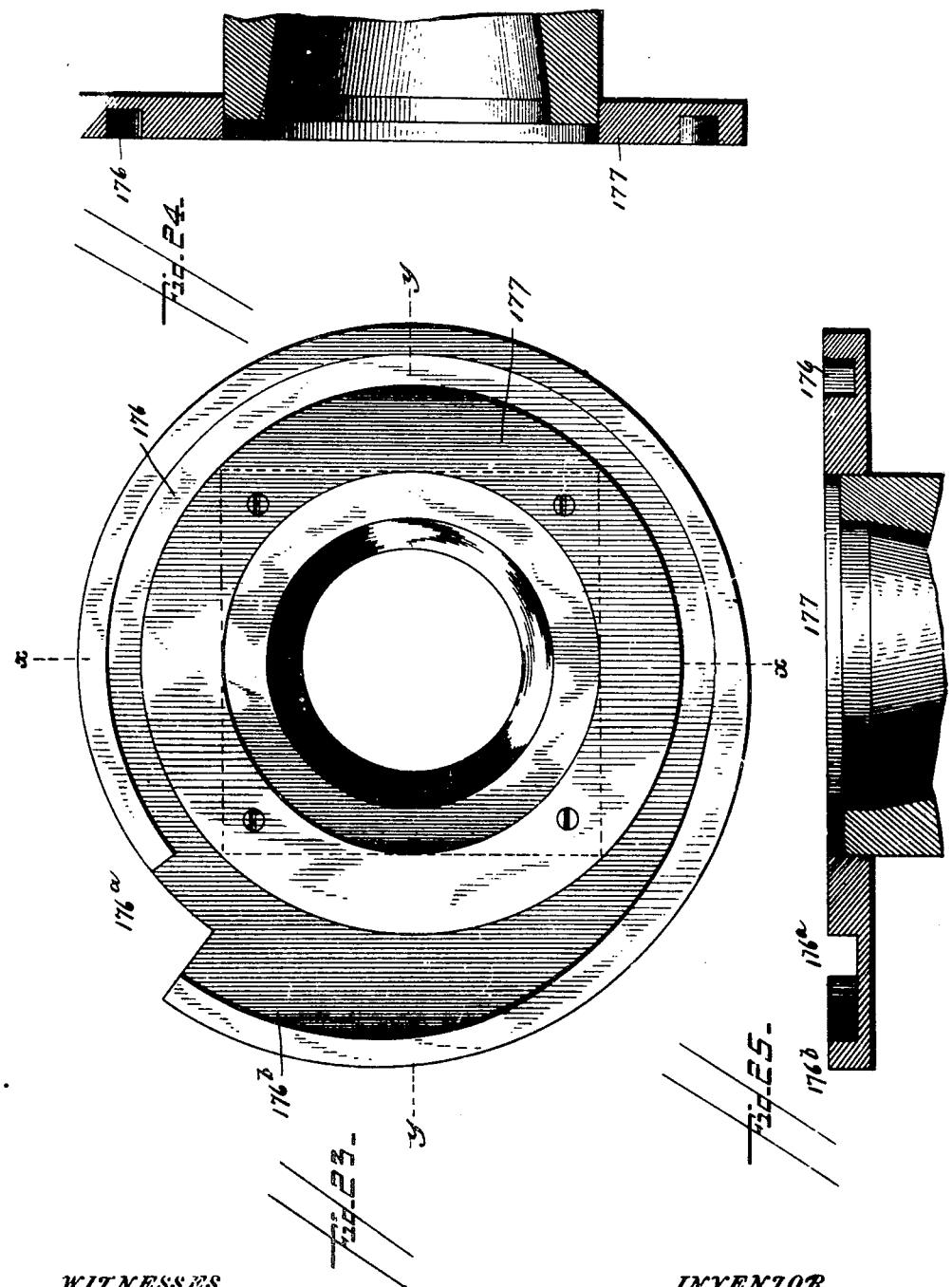
WITNESSES
Franck L. Durand.
E. D. Smith
INVENTOR
Tolbert Lanston
By Church & Church
his Attorneys (No Model.)
76 Sheets—Sheet 21.
T. LANSTON.
MACHINE FOR MAKING JUSTIFIED LINES OF TYPE.
No. 557,994. Patented Apr. 7, 1896.
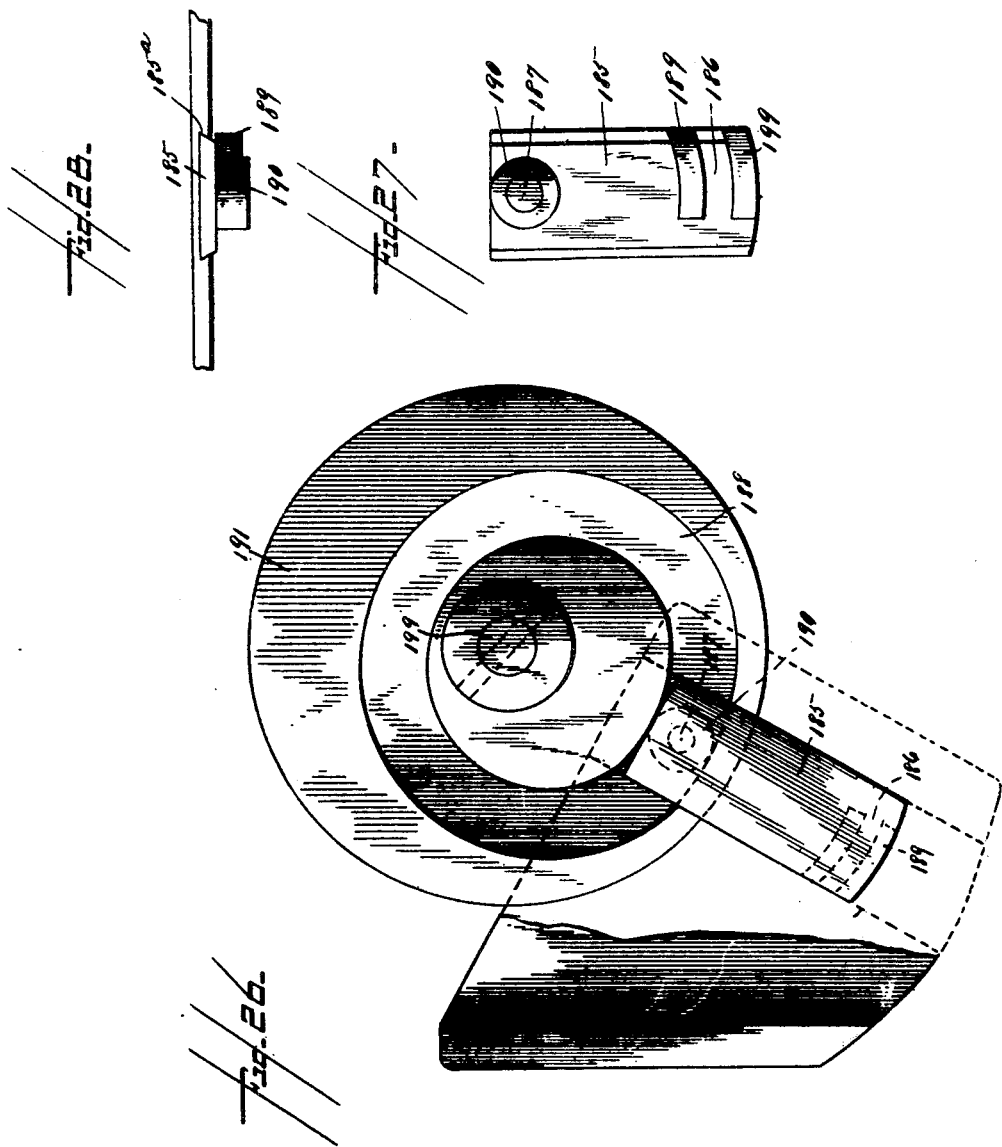
WITNESSES
INVENTOR
Tolbert Lanston
By Church & Church
his Attorneys

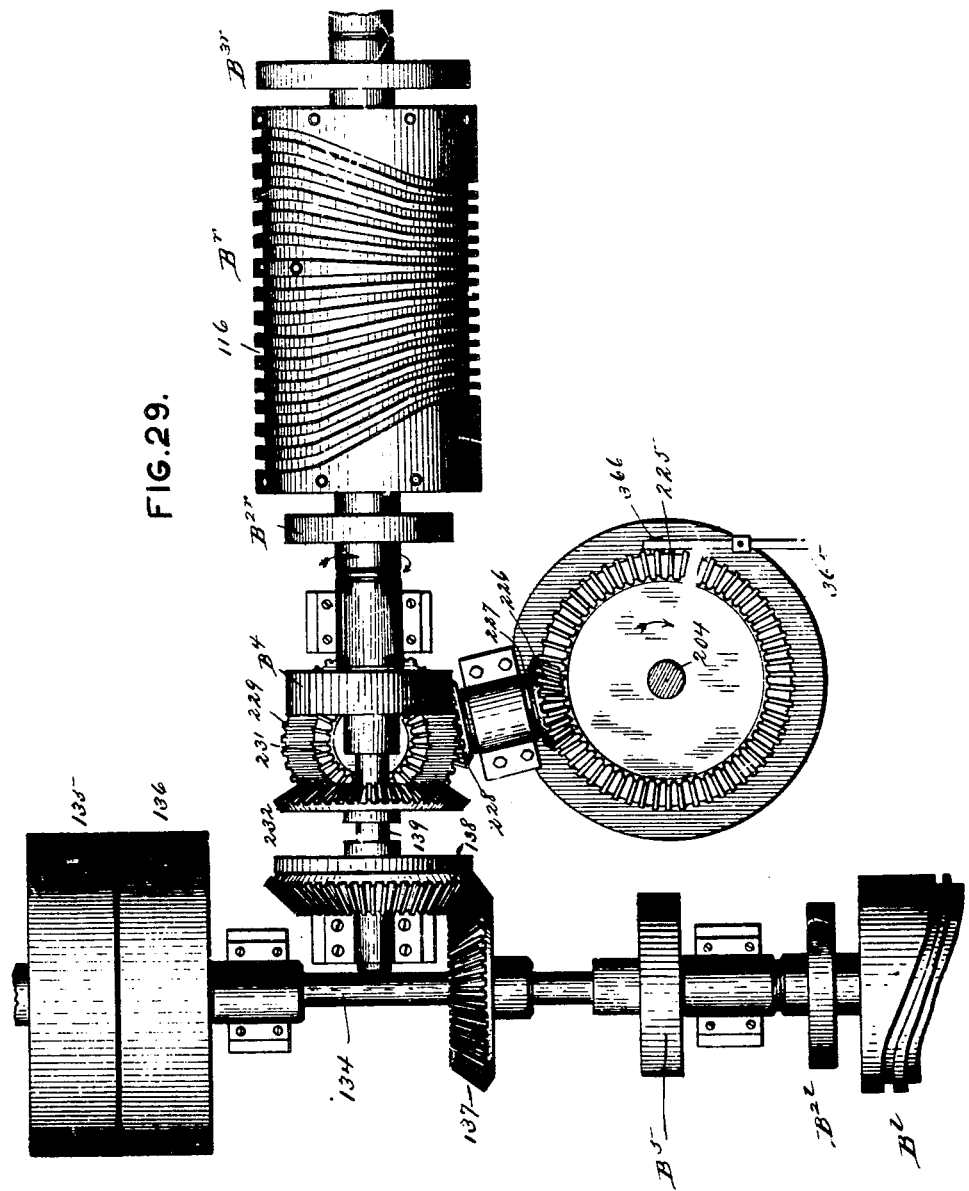

(No Model.) 76 Sheets—Sheet 23.
T. LANSTON.
MACHINE FOR MAKING JUSTIFIED LINES OF TYPE.

No. 557,994. Patented Apr. 7, 1896.

Witnesses Inventor
Tolbert Lanston
By Church & Church
his Attorneys (No Model.) 76 Sheets—Sheet 24.
T. LANSTON.
MACHINE FOR MAKING JUSTIFIED LINES OF TYPE.
No. 557,994. Patented Apr. 7, 1896.

Witnesses
Franck L. Ourand
E. D. Smith

Inventor
Tolbert Lanston
By his Attorneys
Church & Church

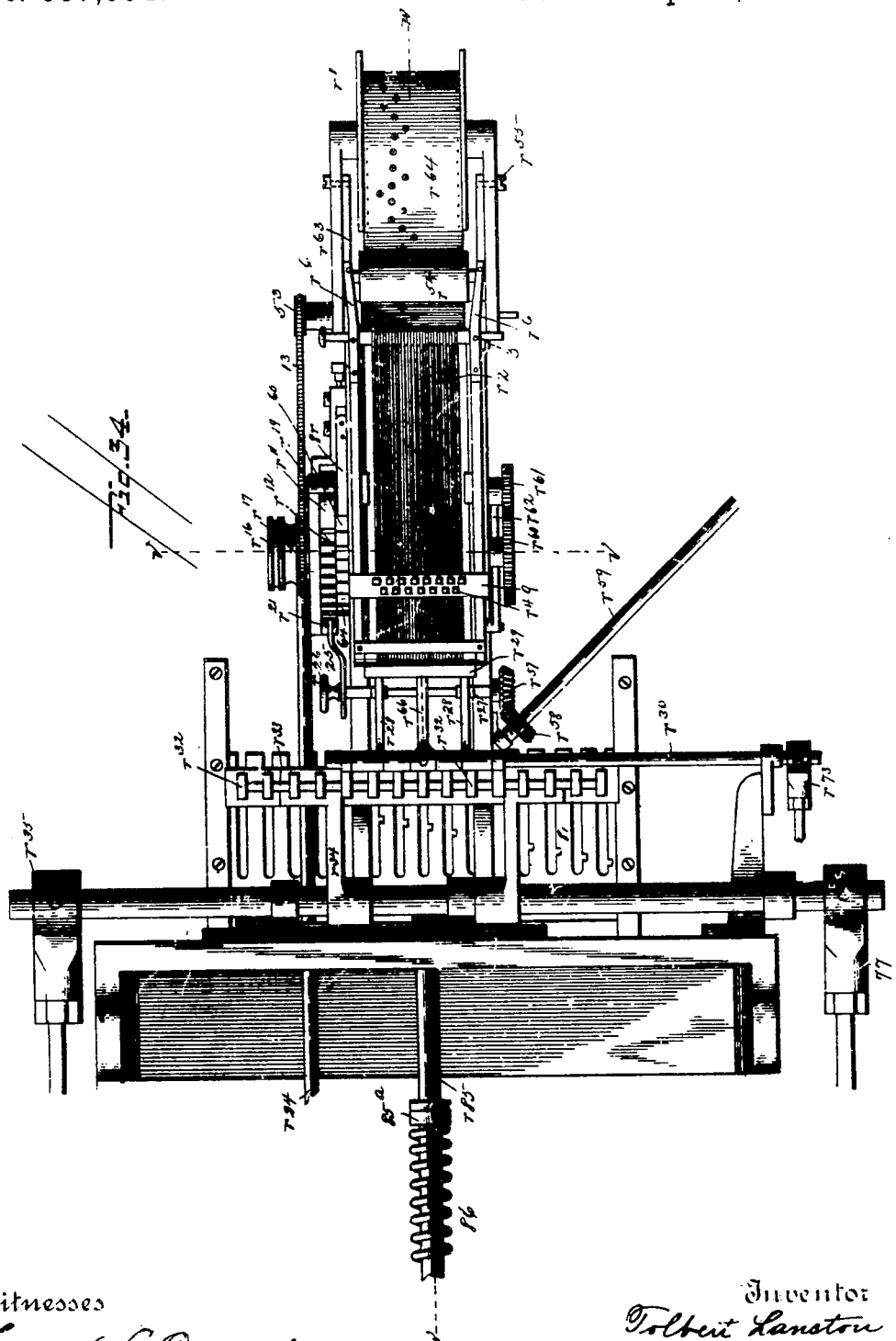

(No Model.) 76 Sheets—Sheet 26.
T. LANSTON.
MACHINE FOR MAKING JUSTIFIED LINES OF TYPE.
No. 557,994. Patented Apr. 7, 1896.
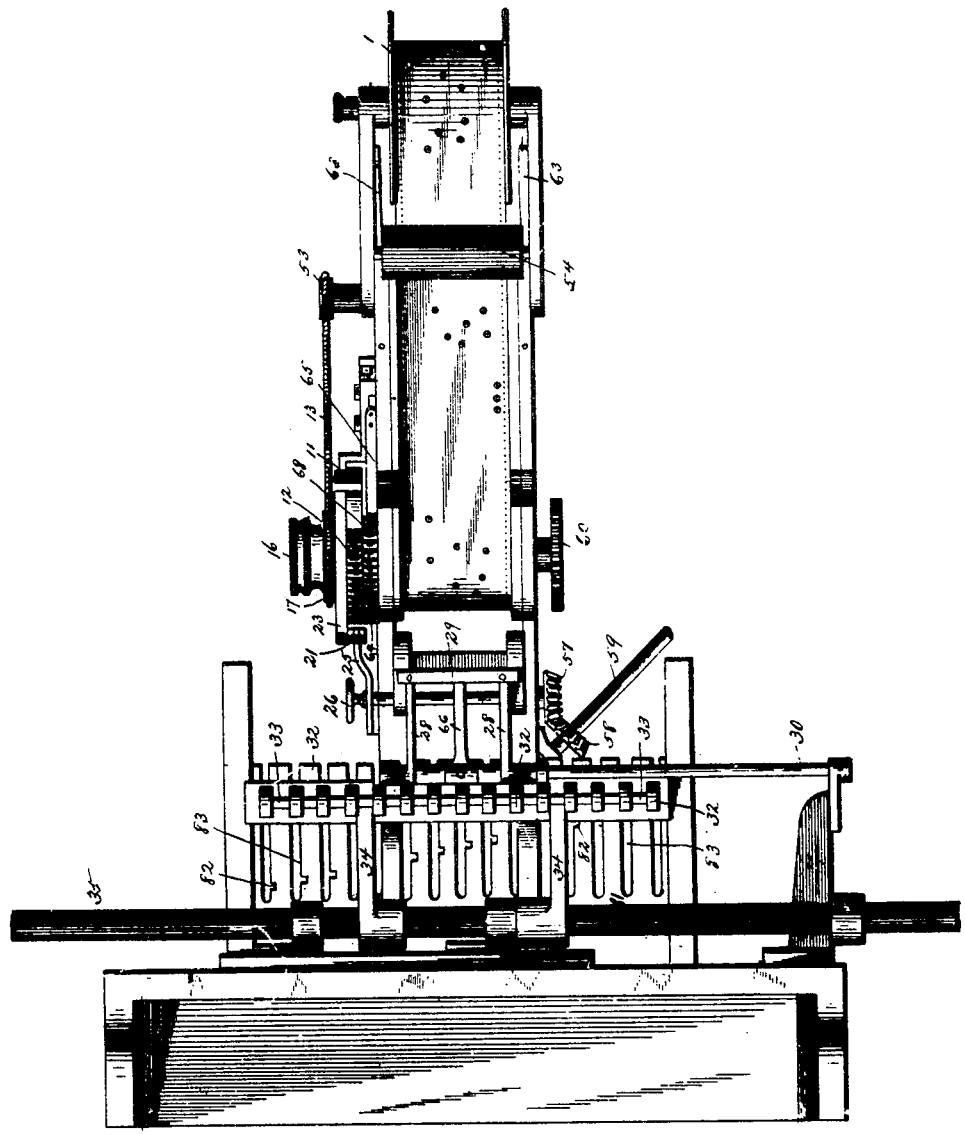
Witnesses
Franck L. Durand
E. D. Smith
Inventor
Tolbert Lanston
By Church & Church
his Attorneys (No Model.)  76 Sheets—Sheet 27.
T. LANSTON.
MACHINE FOR MAKING JUSTIFIED LINES OF TYPE.
No. 557,994.  Patented Apr. 7, 1896.
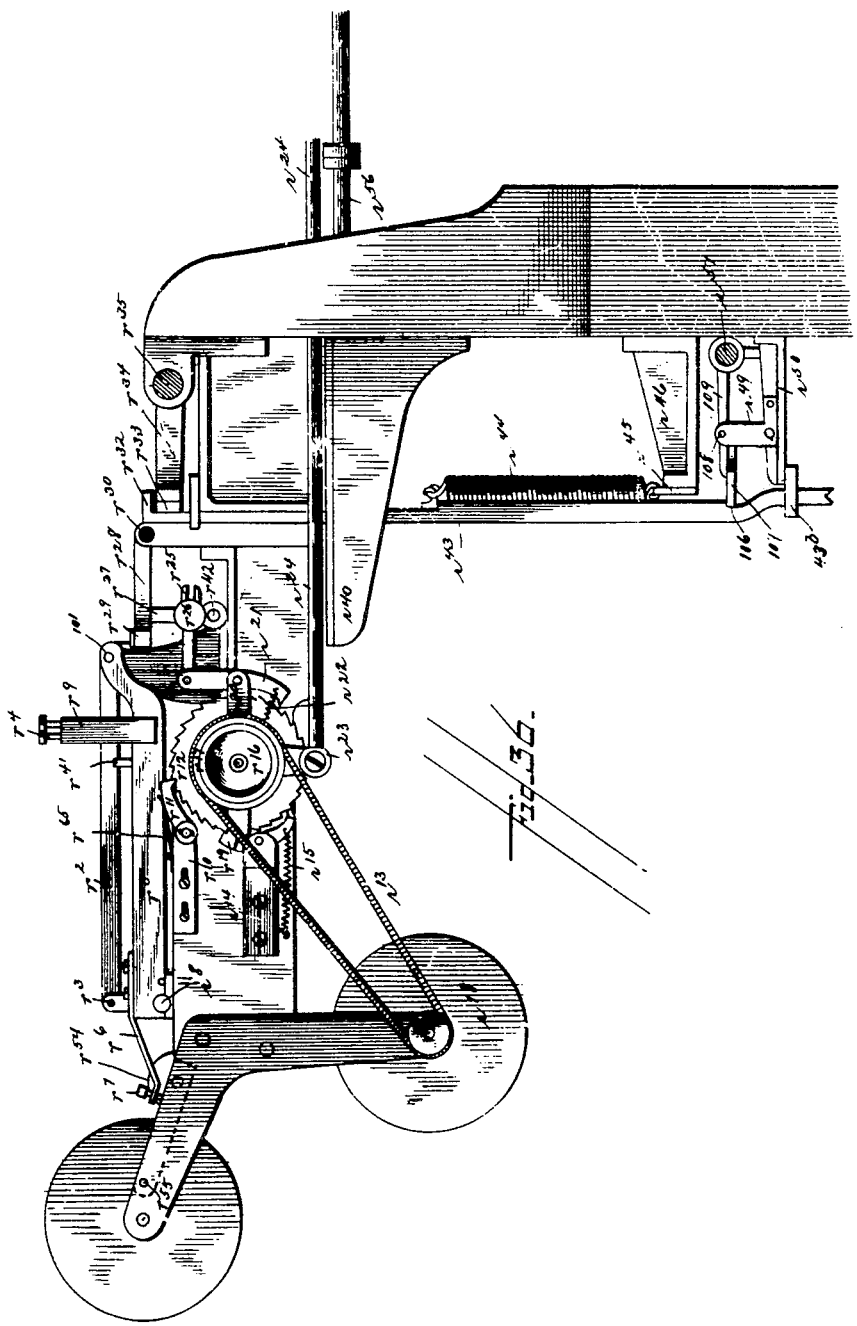
Witnesses
Franck L. Quand
E. D. Smith
Inventor
Tolbert Lanston
By his Attorneys
Church & Church

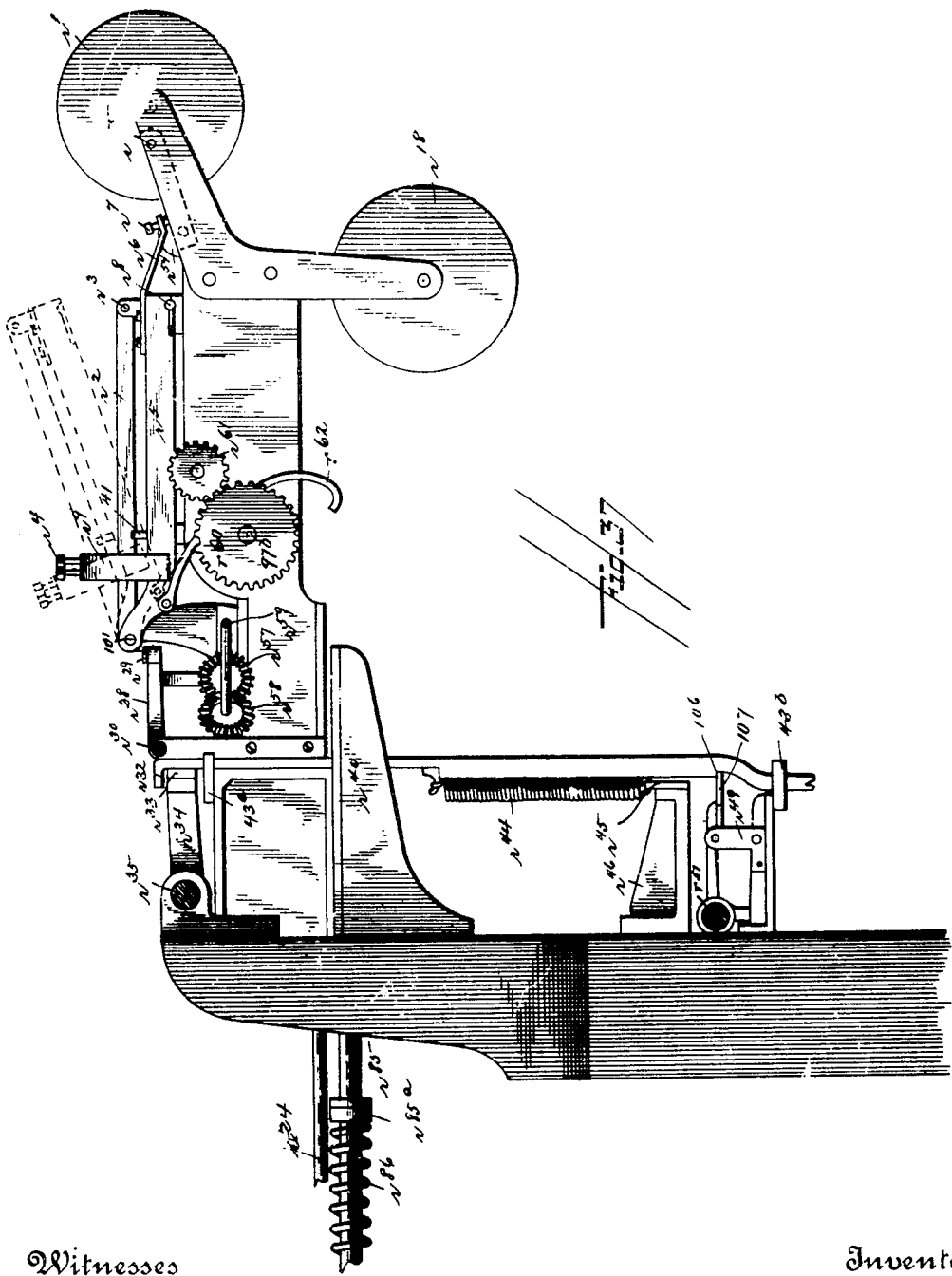

(No Model.)
T. LANSTON.
MACHINE FOR MAKING JUSTIFIED LINES OF TYPE.
No. 557,994. Patented Apr. 7, 1896.
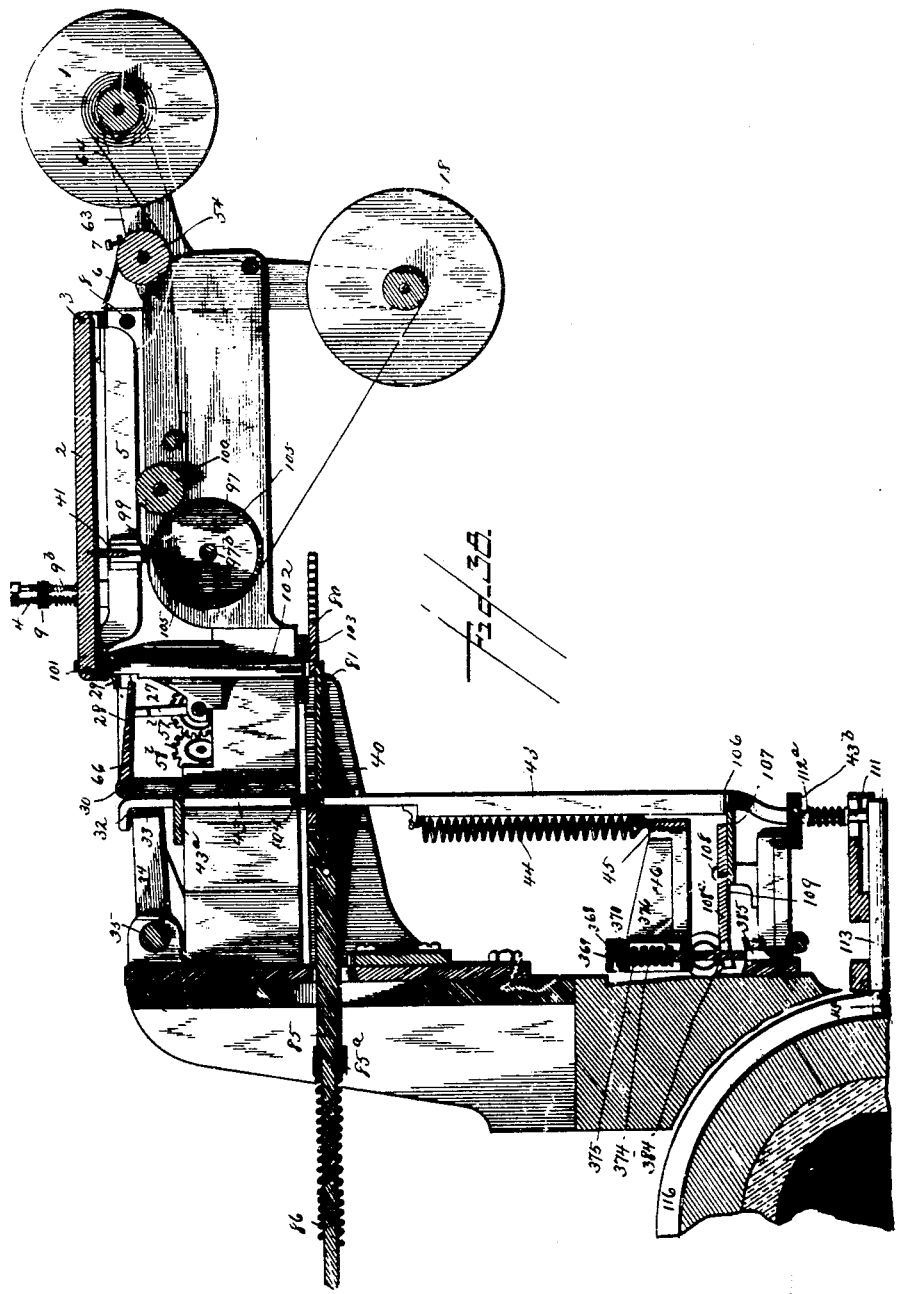

(No Model.)
76 Sheets—Sheet 30
T. LANSTON.
MACHINE FOR MAKING JUSTIFIED LINES OF TYPE.
No. 557,994.
Patented Apr. 7, 1896.
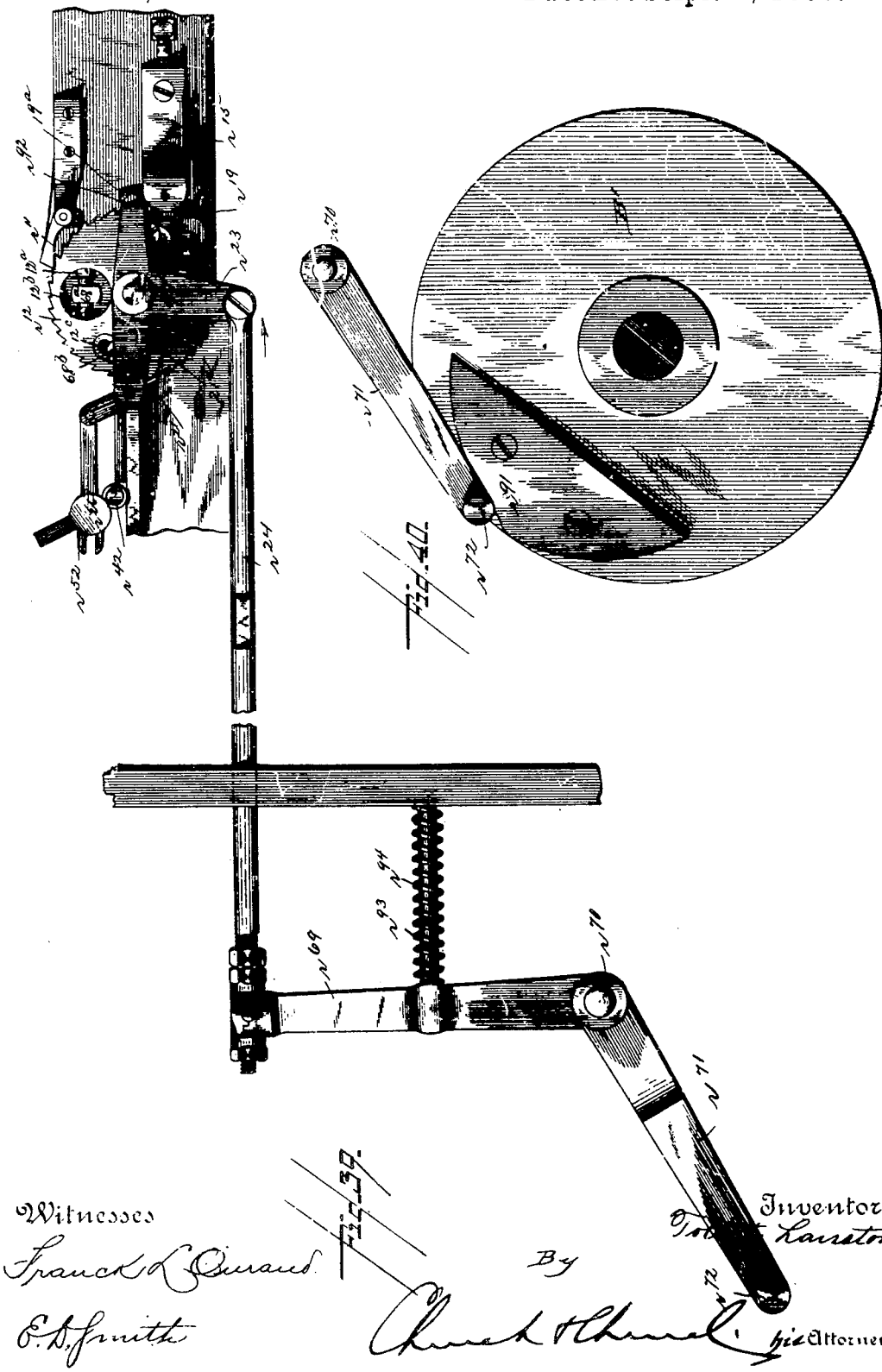
Witnesses
Franck L. Durand
E. D. Smith
Inventor
Tolbert Lanston
By Church & Church
his Attorneys.

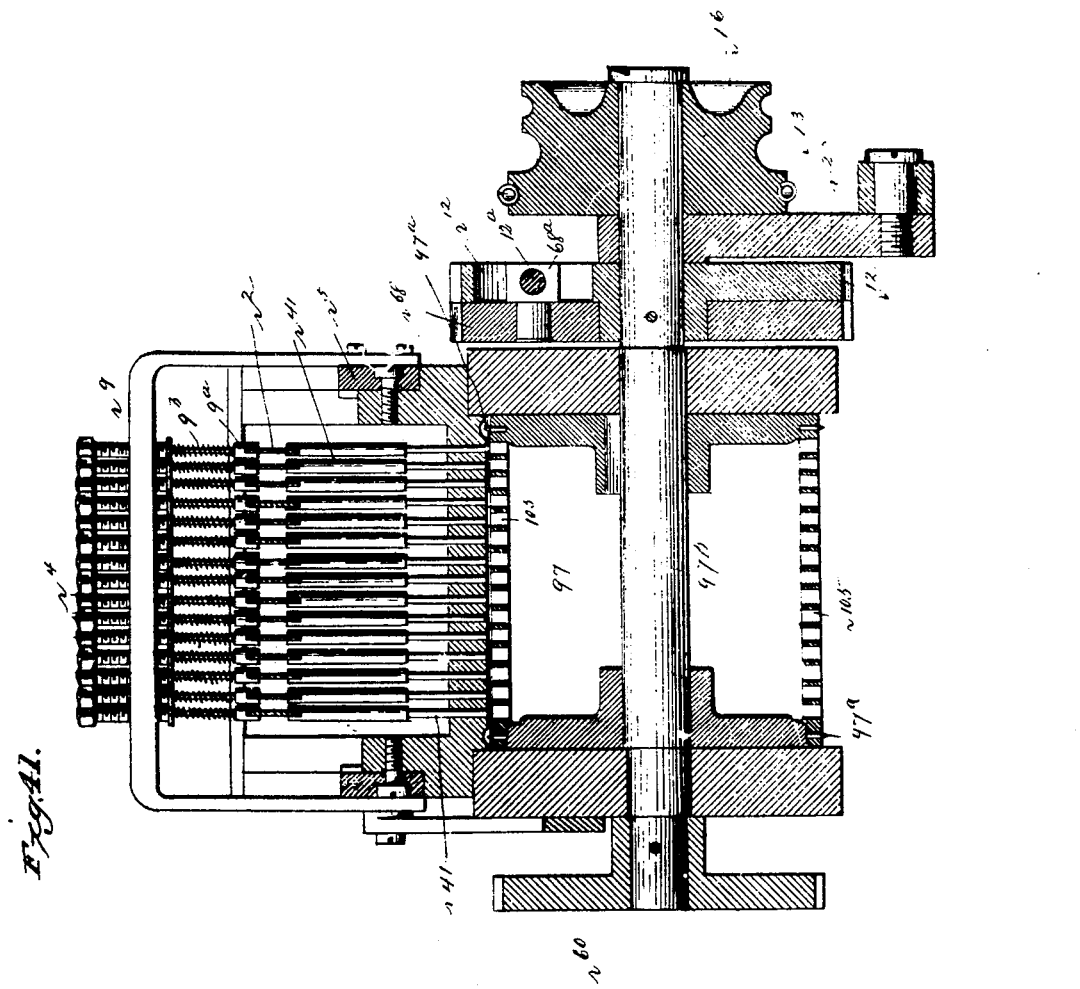

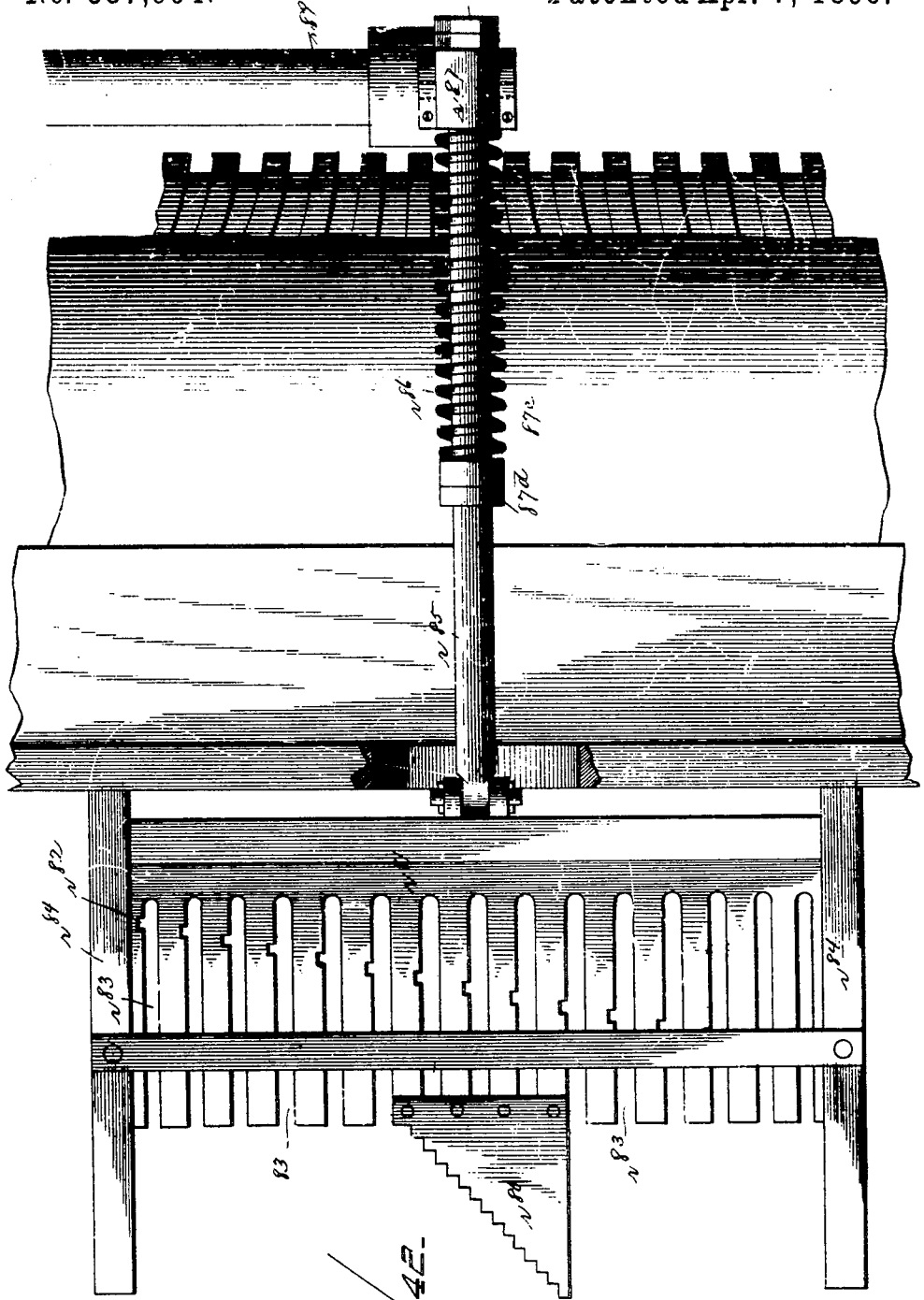

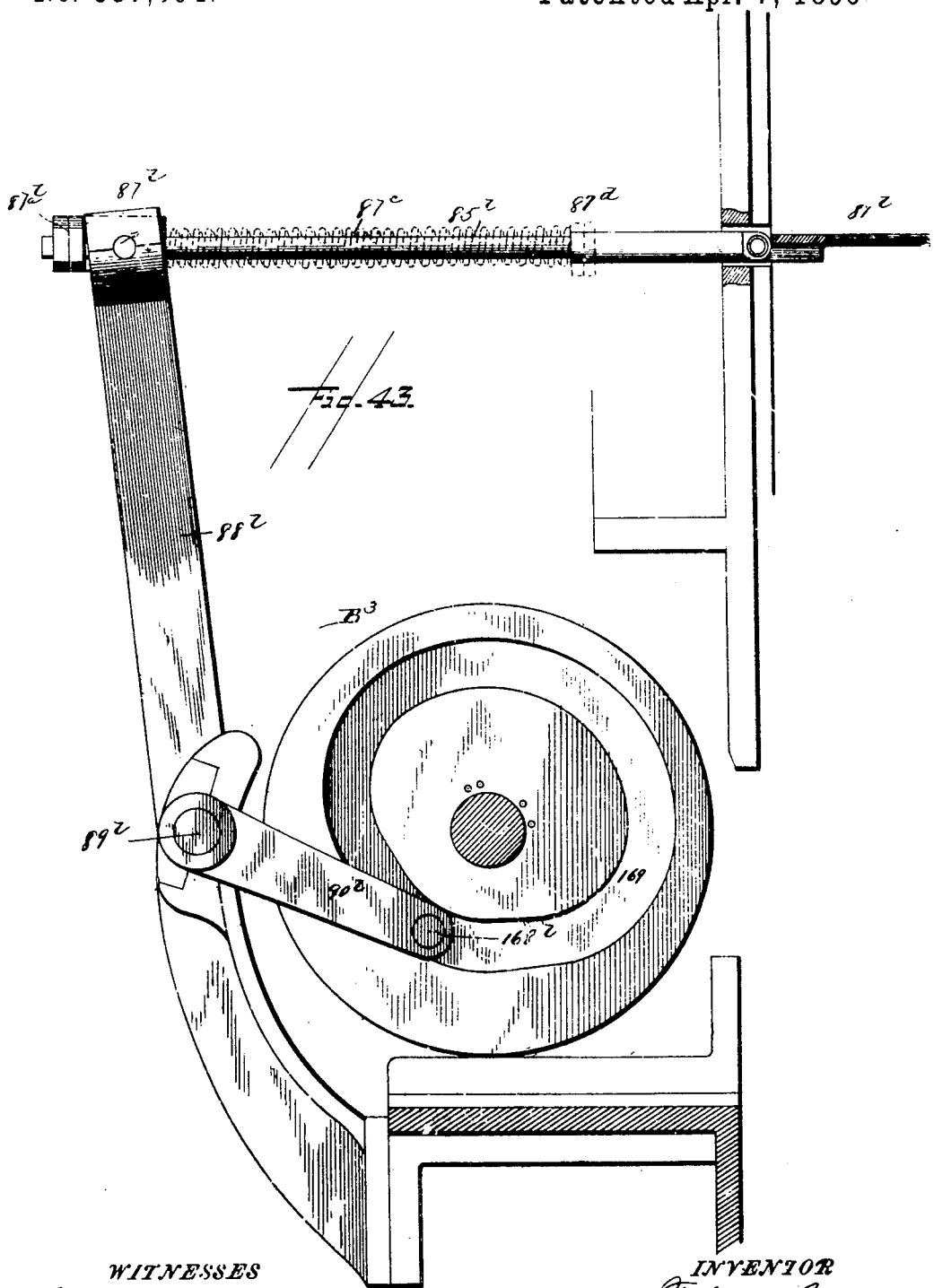

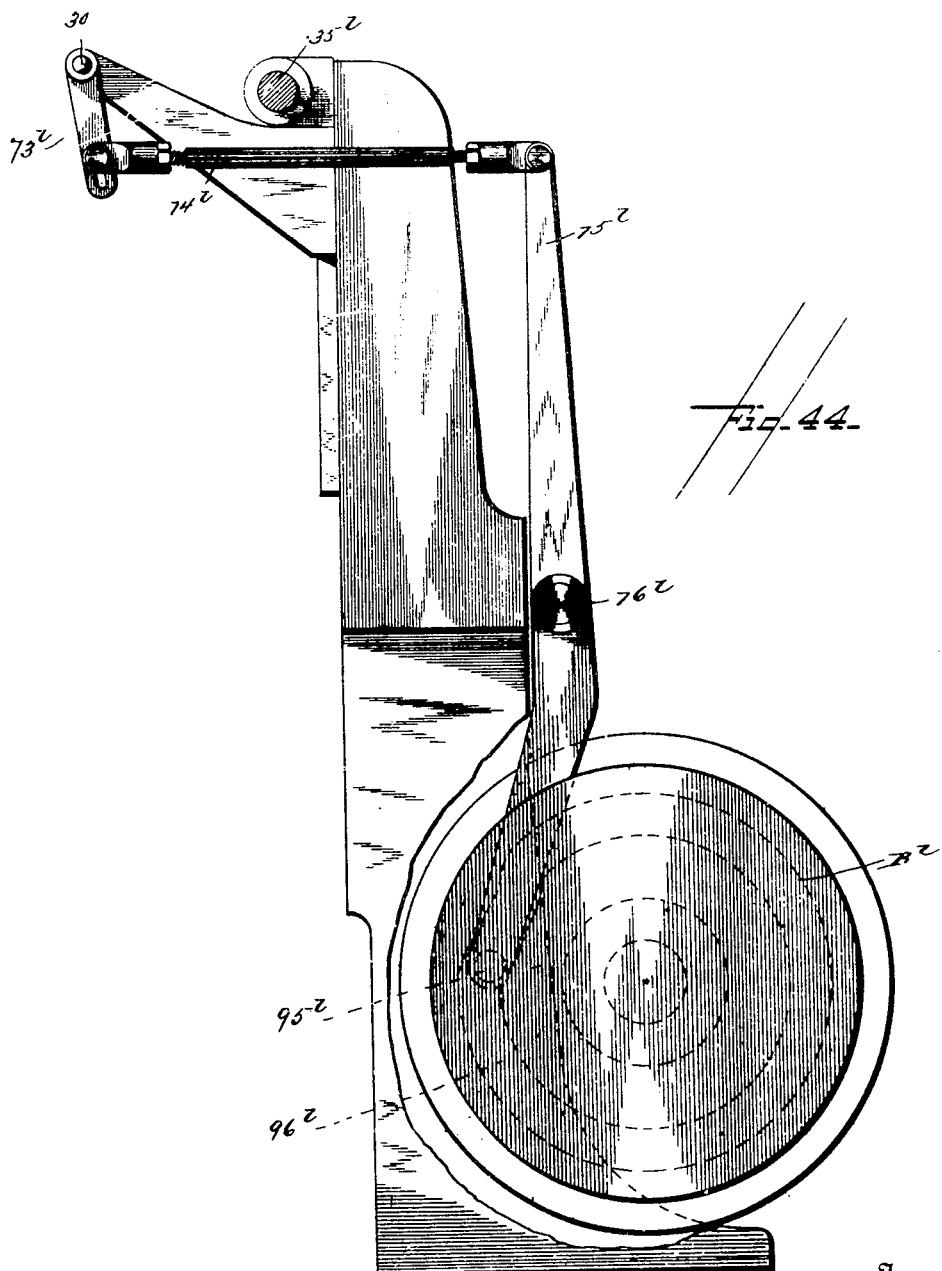

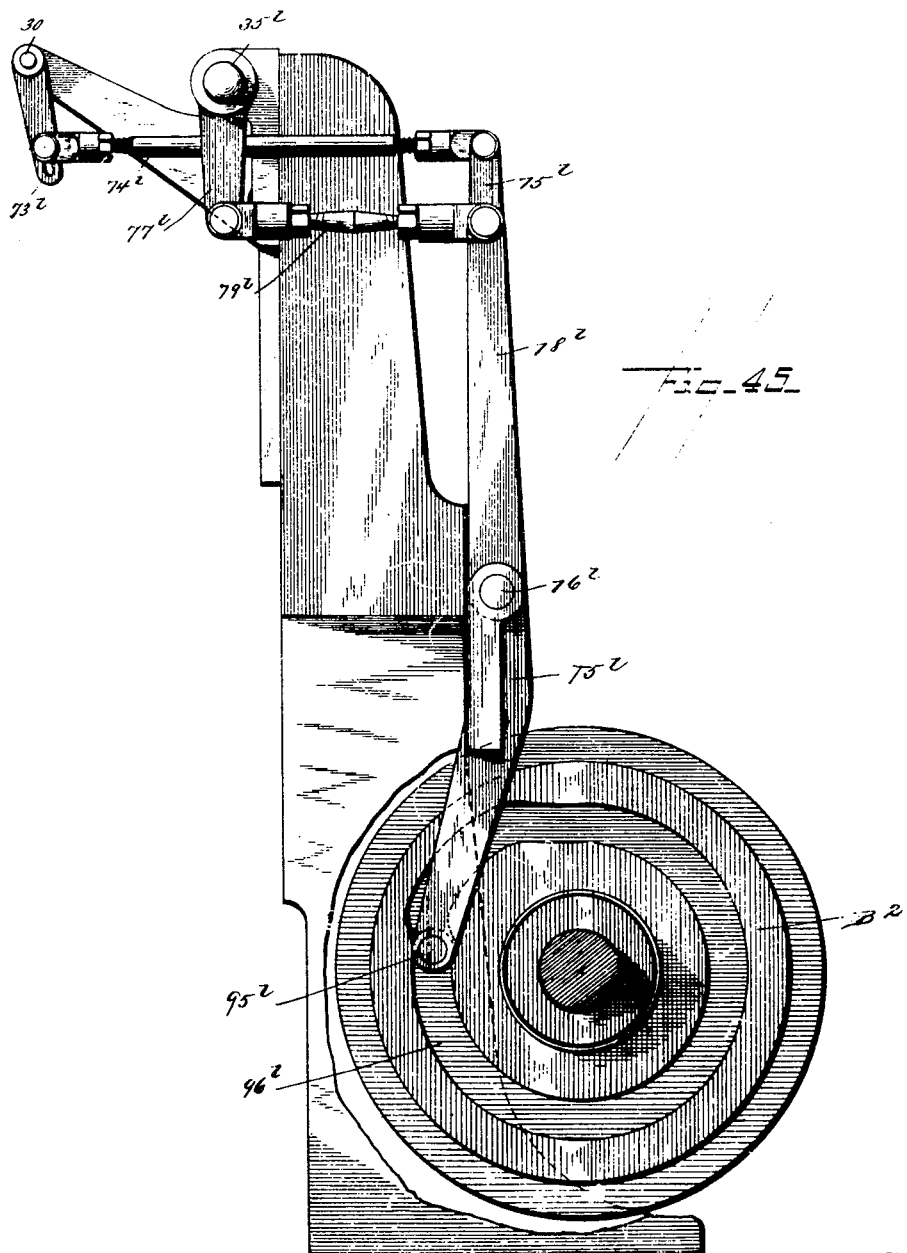

(No Model.)  T. LANSTON.  76 Sheets—Sheet 36.
MACHINE FOR MAKING JUSTIFIED LINES OF TYPE.
No. 557,994.  Patented Apr. 7, 1896.
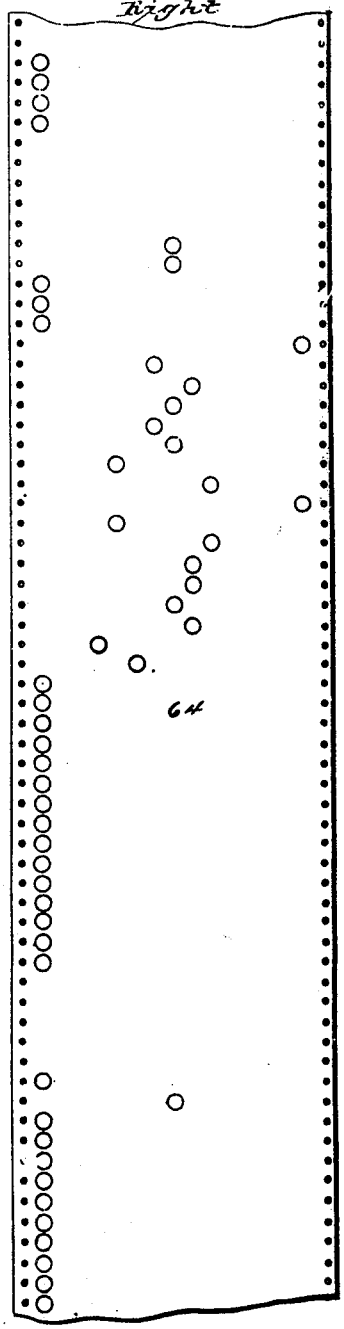
Fig. 45ª
Right
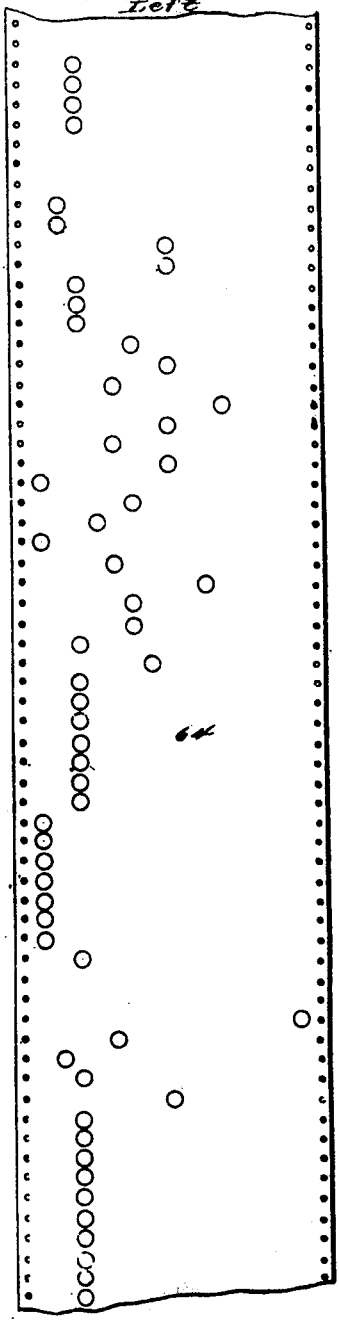
Fig. 45ᵇ
Left
Witnesses  
E. R. Smith  
Alex. F. Stewart
Inventor  
Tolbert Lanston  
By his Attorneys

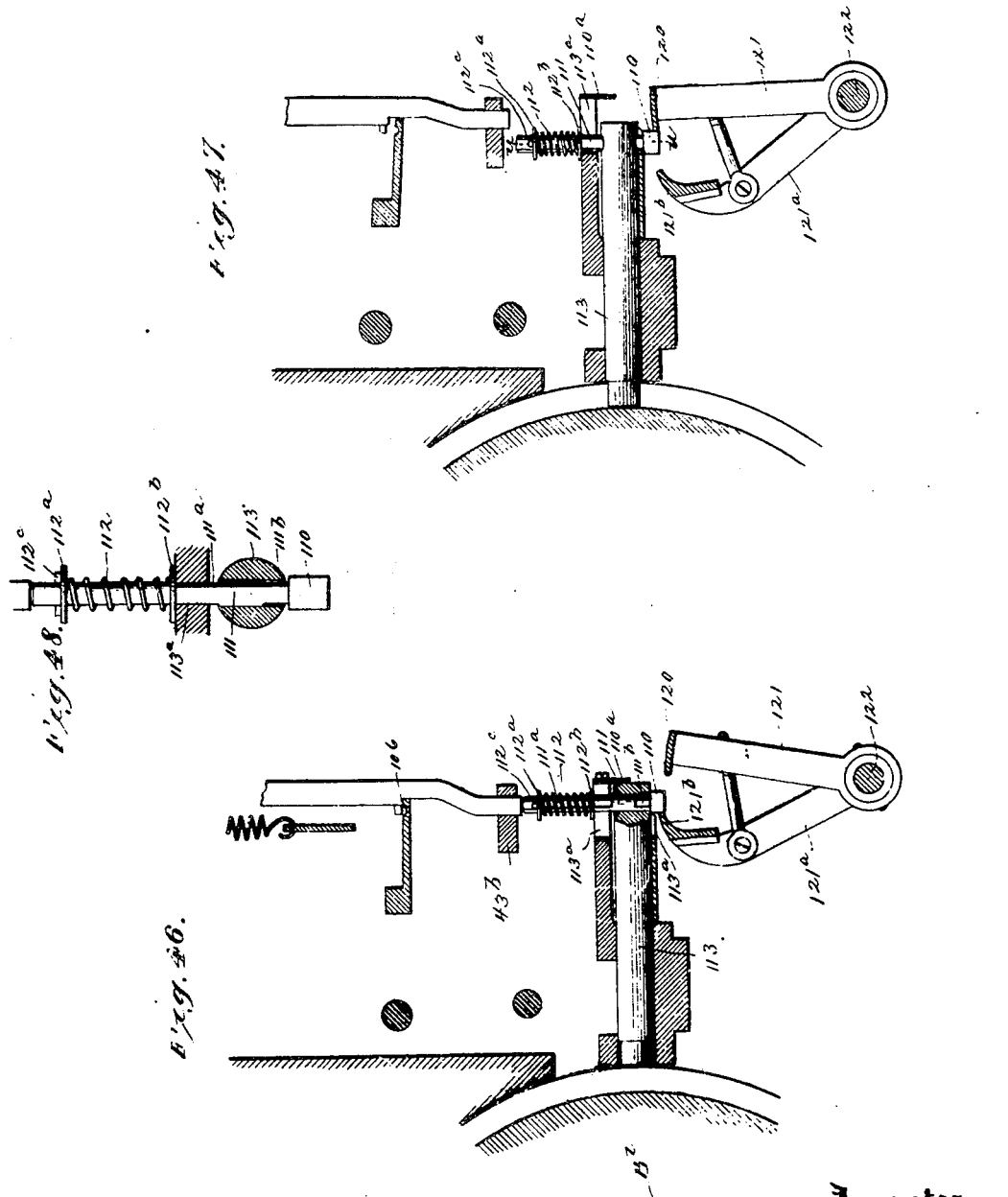

(No Model.)
76 Sheets—Sheet 38.
T. LANSTON.
MACHINE FOR MAKING JUSTIFIED LINES OF TYPE.
No. 557,994. Patented Apr. 7, 1896.
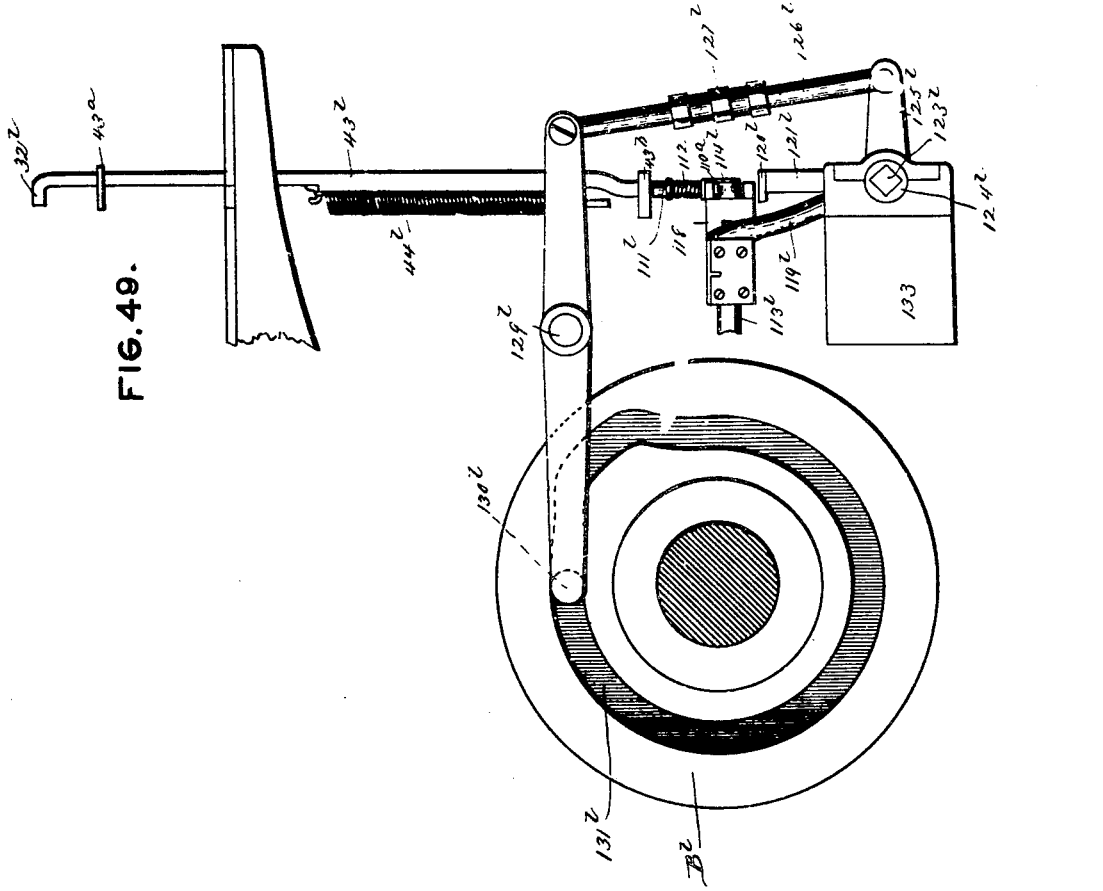
WITNESSES.
J. Henry Kaiser.
C. D. Smith
INVENTOR.
Tolbert Lanston
By Church & Church
his Attys (No Model.)  76 Sheets—Sheet 39.
T. LANSTON.
MACHINE FOR MAKING JUSTIFIED LINES OF TYPE.
No. 557,994. Patented Apr. 7, 1896.
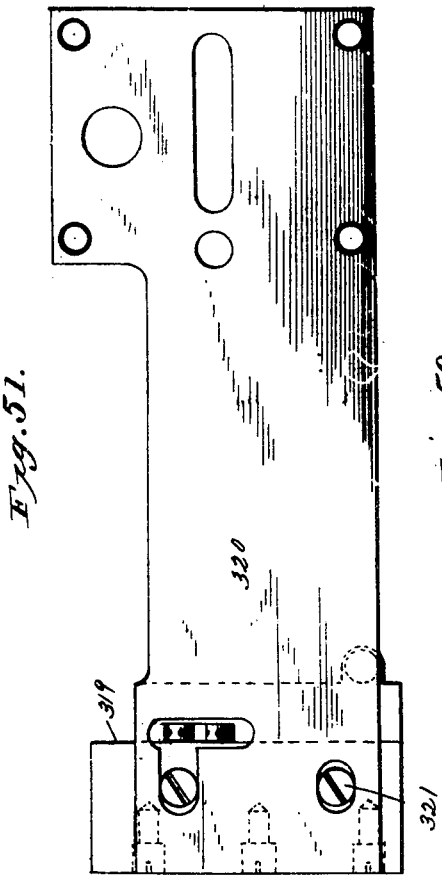
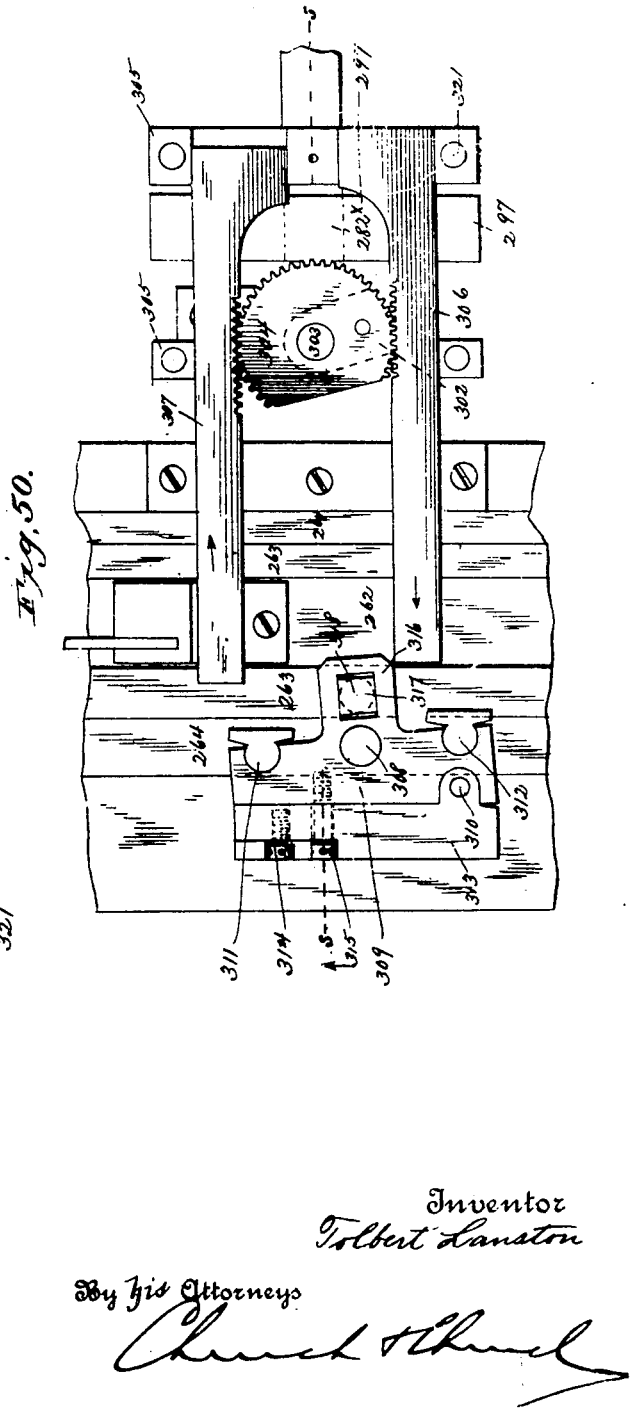
Witnesses
E. D. Smith
Alex J. Stewart
Inventor
Tolbert Lanston
By his Attorneys
Church & Church

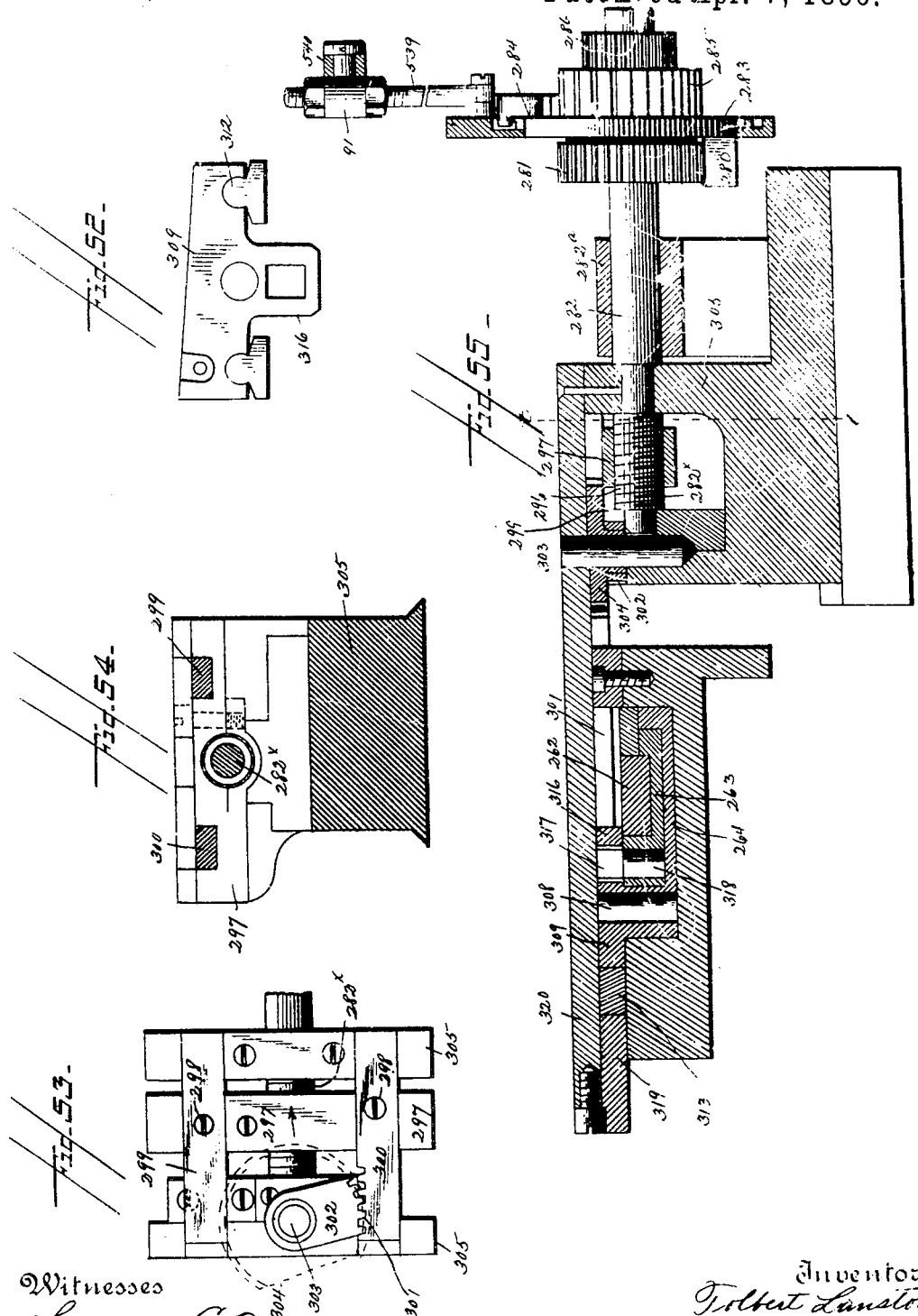

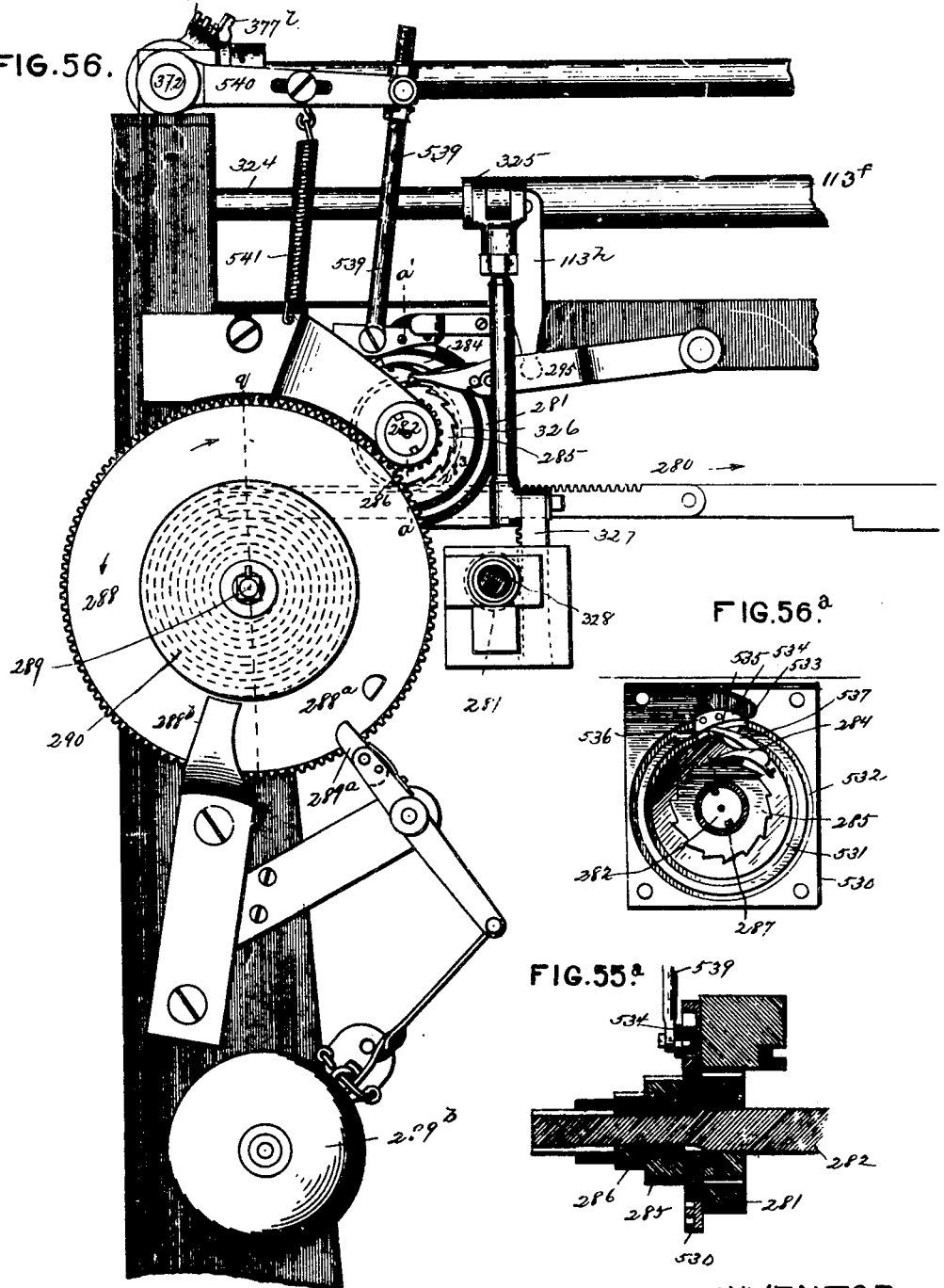

(No Model.) 76 Sheets—Sheet 42.
T. LANSTON.
MACHINE FOR MAKING JUSTIFIED LINES OF TYPE.
No. 557,994. Patented Apr. 7, 1896.
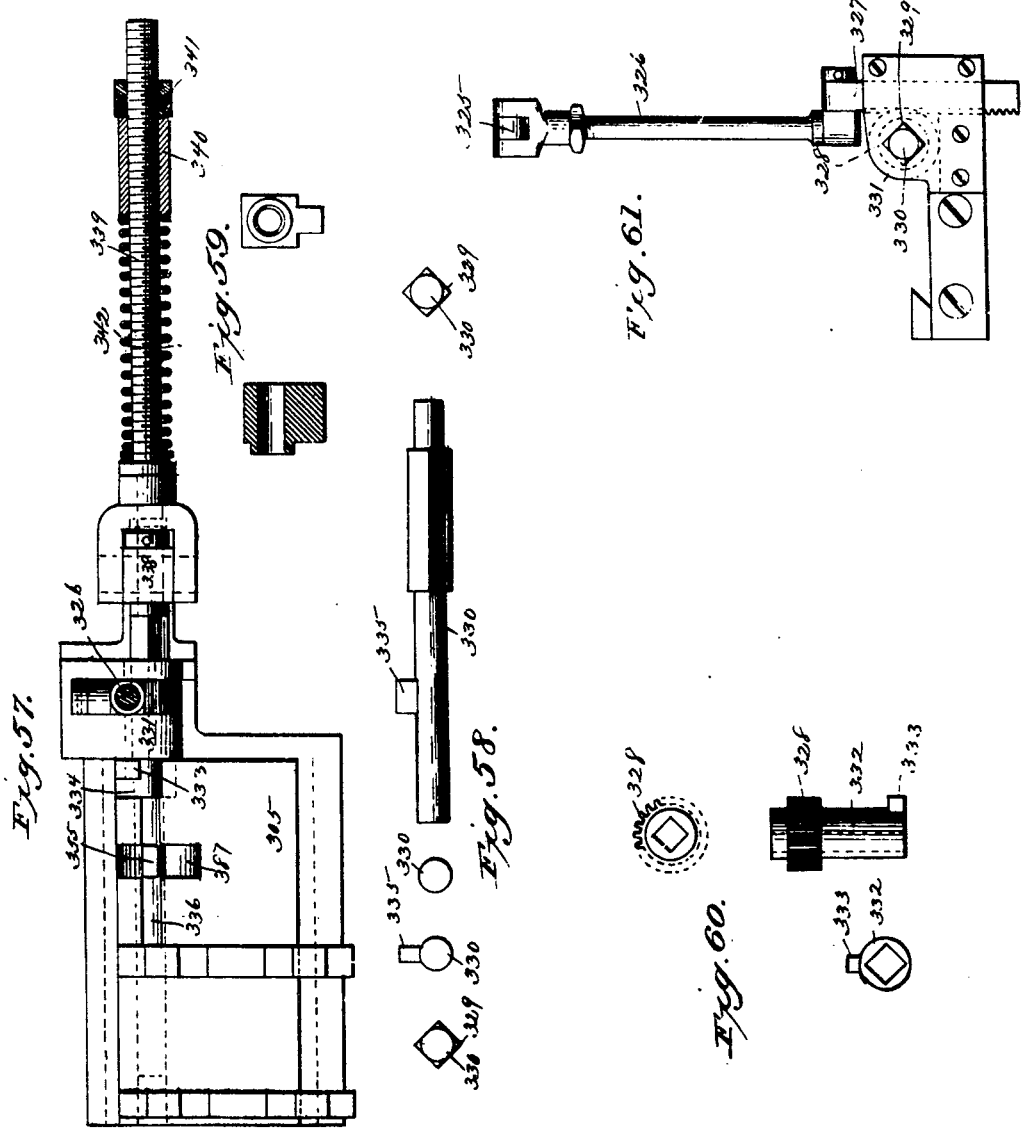

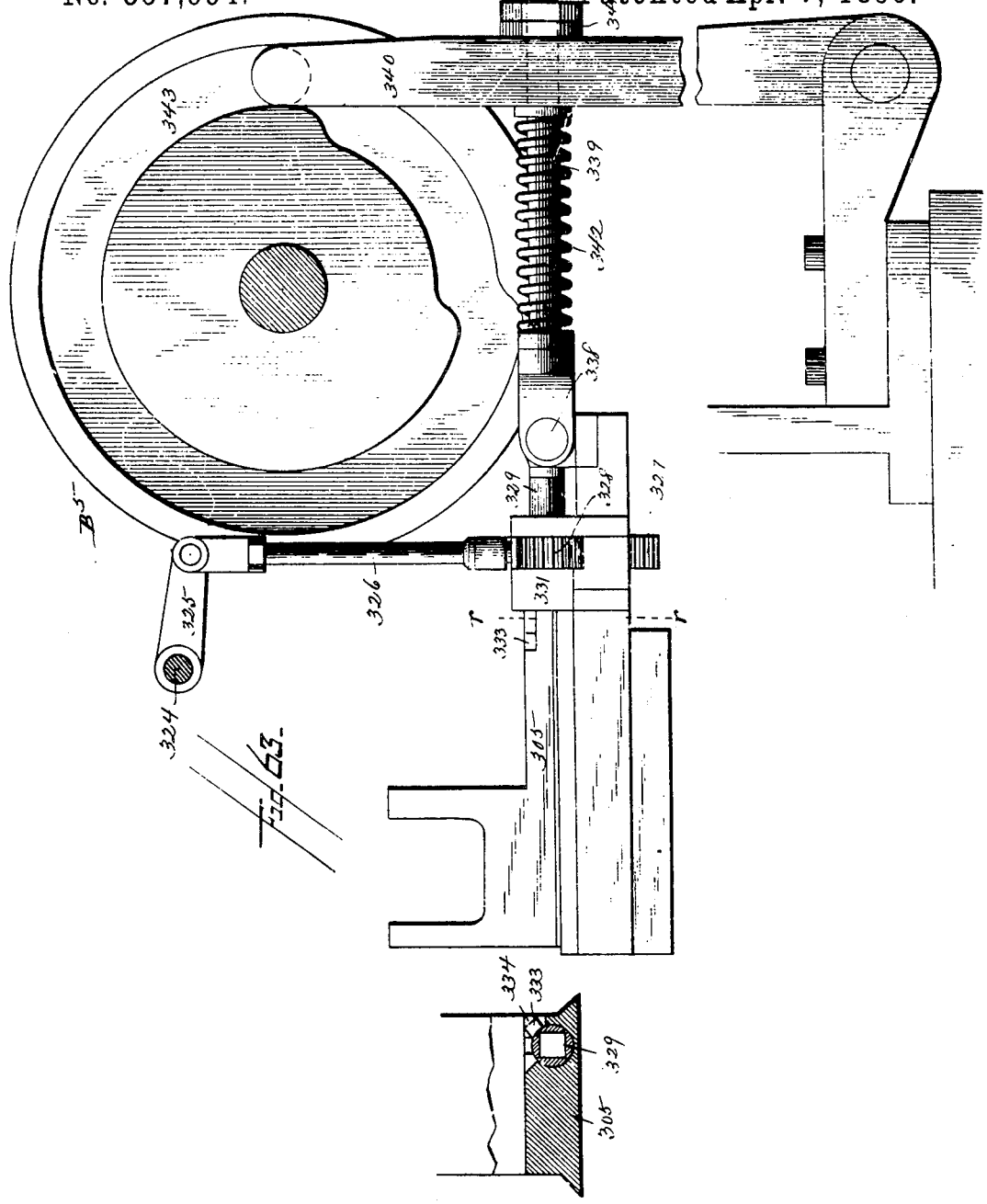

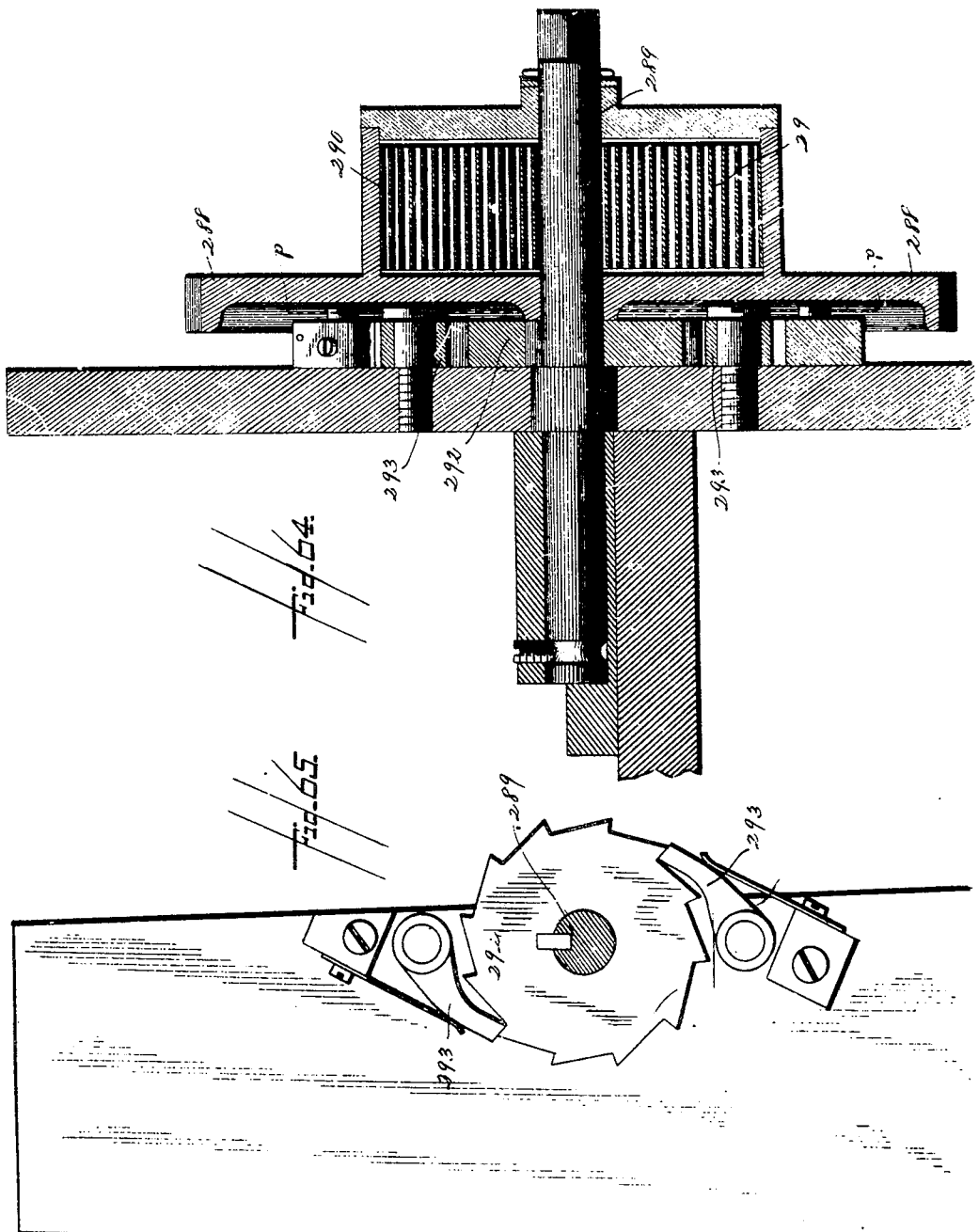

(No Model.) 76 Sheets—Sheet 45.
T. LANSTON.
MACHINE FOR MAKING JUSTIFIED LINES OF TYPE.
No. 557,994. Patented Apr. 7, 1896.
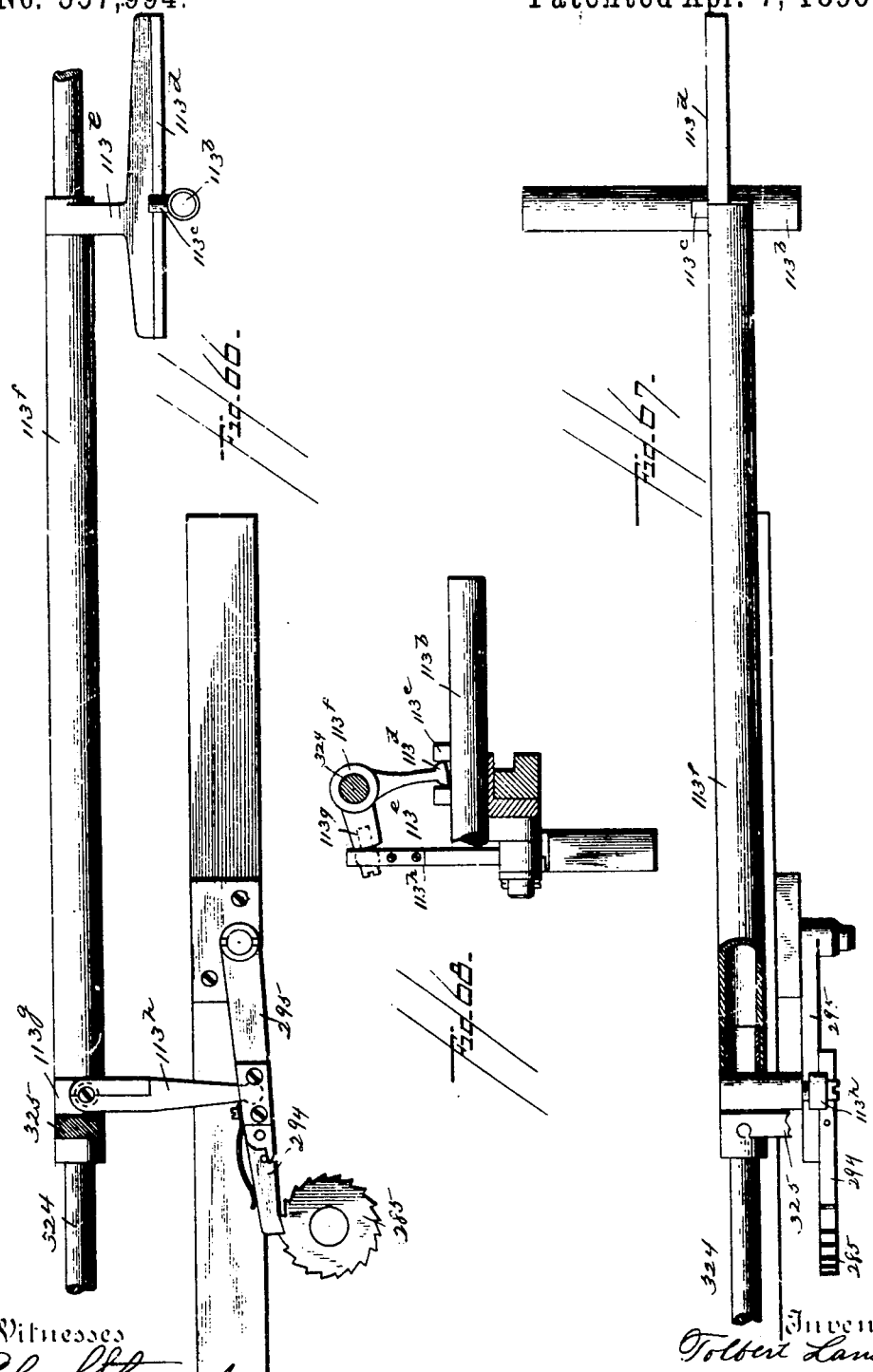

(No Model.)
T. LANSTON.
MACHINE FOR MAKING JUSTIFIED LINES OF TYPE.
No. 557,994.
76 Sheets—Sheet 46.
Patented Apr. 7, 1896.
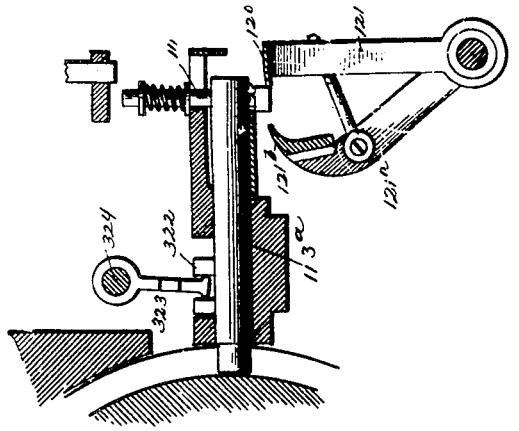
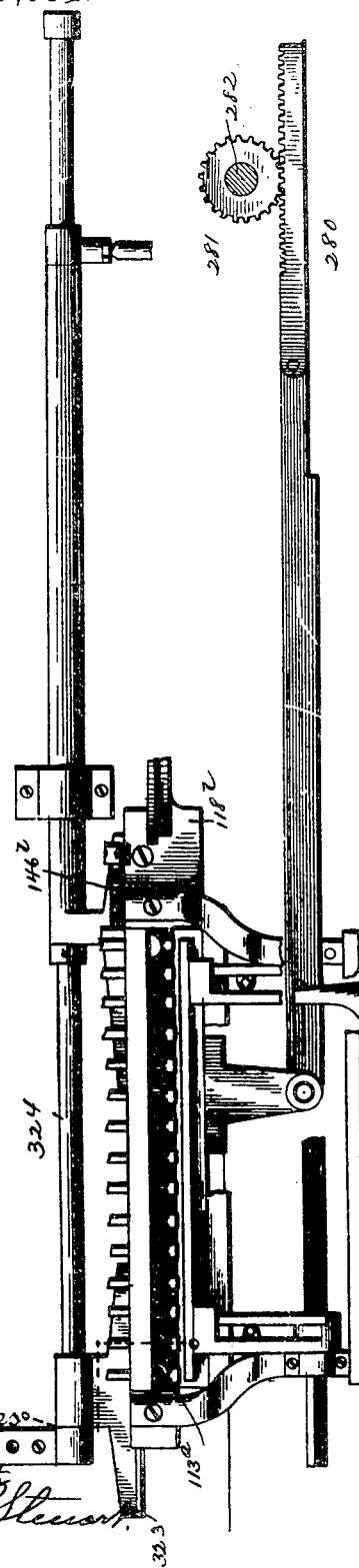
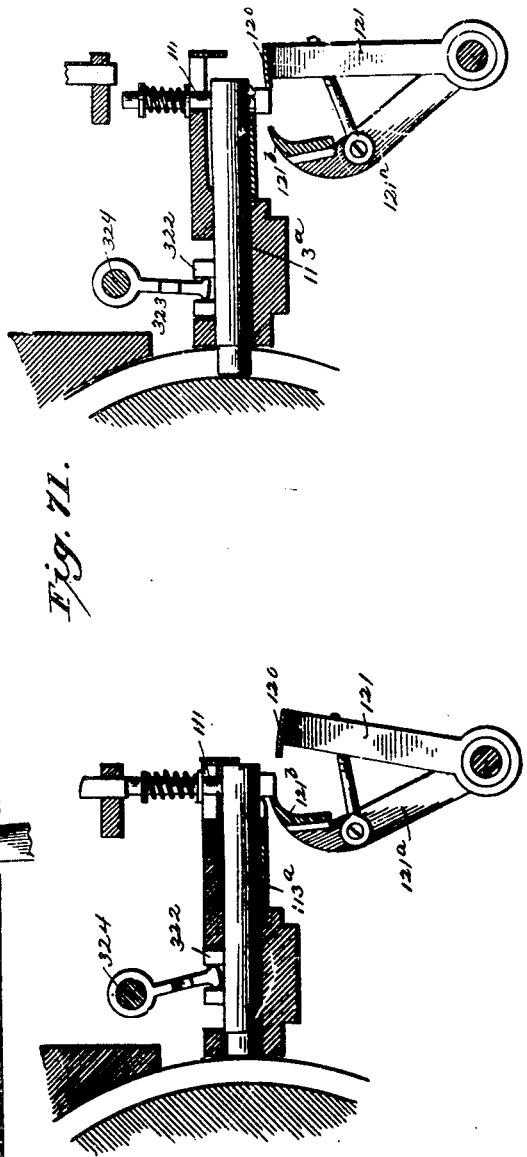
Witnesses:
E. H. Smith
Alex J. Stewart
Inventor
Tolbert Lanston
By his Attorneys

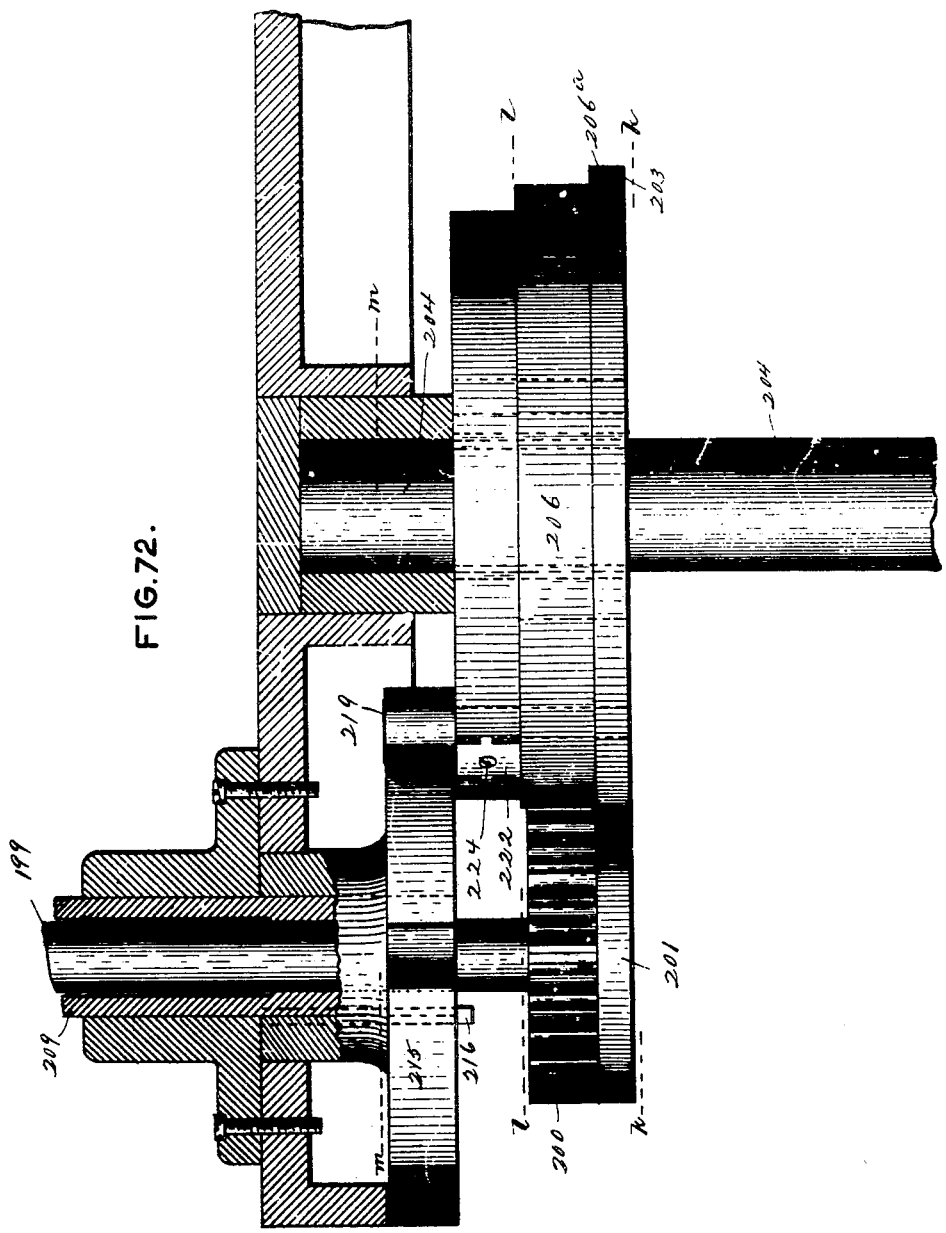

(No Model.)

T. LANSTON.
MACHINE FOR MAKING JUSTIFIED LINES OF TYPE.

No. 557,994. Patented Apr. 7, 1896.

WITNESSES.
J. Henry Kaiser.
E. D. Smith

INVENTOR.
Tolbert Lanston
By Church & Church
his Attys (No Model.)
T. LANSTON.
MACHINE FOR MAKING JUSTIFIED LINES OF TYPE.
No. 557,994. Patented Apr. 7, 1896.
FIG.77.
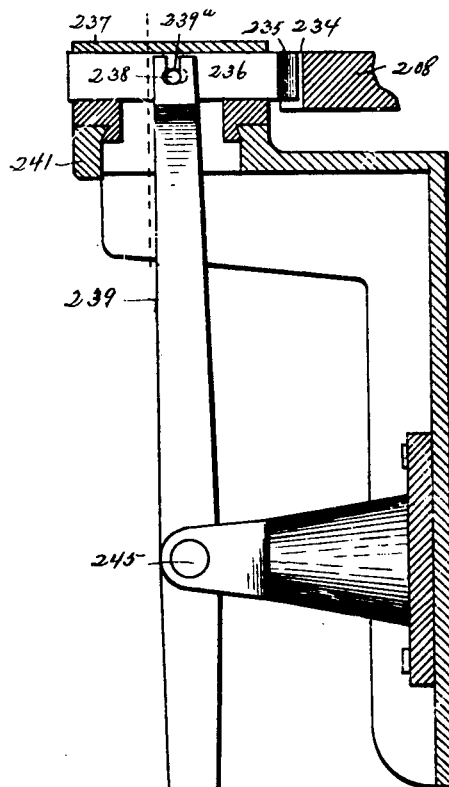
FIG.78.
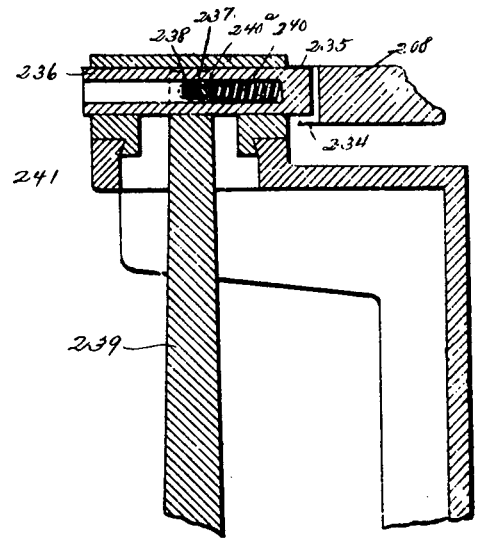
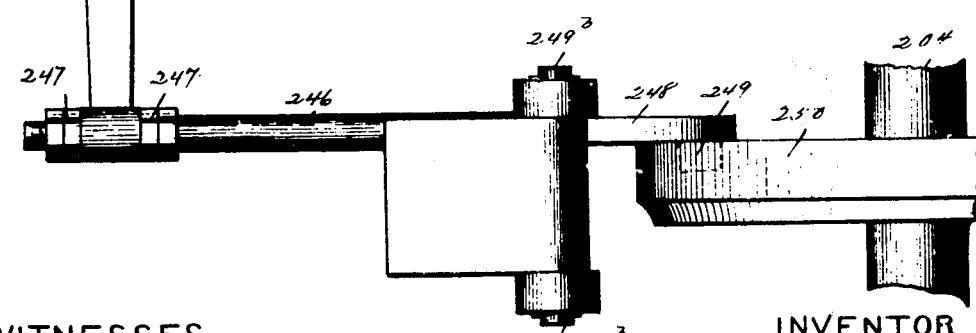
WITNESSES.
J. Henry Kaiser
E. D. Smith
INVENTOR.
Tolbert Lanston
By Church & Church
his Attys (No Model.)
T. LANSTON.
MACHINE FOR MAKING JUSTIFIED LINES OF TYPE.
No. 557,994.  Patented Apr. 7, 1896.
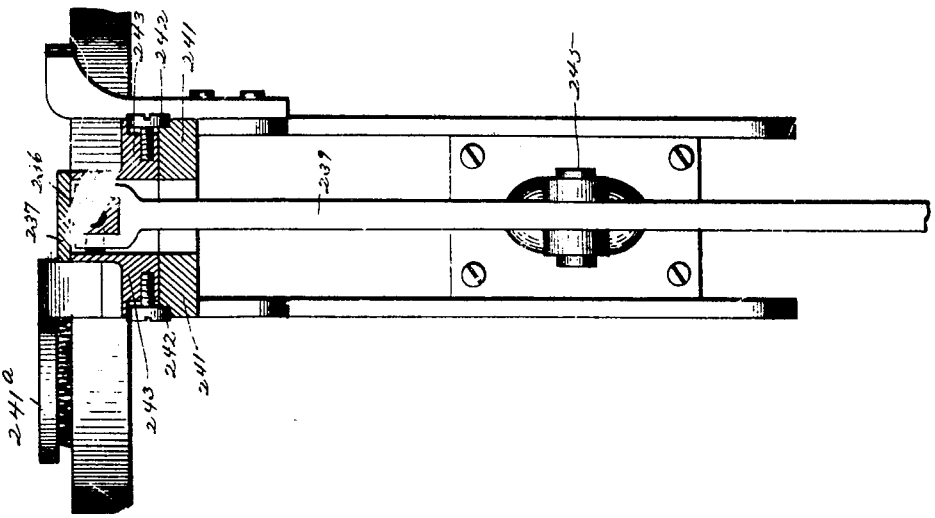
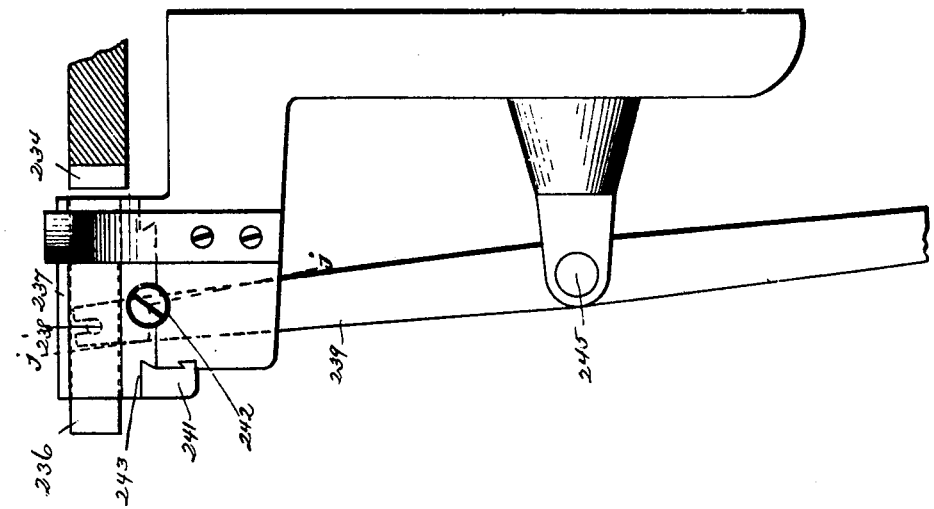
WITNESSES.
J. Henry Kaiser
E. D. Smith
INVENTOR.
Tolbert Lanston
By Church & Church
his Attys (No Model.)

76 Sheets—Sheet 53.

T. LANSTON.
MACHINE FOR MAKING JUSTIFIED LINES OF TYPE.

No. 557,994. Patented Apr. 7, 1896.

WITNESSES.
J. Henry Kaiser.
C. D. Smith

INVENTOR.
Tolbert Lanston
By Church & Church
his Attys

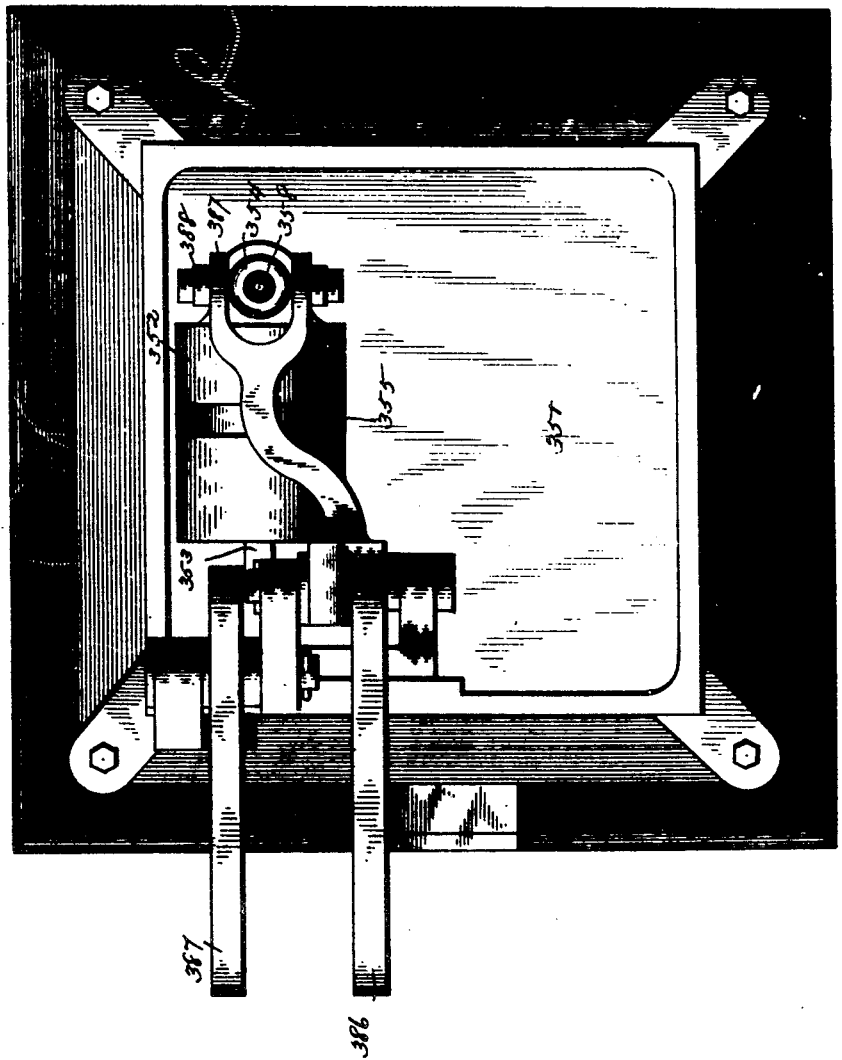

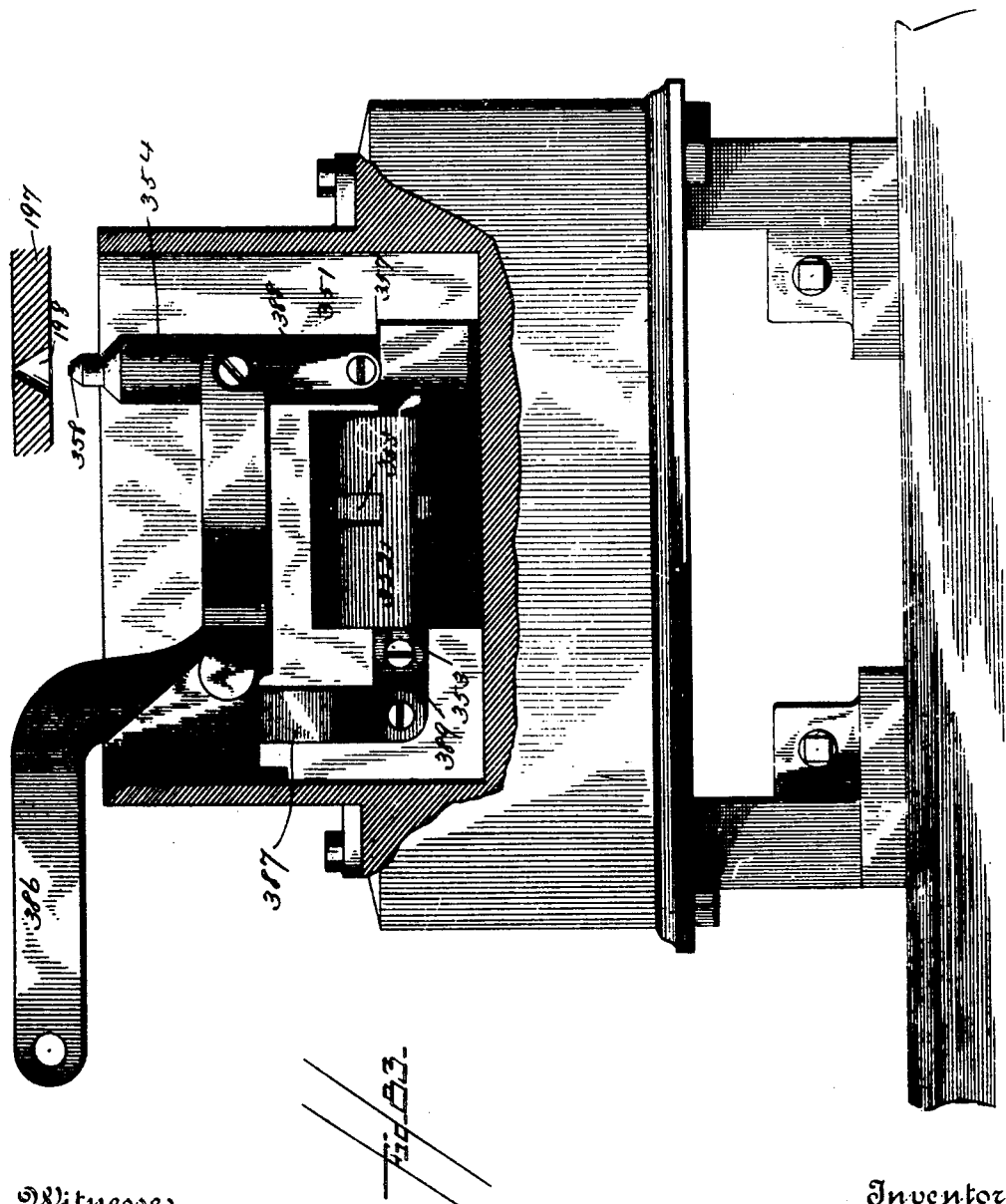

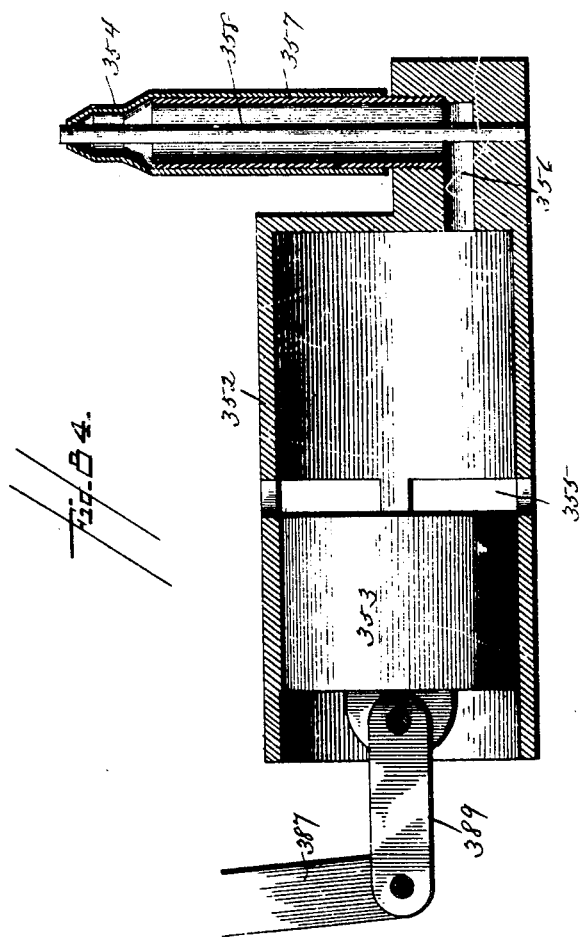

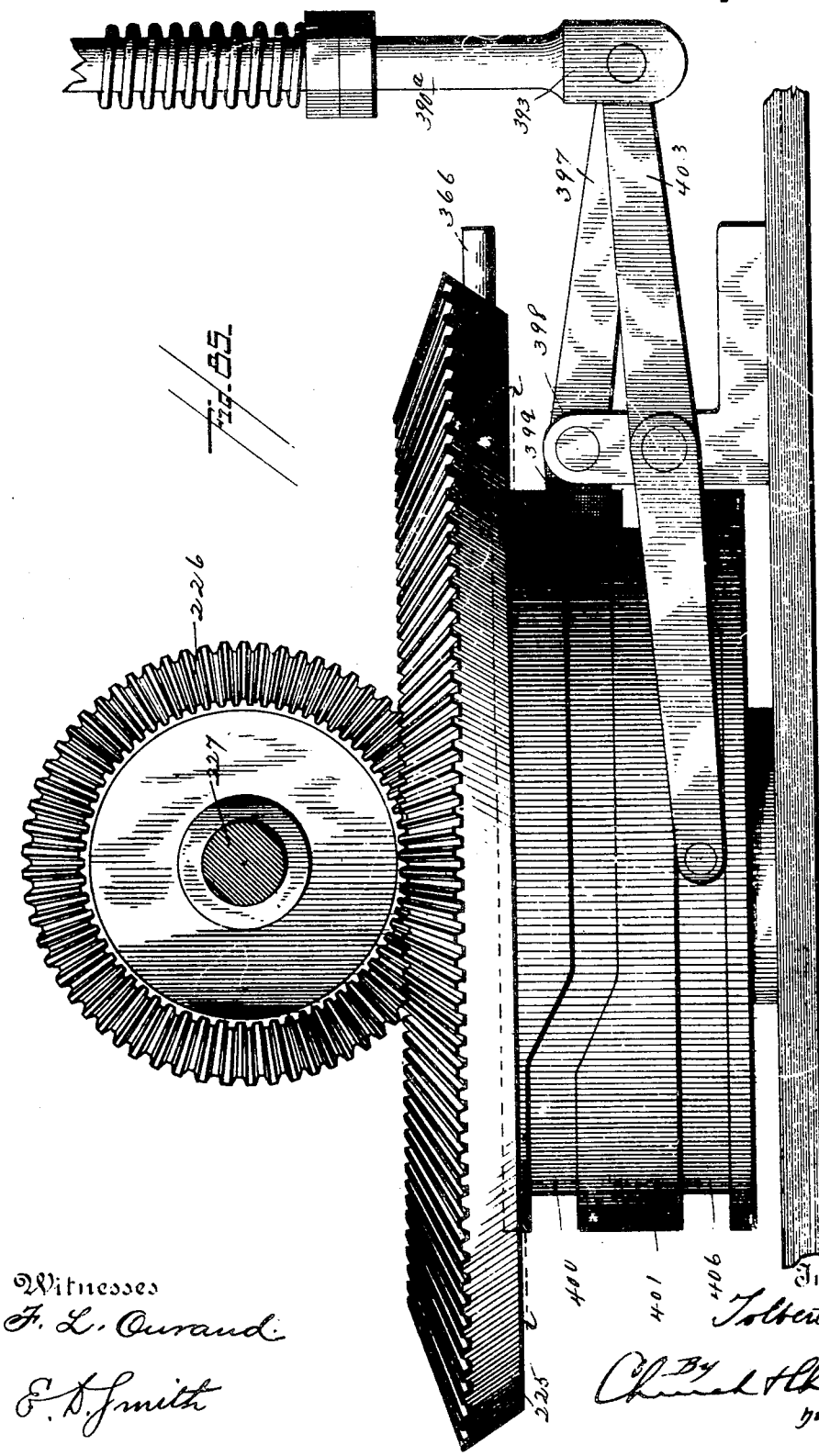

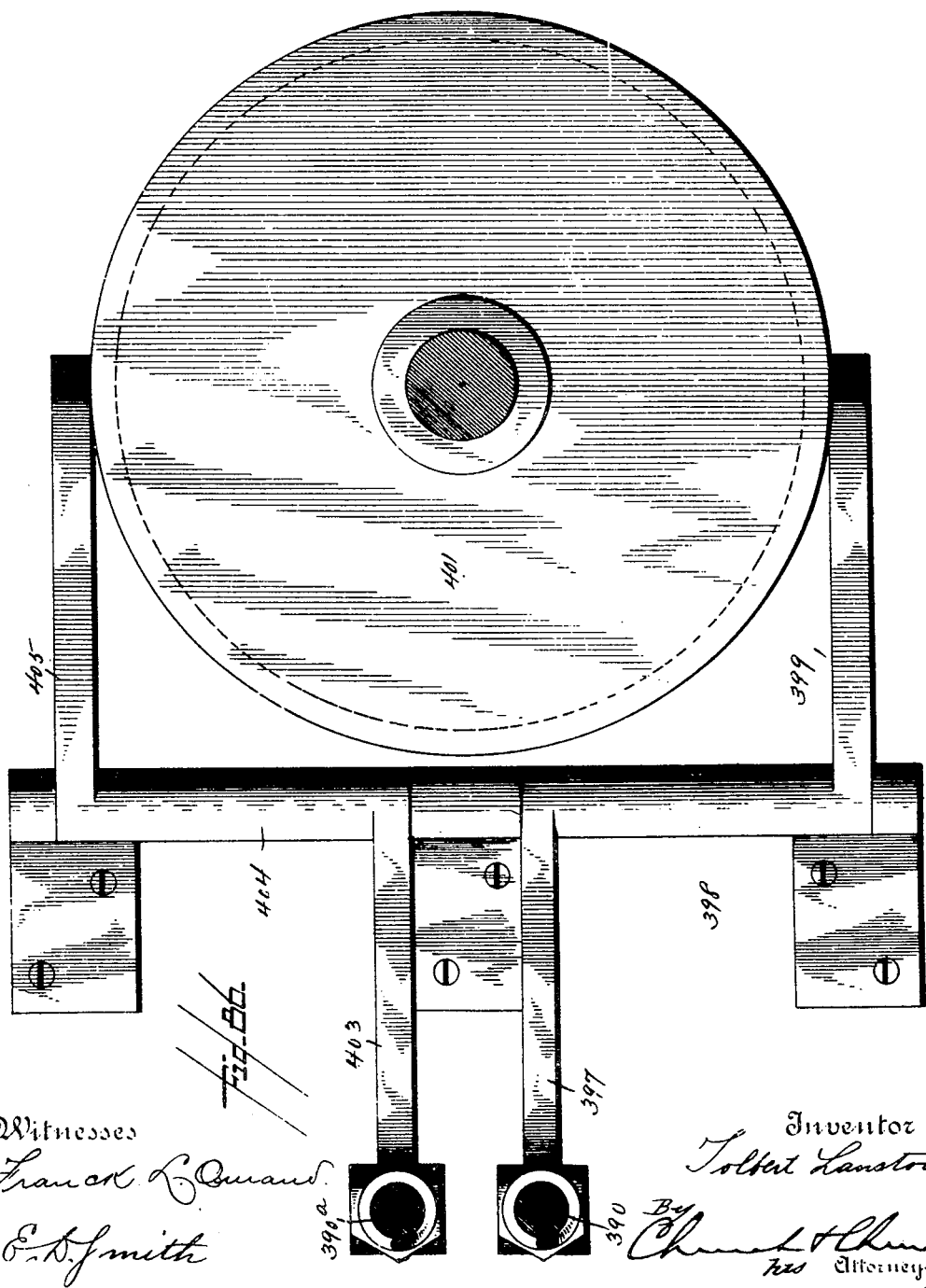

(No Model.)  76 Sheets—Sheet 59.
T. LANSTON.
MACHINE FOR MAKING JUSTIFIED LINES OF TYPE.
No. 557,994. Patented Apr. 7, 1896.
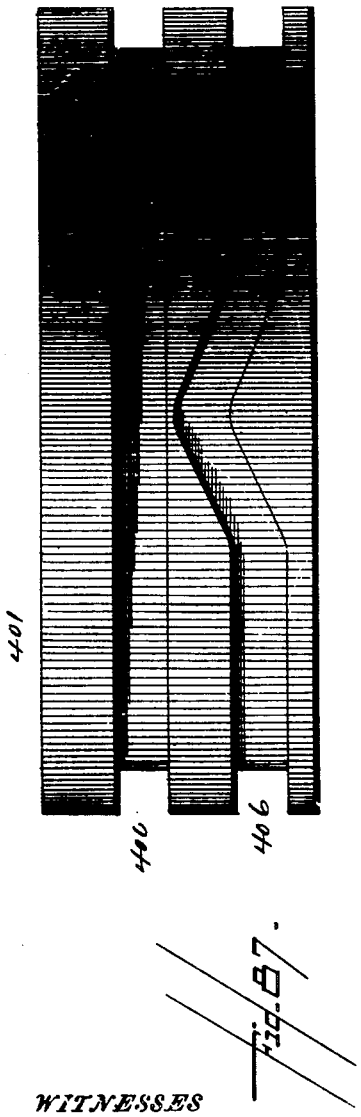
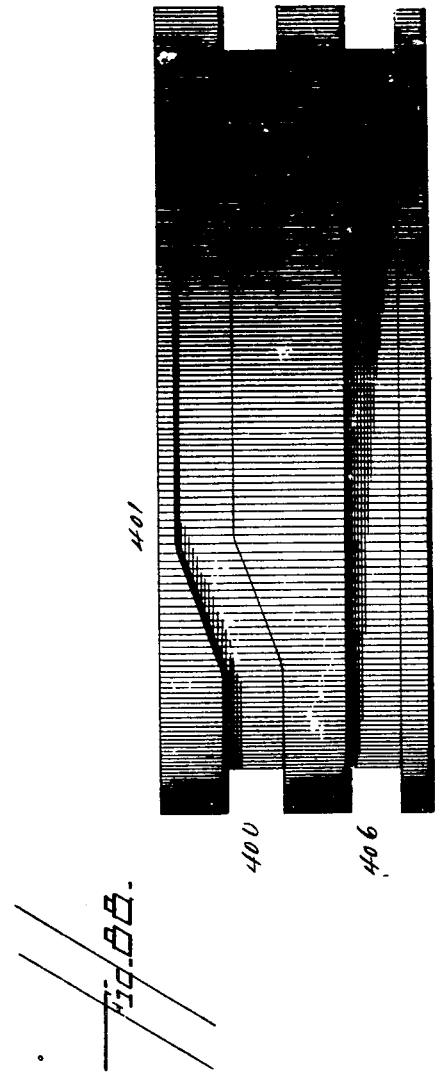

(No Model.)
76 Sheets—Sheet 60.
T. LANSTON.
MACHINE FOR MAKING JUSTIFIED LINES OF TYPE.
No. 557,994.
Patented Apr. 7, 1896.
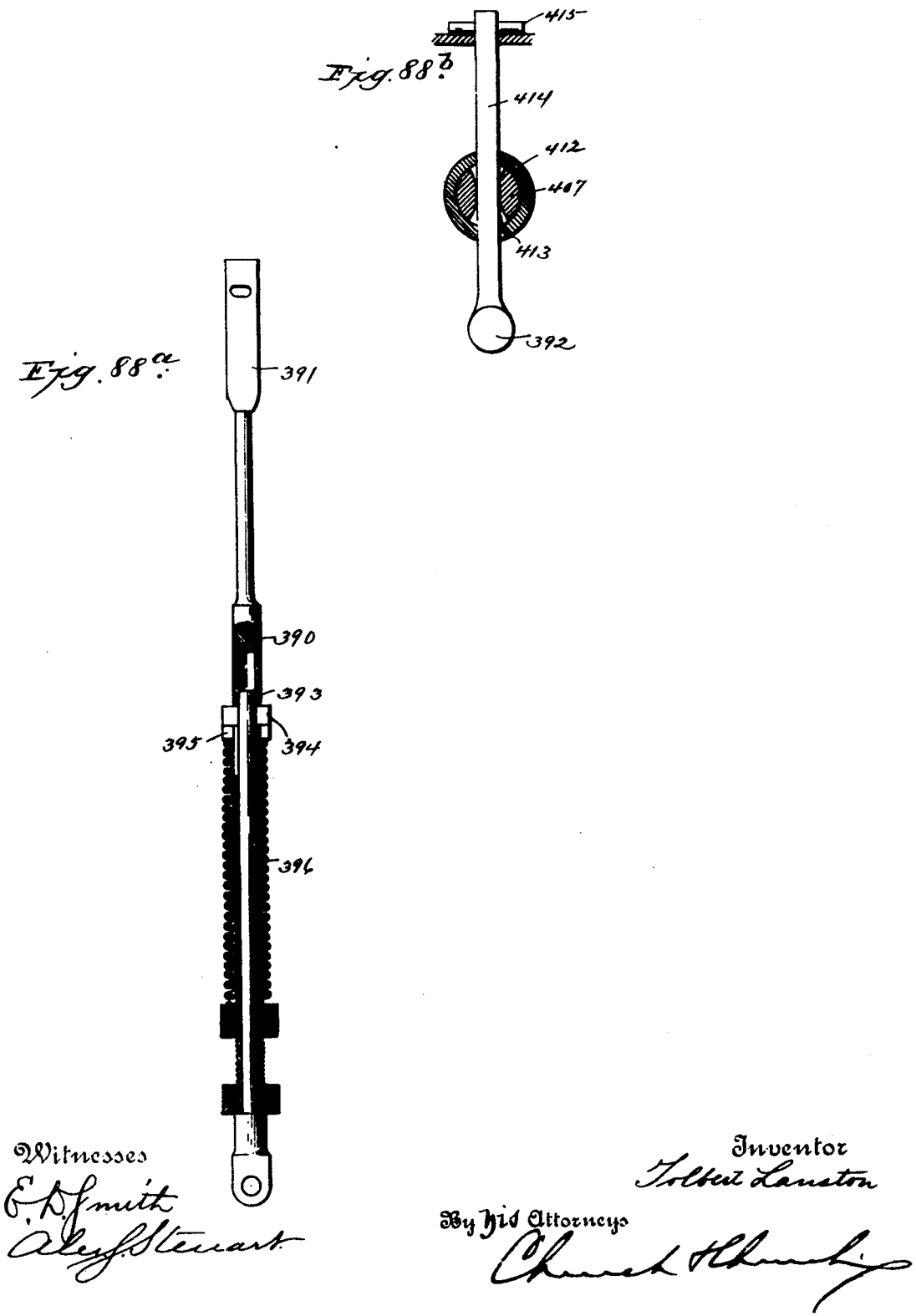
Witnesses
E. D. Smith
Alex F. Stewart
Inventor
Tolbert Lanston
By his Attorneys
Church & Church (No Model.)
76 Sheets—Sheet 61.
T. LANSTON.
MACHINE FOR MAKING JUSTIFIED LINES OF TYPE.
No. 557,994. Patented Apr. 7, 1896.
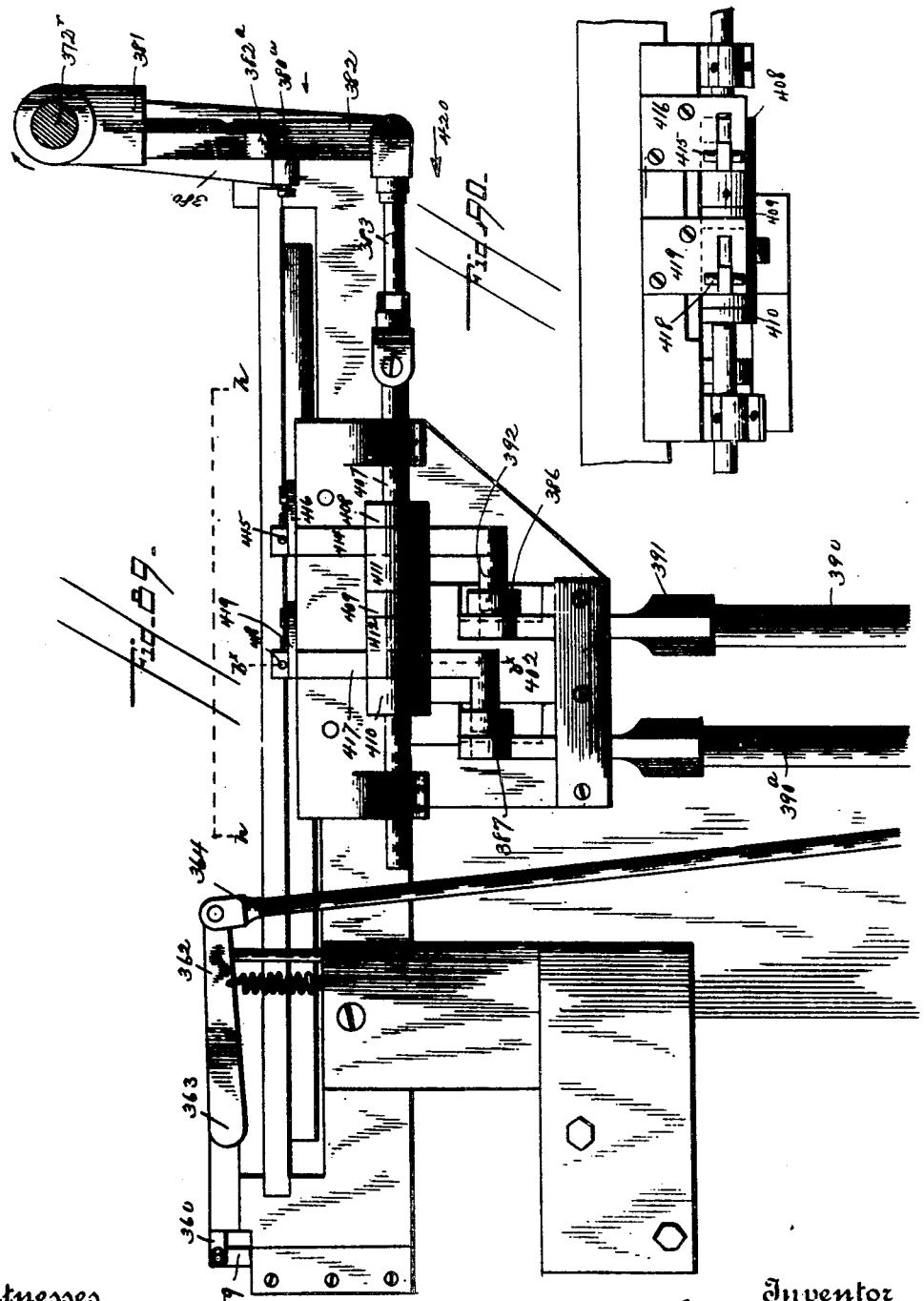
Witnesses
Franck L. Durand
E. D. Smith
Inventor
Tolbert Lanston
By his Attorneys

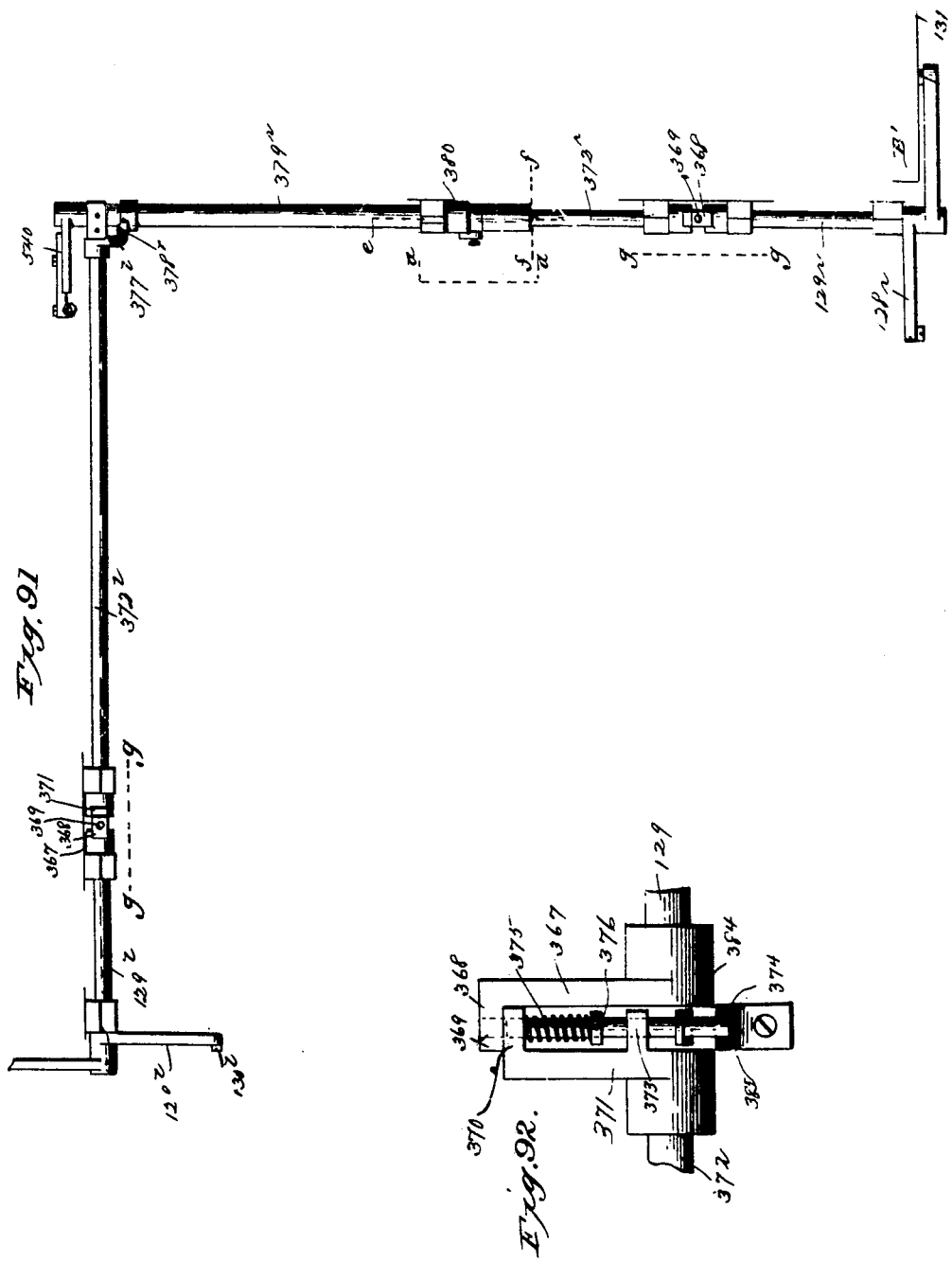

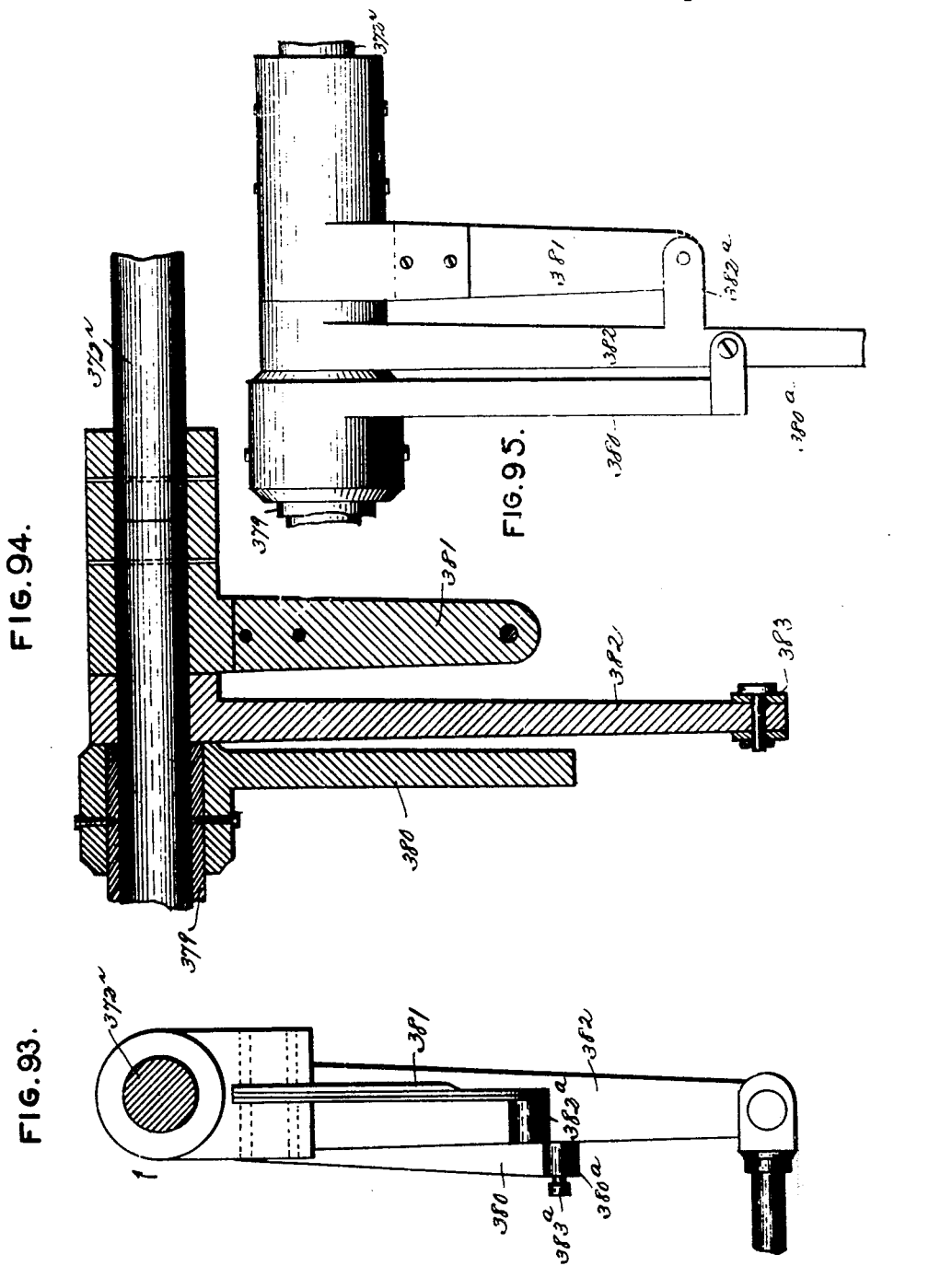

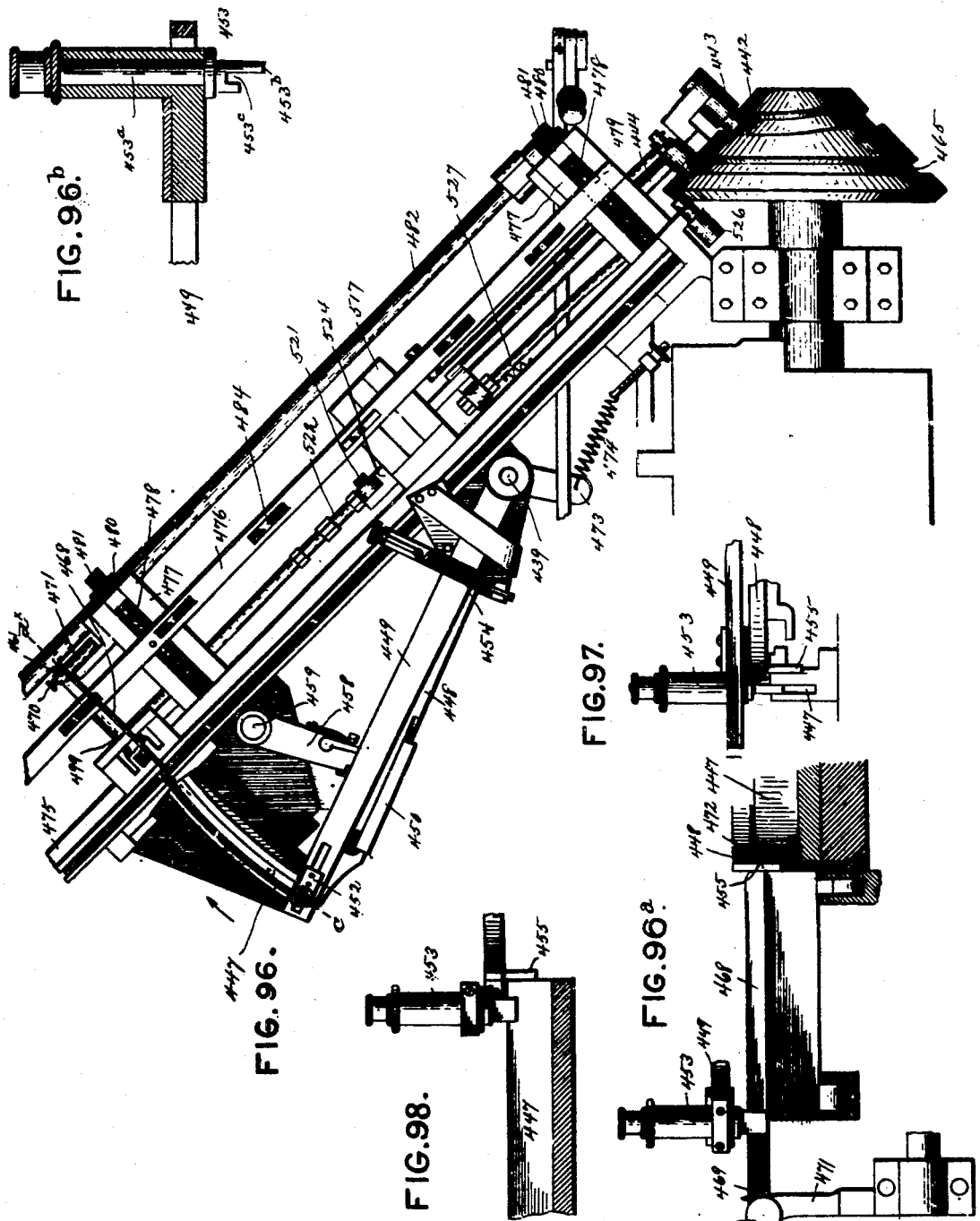

(No Model.)

T. LANSTON.
MACHINE FOR MAKING JUSTIFIED LINES OF TYPE.

No. 557,994. Patented Apr. 7, 1896.

76 Sheets—Sheet 65.

WITNESSES.
J. Henry Kaiser.
E. D. Smith.

INVENTOR.
Tolbert Lanston
By Church & Church
his Attys.

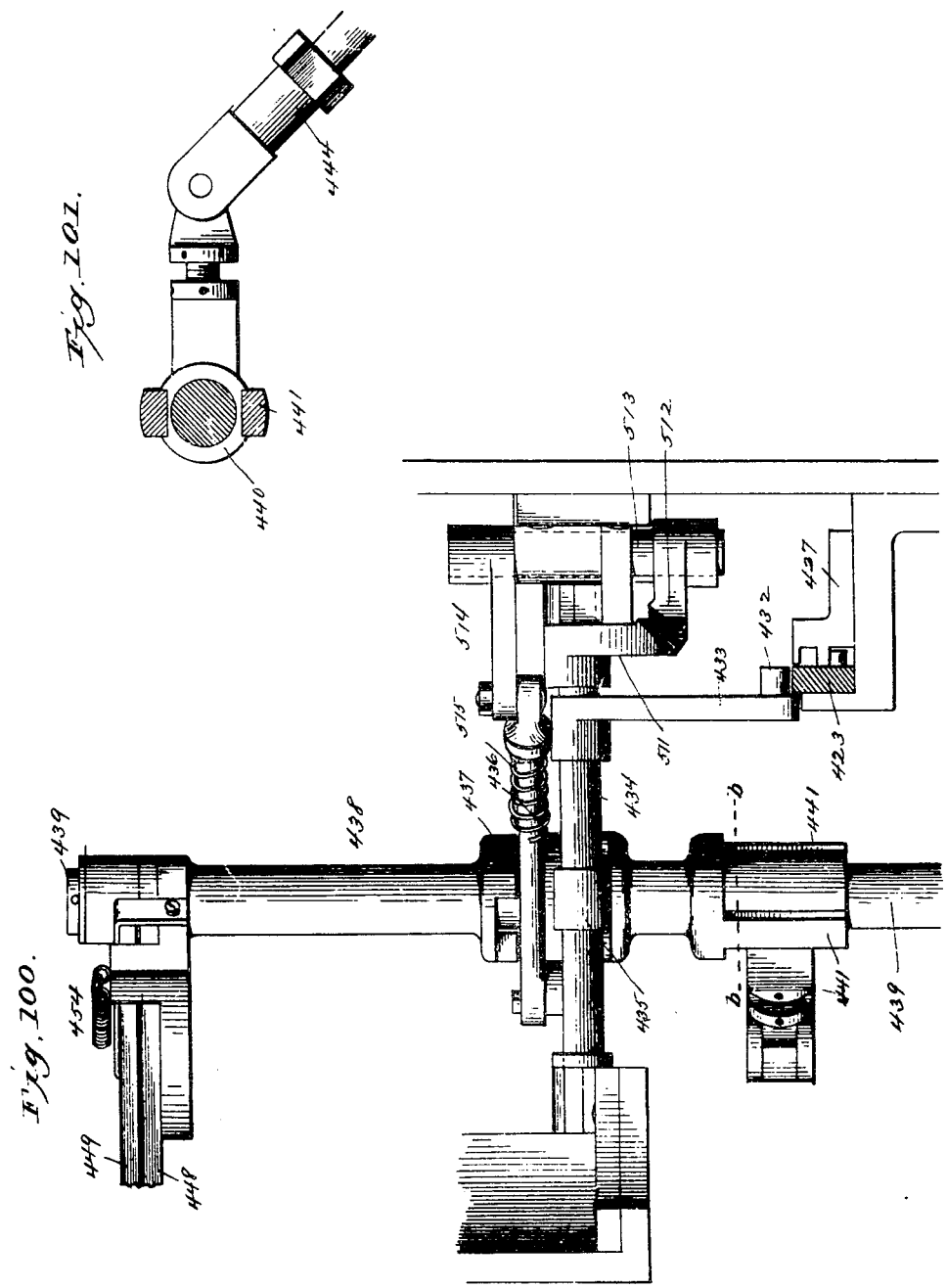

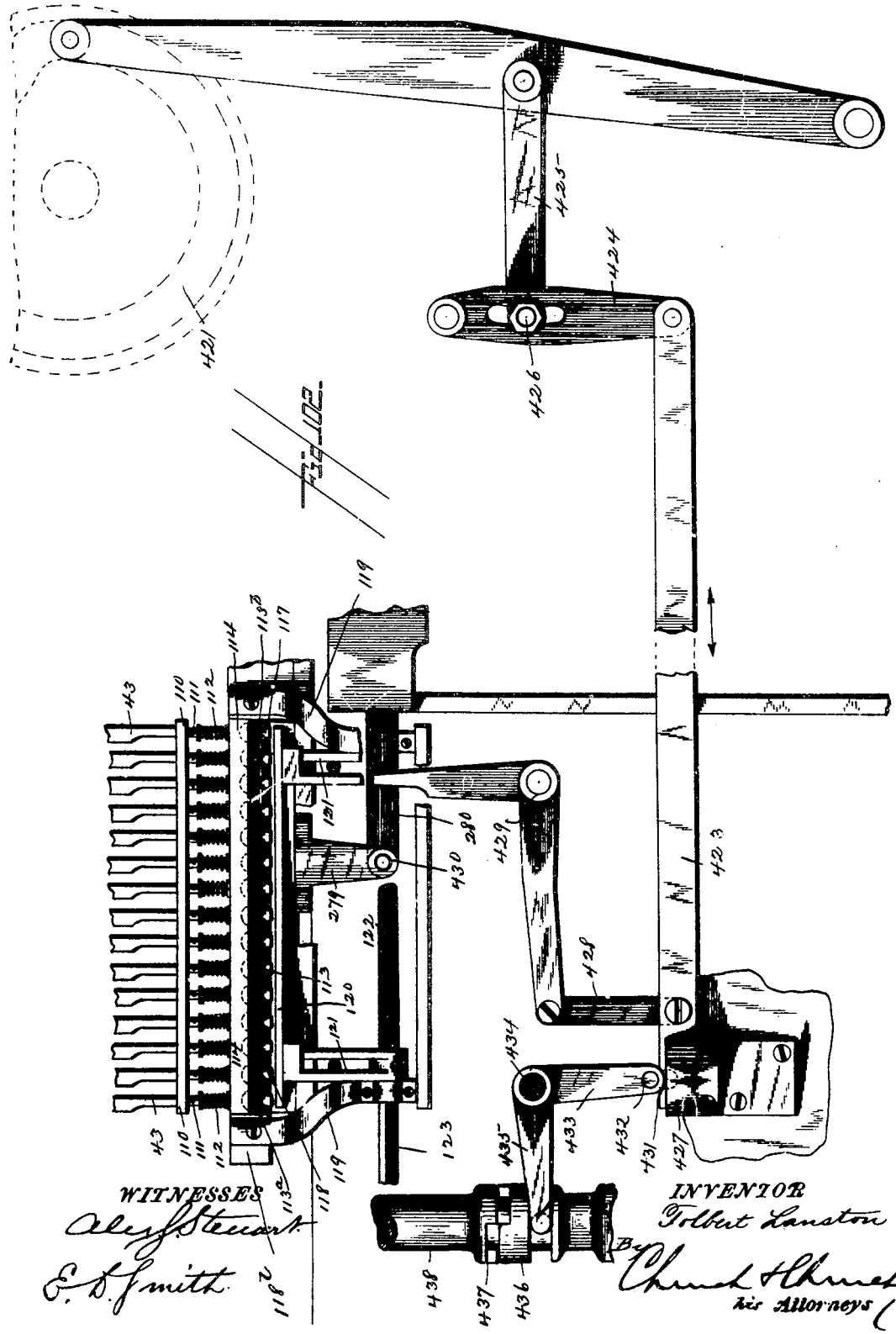

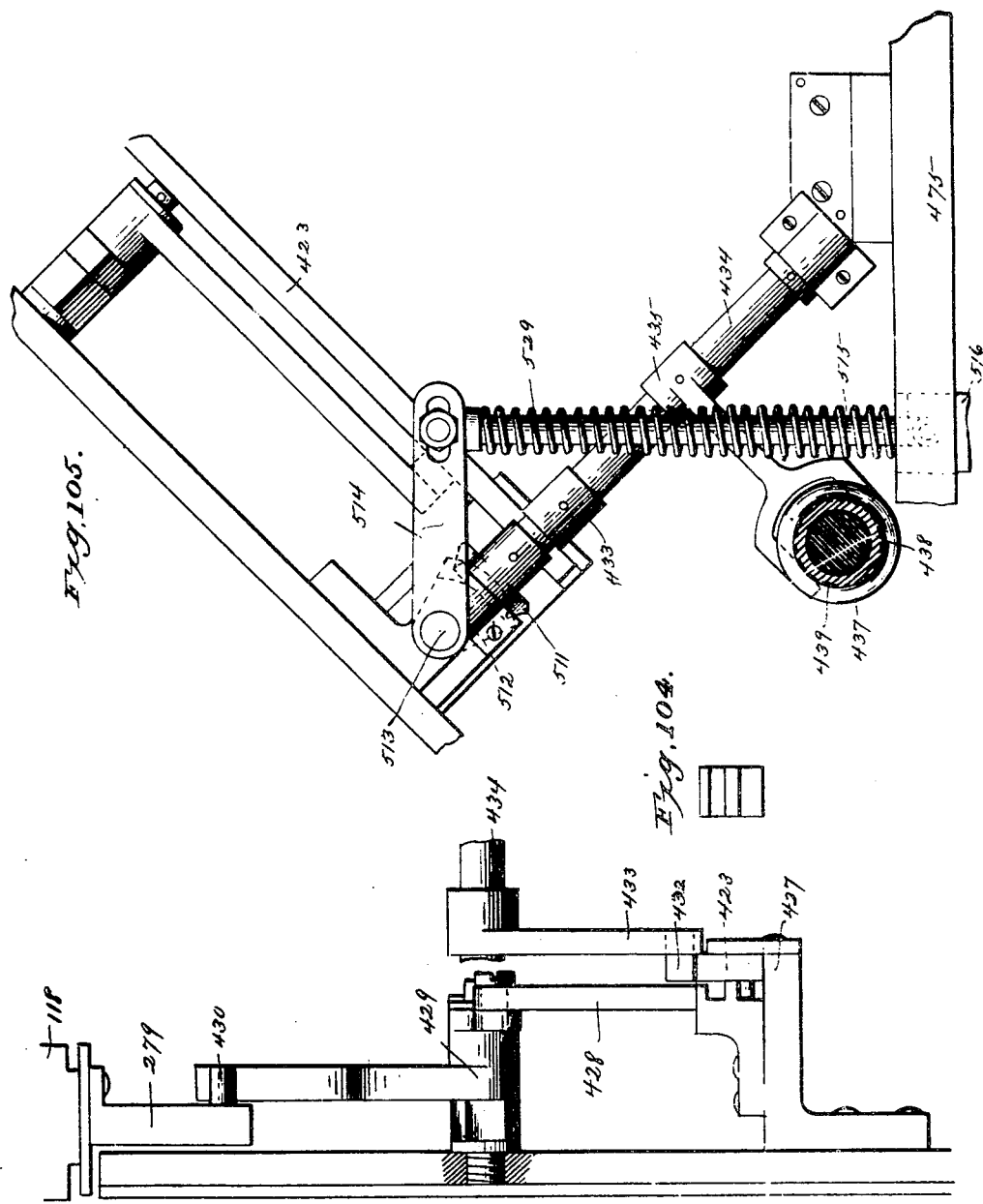

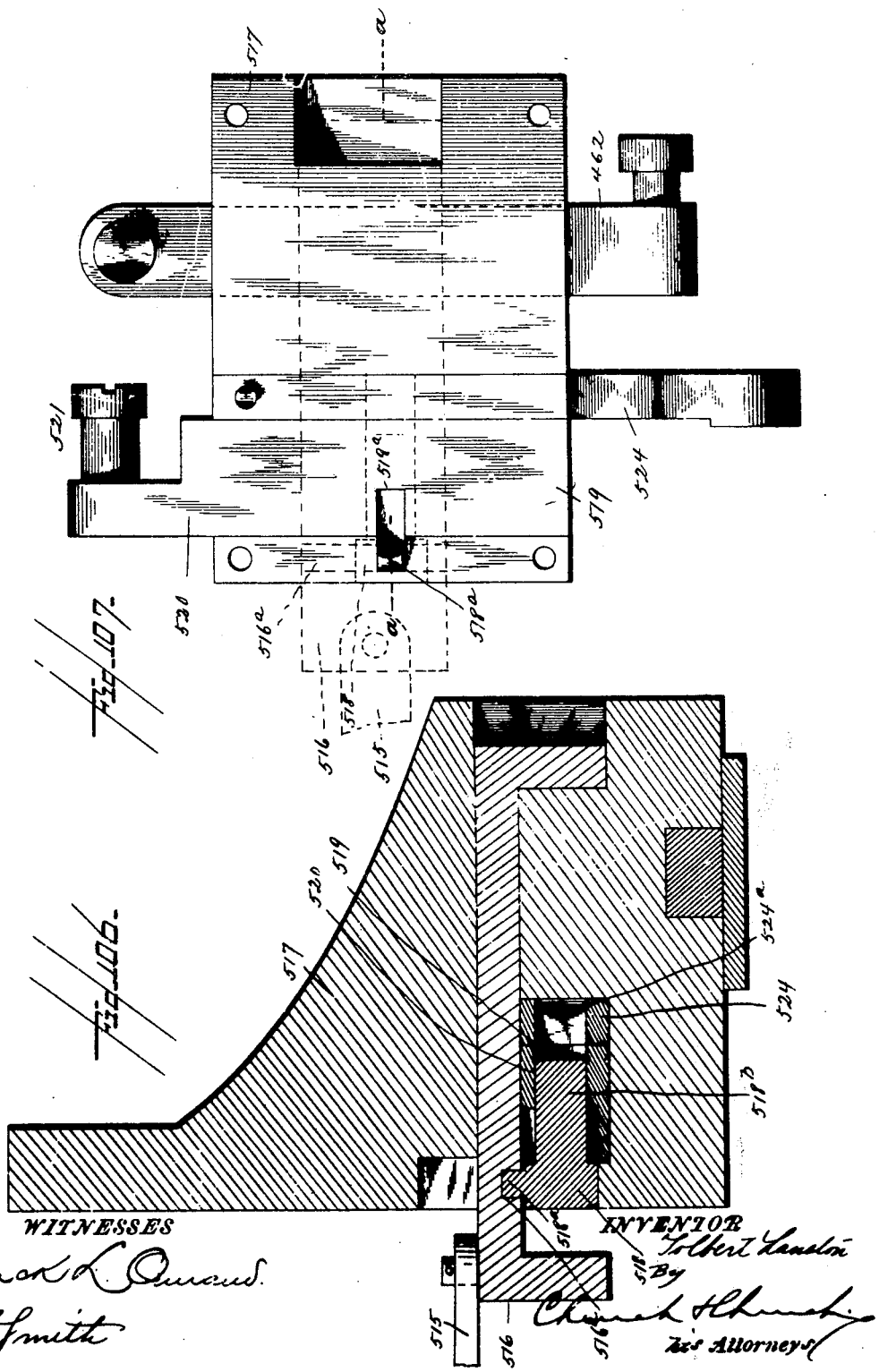

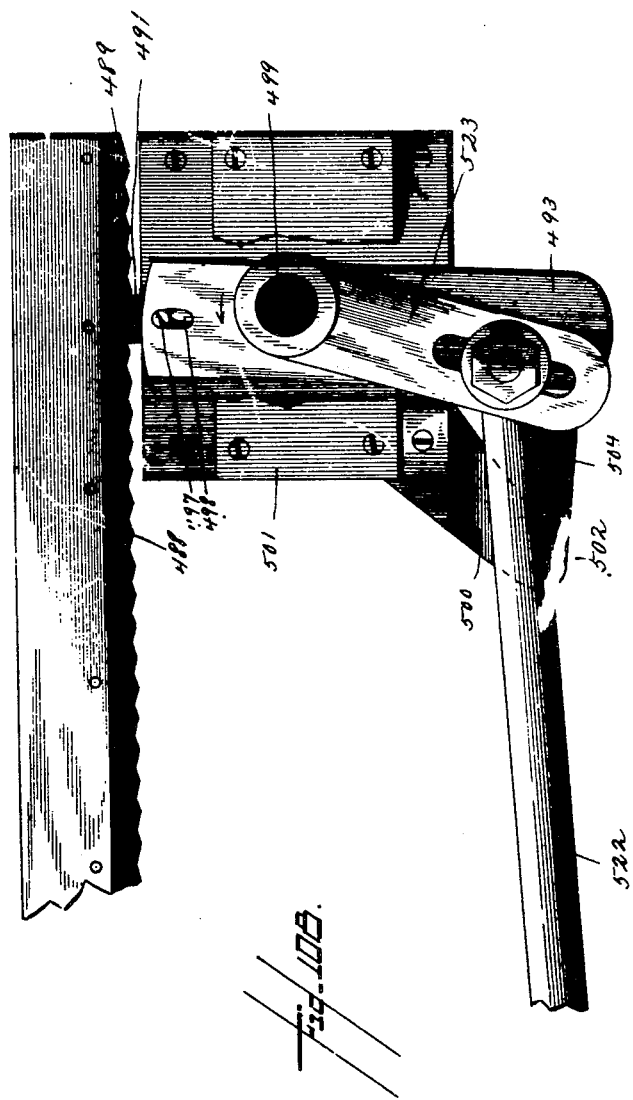

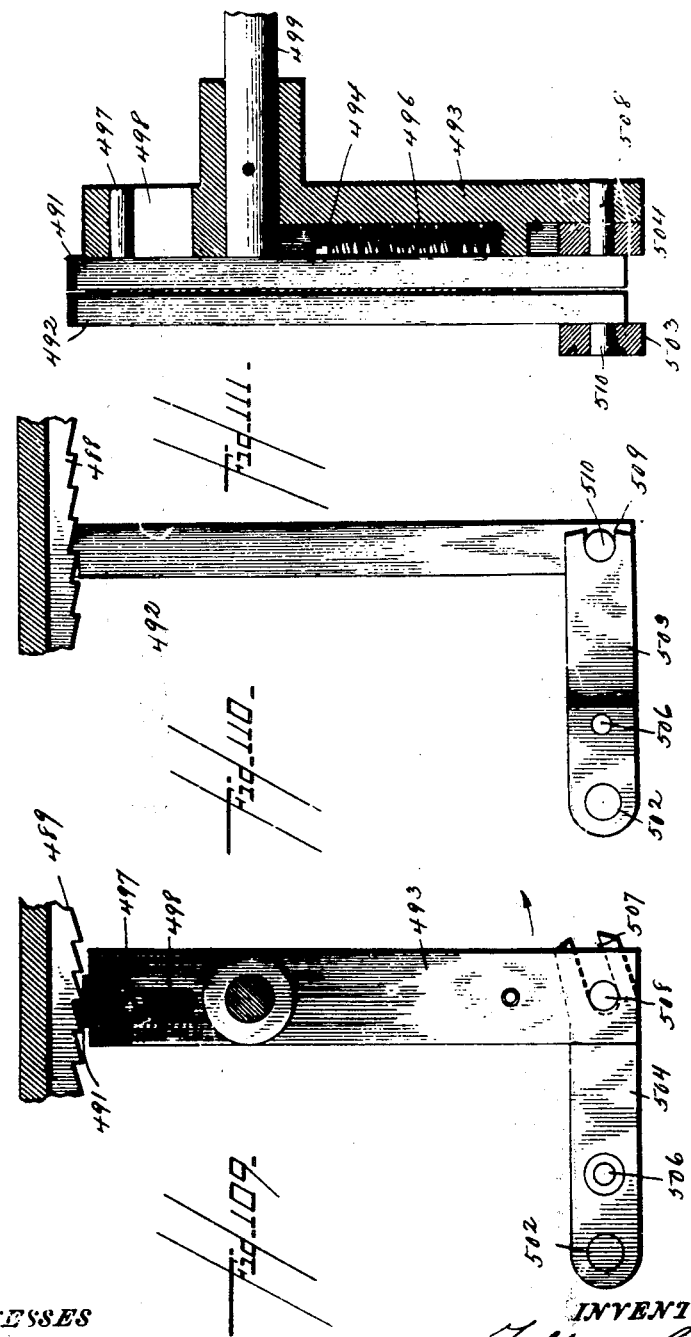

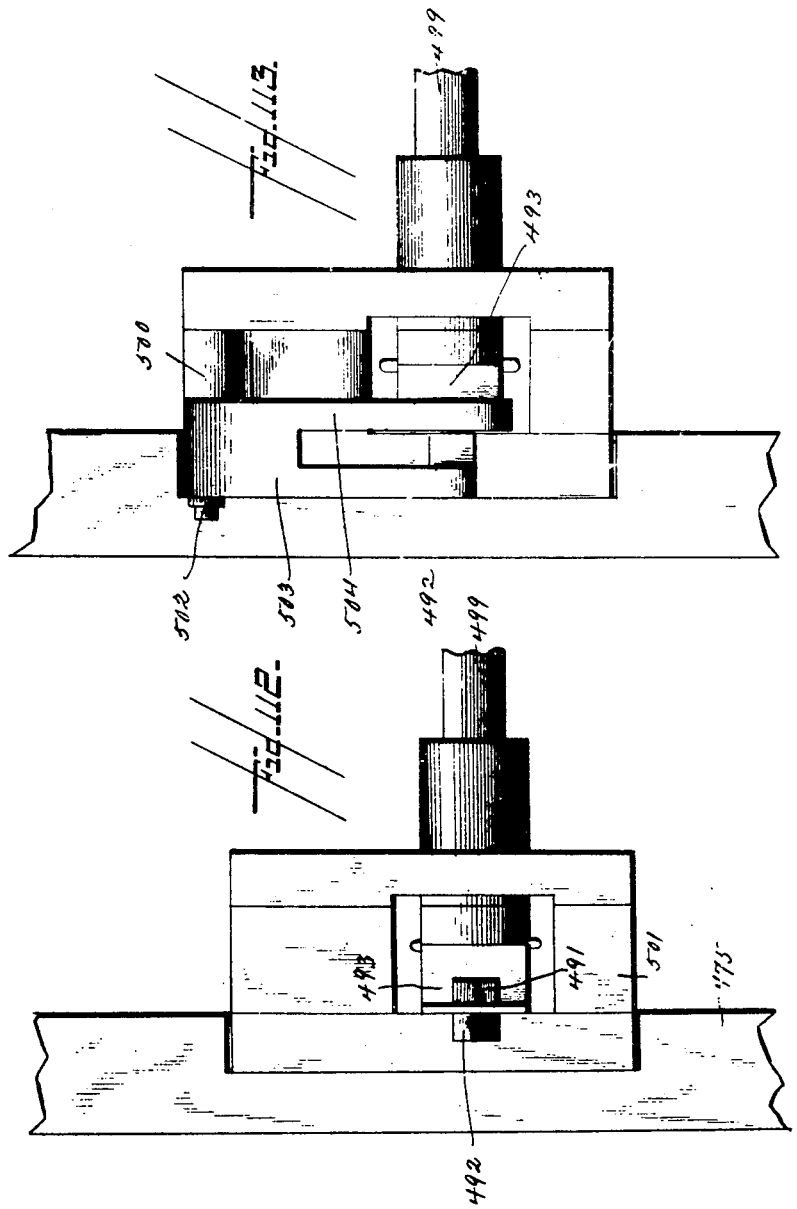

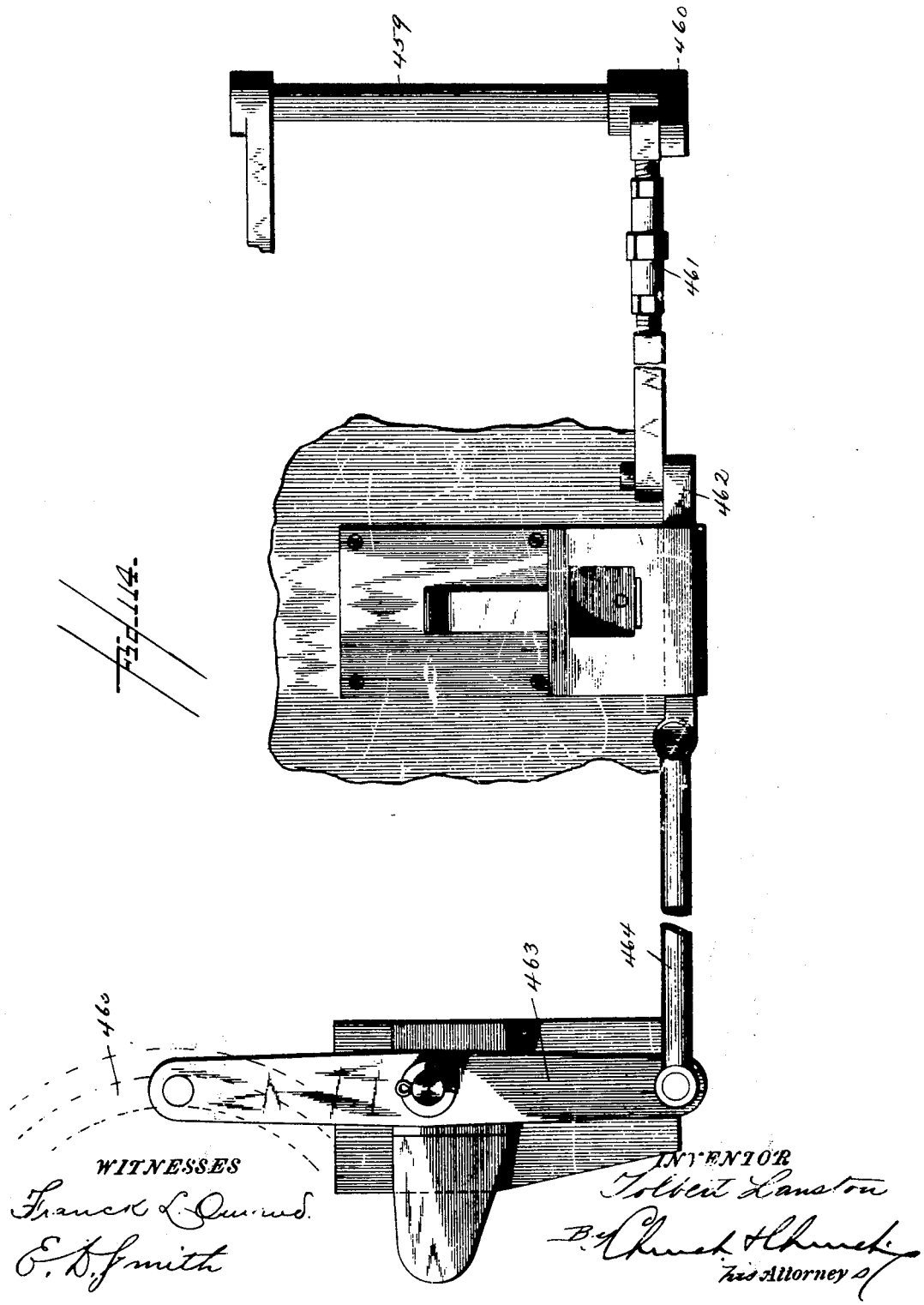

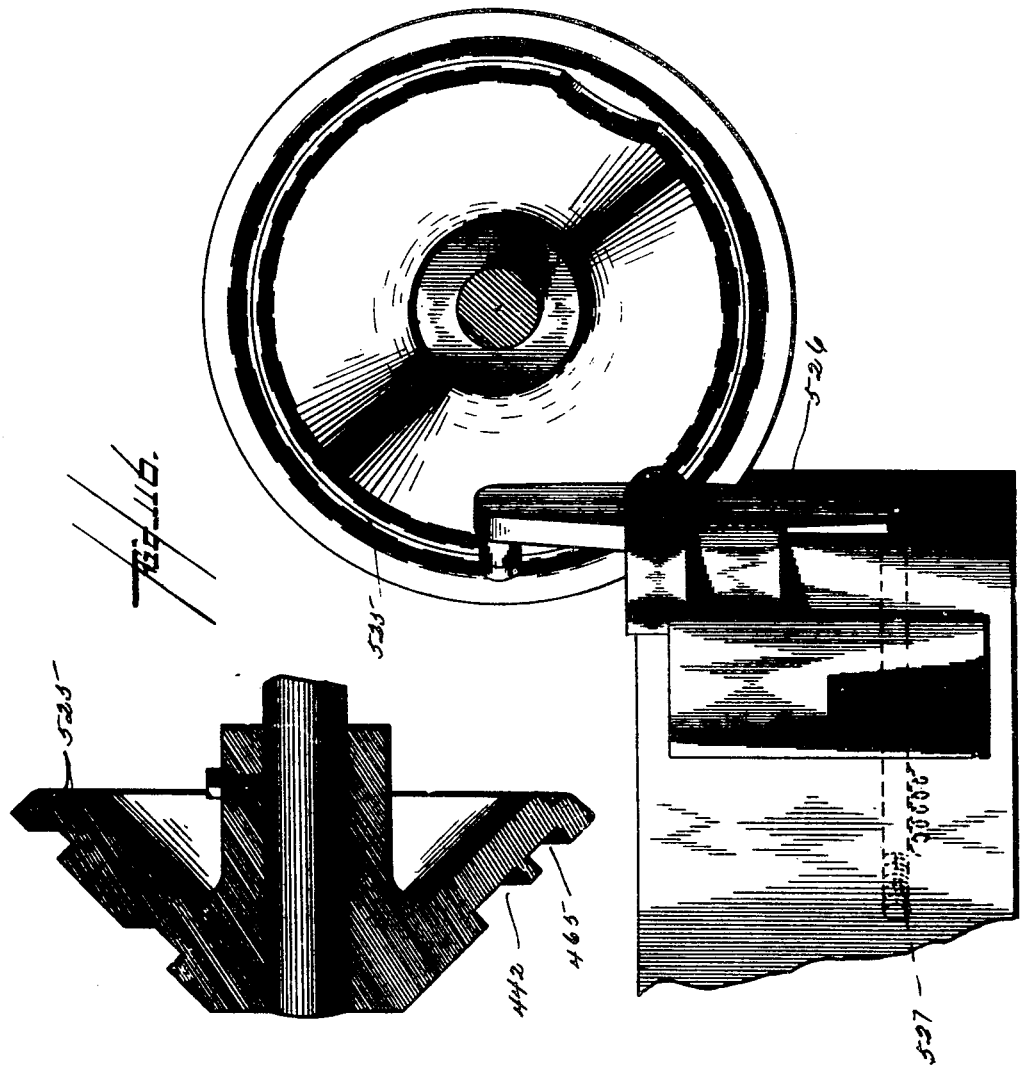

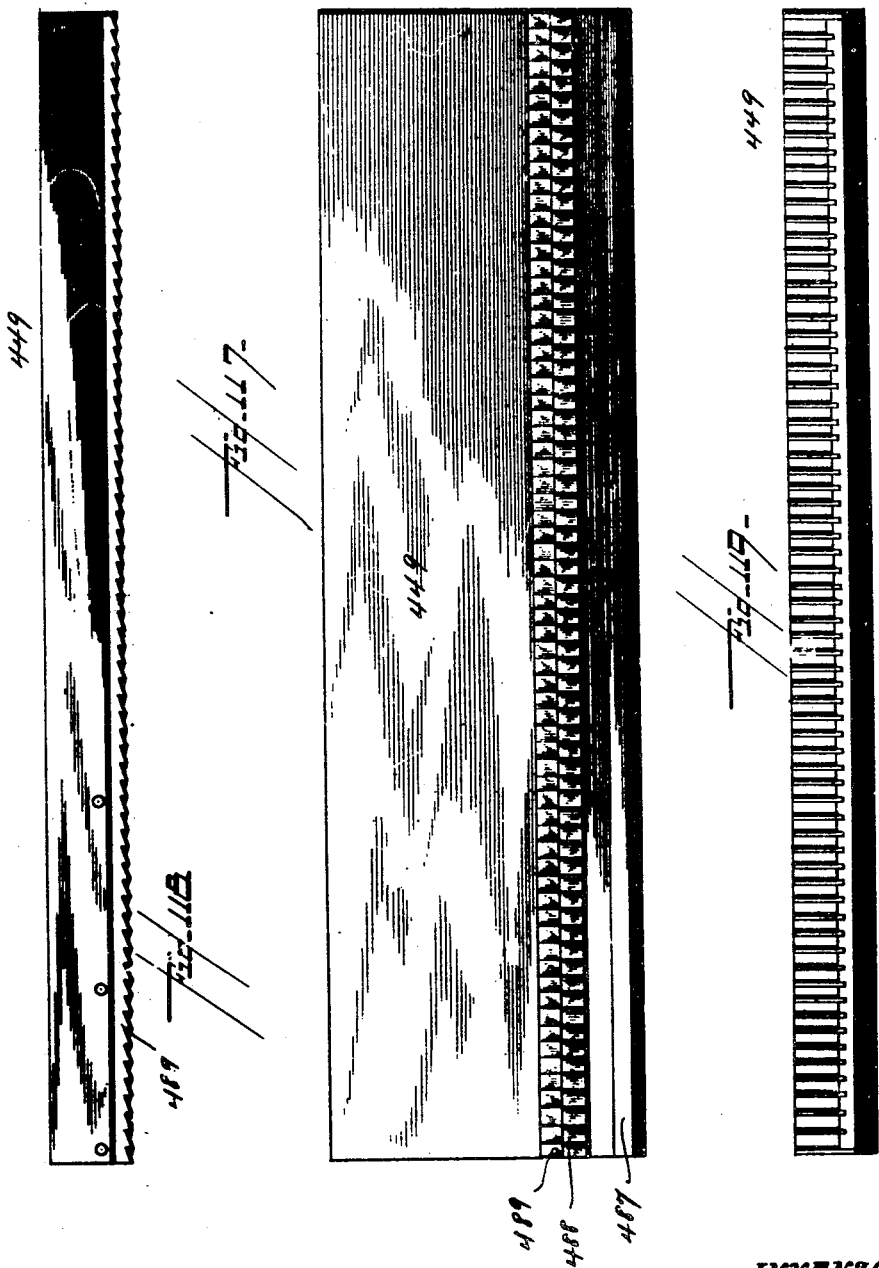

(No Model.) 76 Sheets—Sheet 76.
T. LANSTON.
MACHINE FOR MAKING JUSTIFIED LINES OF TYPE.
No. 557,994. Patented Apr. 7, 1896.
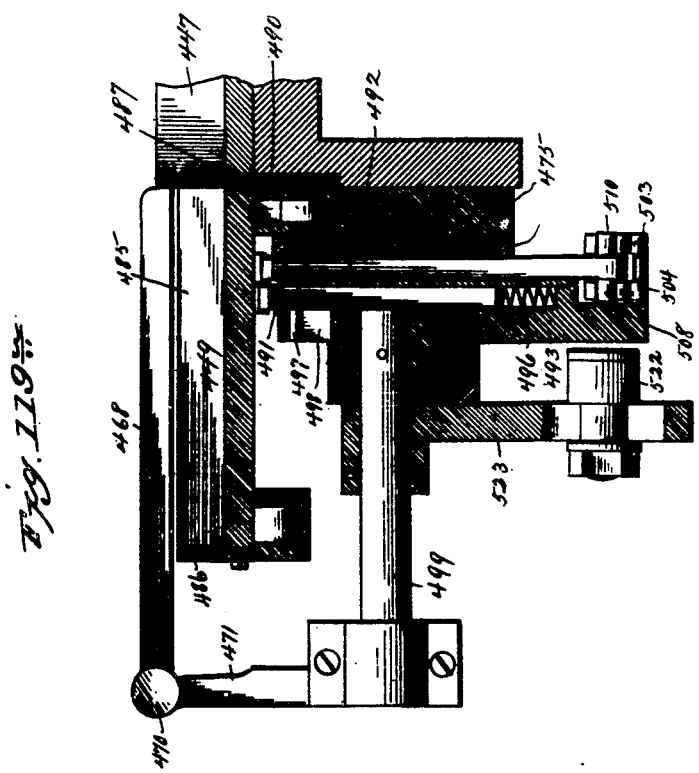
Witnesses
Inventor
Tolbert Lanston
By his Attorneys

UNITED STATES PATENT OFFICE.

TOLBERT LANSTON, OF WASHINGTON, DISTRICT OF COLUMBIA.

MACHINE FOR MAKING JUSTIFIED LINES OF TYPE

SPECIFICATION forming part of Letters Patent No. 557,994, dated April 7, 1890.

Application filed August 11, 1890. Serial No. 361,706. (No model.)

*To all whom it may concern:*

Be it known that I, TOLBERT LANSTON, of Washington, in the District of Columbia, have invented certain new and useful Improvements in Machines for Making Justified Lines of Type; and I do hereby declare the following to be a full, clear, and exact description of the same, reference being had to the accompanying drawings, forming a part of this specification, and to the figures and letters of reference marked thereon.

This invention relates to improvements in that class of machines for making justified lines of type in accordance with the methods covered by Letters Patent of the United States No. 364,521, granted to me June 7, 1887, and is designed particularly as an improvement upon the machine shown, described, and claimed in Letters Patent No. 364,525, granted to me on said above-mentioned date.

I will premise with a general description of the parts of the present machine and what they accomplish in order that the detail description which is to follow may be more readily understood.

In this machine, as in my former patented one, two perforated strips or ribbons of paper are employed for rendering the machine operative to form type. In one of these strips special perforations are made for operating upon the devices controlled by that particular ribbon to adjust the machine for the formation of types for any particular line in such manner as that the bodies of some or all of said type (and in this machine the bodies of the space-type only) when formed by the machine will be varied from the normal in such degree that when all the type are assembled they will exactly fill the line, or, in other words, will produce a justified line, while corresponding perforations in both of the strips will operate to center one after another the several dies corresponding to the types which those perforations respectively designate, and set in action the type-forming mechanism, as well as the mechanism for assembling the completed type in lines and arranging the lines in a galley or form.

In this machine the dies or matrices are all arranged in a case that is controlled by two frames that slide at right angles to each other, so as to bring any particular die to a common centering-point, according to the amount of movement given said sliding frame respectively, the sliding frames themselves in turn being operated from movable pin-carriages that are provided with pins which, when projected, are adapted to coöperate with corresponding cam-grooves in certain rotary cam-cylinders. The projection of these pins into their corresponding cam-grooves in the cam-cylinders is effected through suitable intermediate mechanism controlled by the perforations in the paper record-strips. To illustrate this, let it be supposed that the matrix-die for the formation of the letter "A" is to be brought to the centering-point. In this instance the perforations representing the letter "A" in the two record-strips will, through the mechanism controlled by said perforations, project the corresponding pins of the two carriages on the right and left hand side of the machine into the rotary cam-cylinder, and the rotation of said cylinders will cause the pins and their carriages and the connected sliding frames to shift the die-case and bring the die A to the centering-point.

When the desired die has been brought to the centering-point, a plunger located above the die-case at said point is automatically depressed, so as to move down the centered die from out of the die-case to form the top of one of a series of molds in a rotating mold-wheel located beneath the die-case in which the type is to be formed, and after the die has thus been brought into coöperation with the said mold a nozzle leading from a reservoir of hot type-metal is automatically inserted in the bottom of the mold, and by automatic pumping mechanism hot metal is forced into the mold to form the type, after which the die-depressing plunger and the pump-nozzle and the die-centering devices resume their normal positions. The mold, with the type within it, is rotated through a portion of the circle, so as to bring a new mold into position at the centering-point and so as to enable the formed type to be ejected into a trough or guide, where it remains until the types for the whole of the proposed line have been brought, one after another, into said trough or guide behind it, when the whole line is by certain automatic appliances swept or slid into a galley prepared for its reception, the galley in turn being automatically advanced after the reception of each line of type.

Having thus given an outline of the present machine, I will now proceed to describe it in detail with reference to the accompanying drawings, in which—

Figure 2:
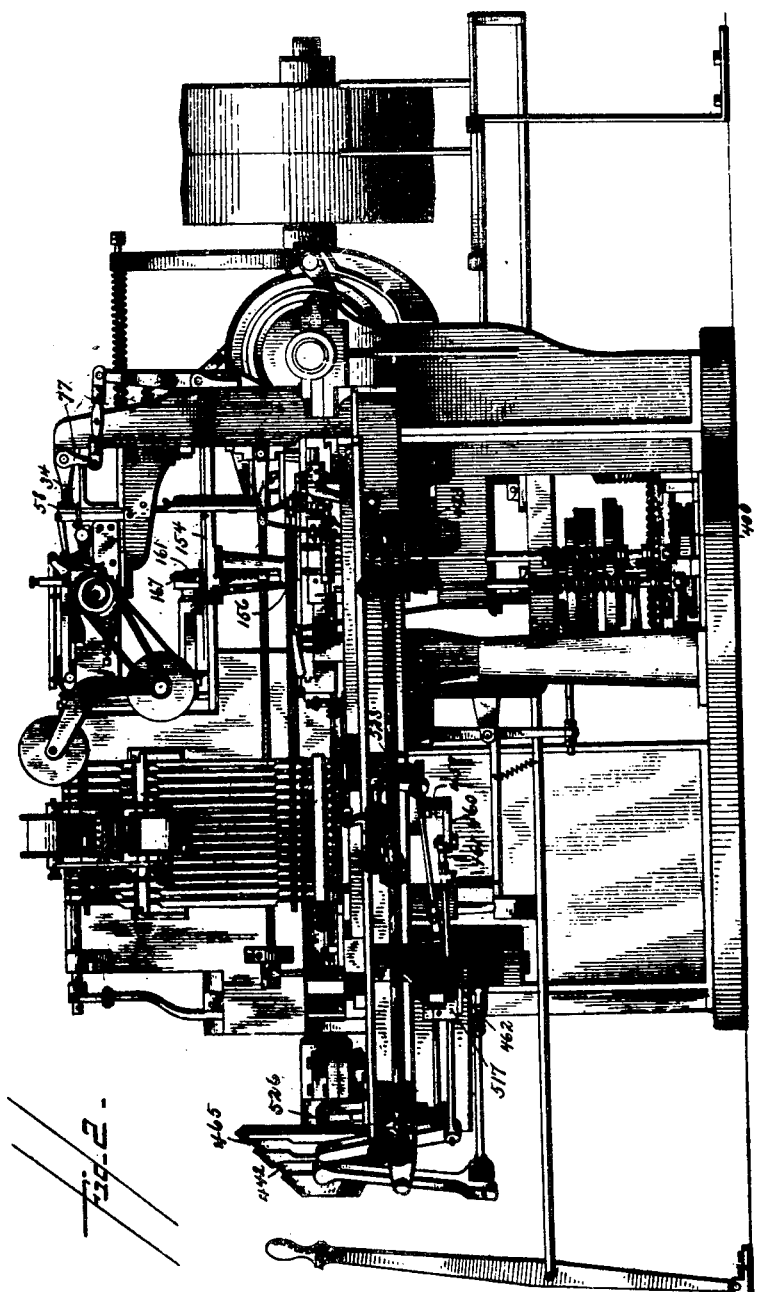
Figure 3:
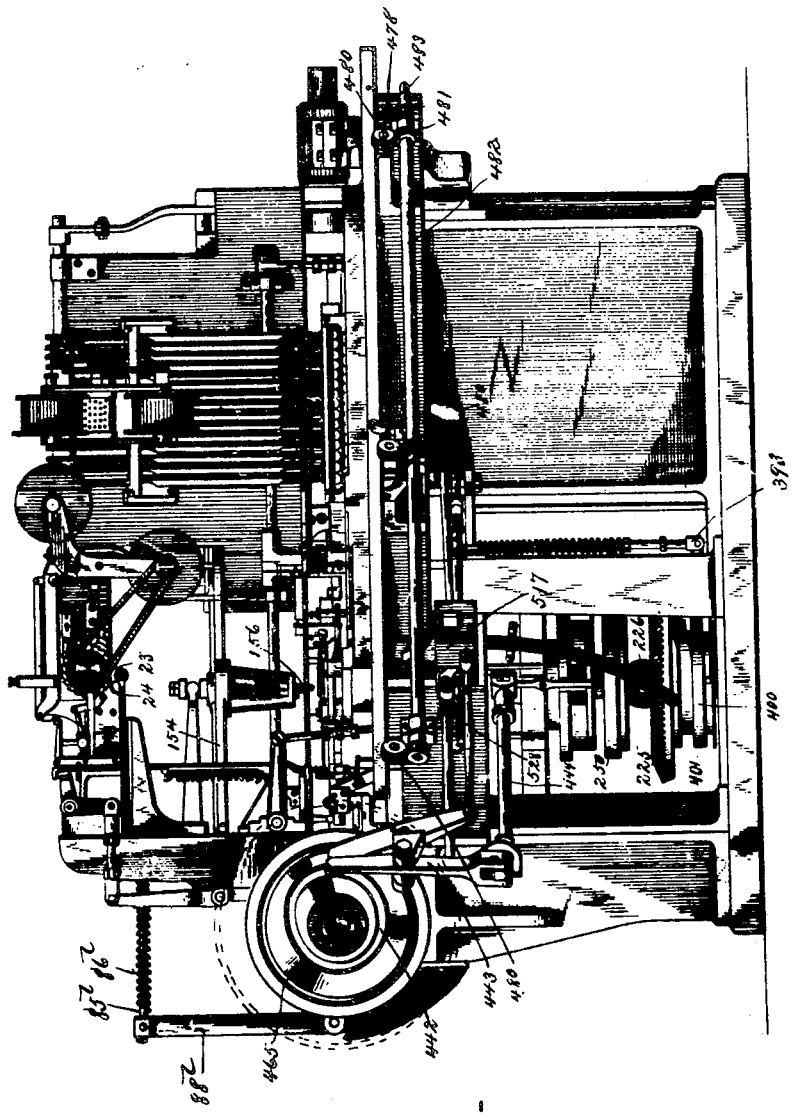
Figure 4:
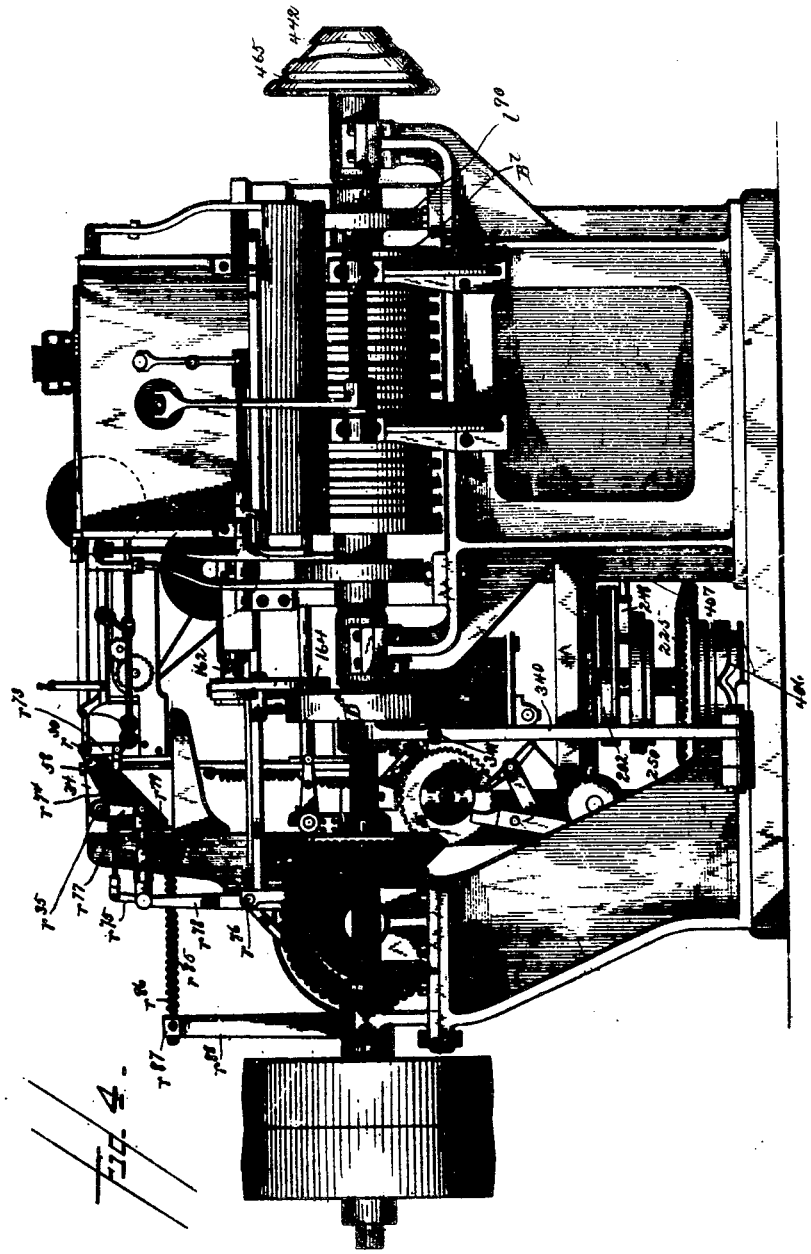
Figure 5:
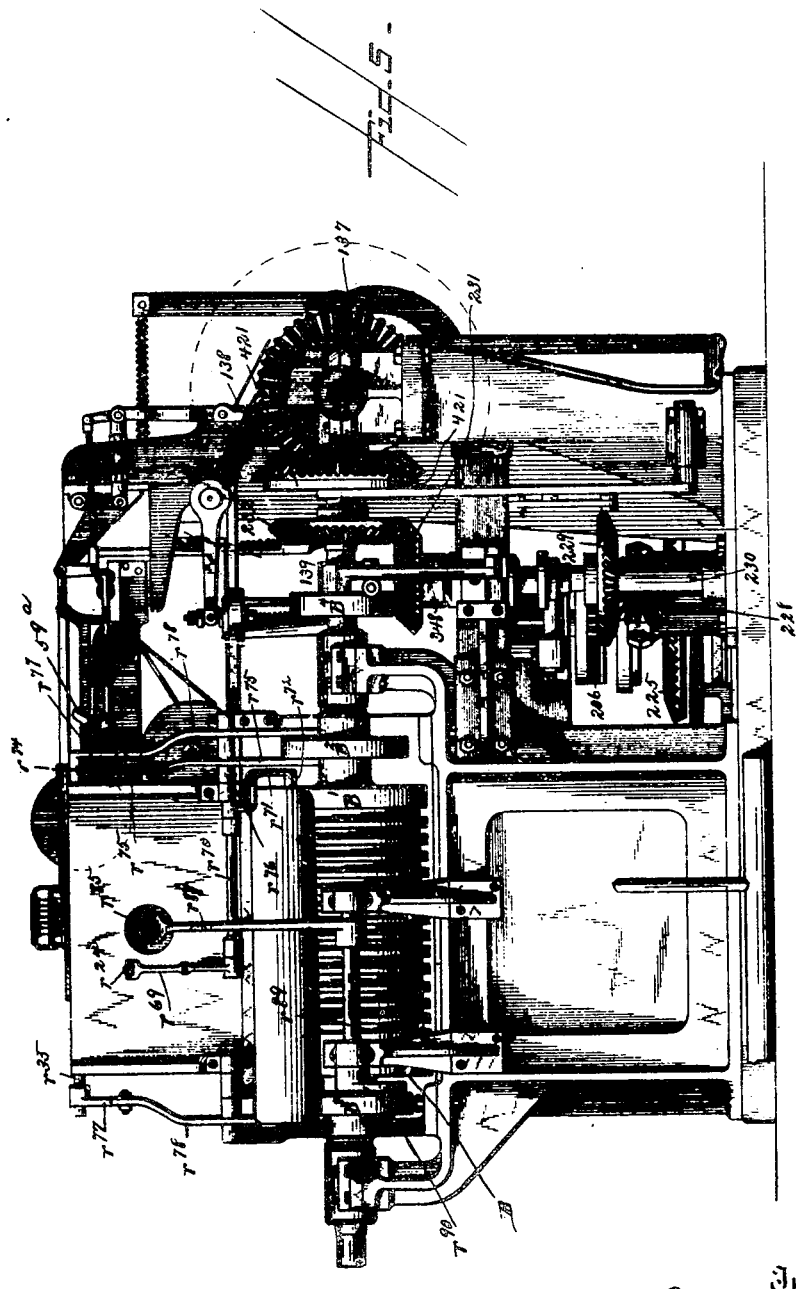
Figure 6:
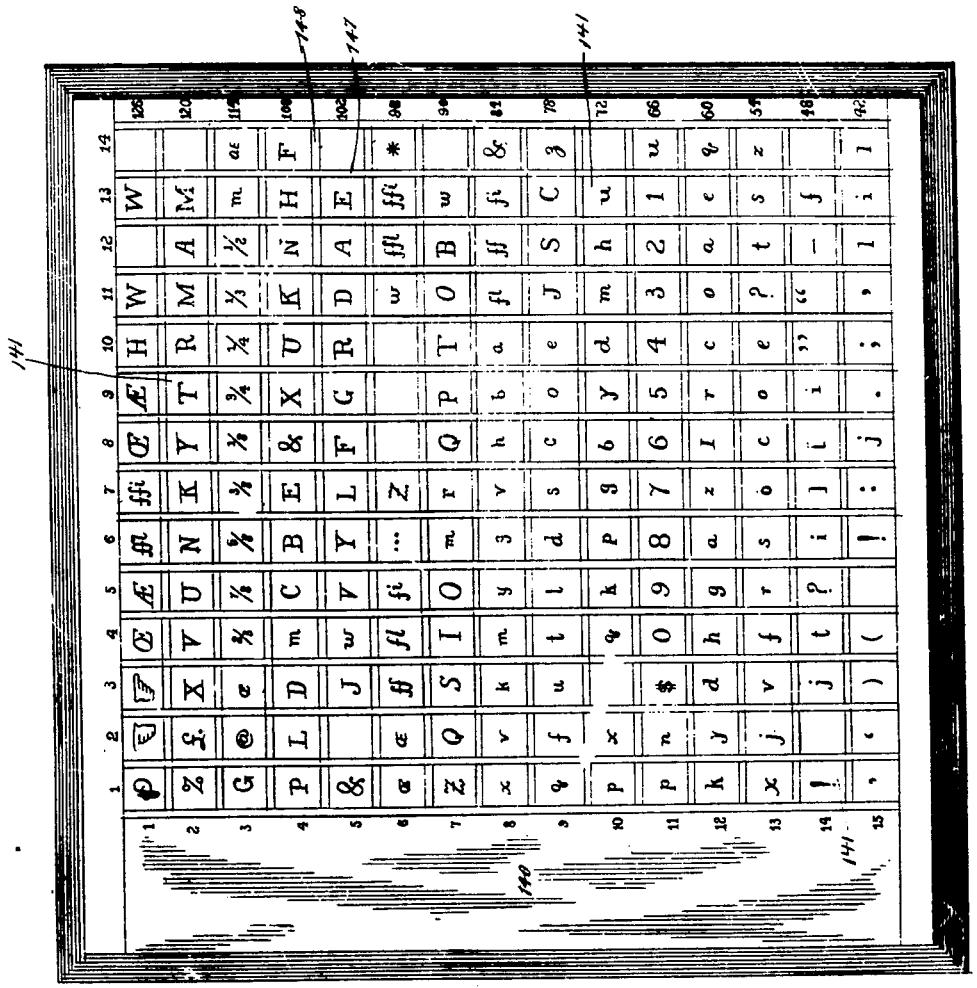
Figure 7:
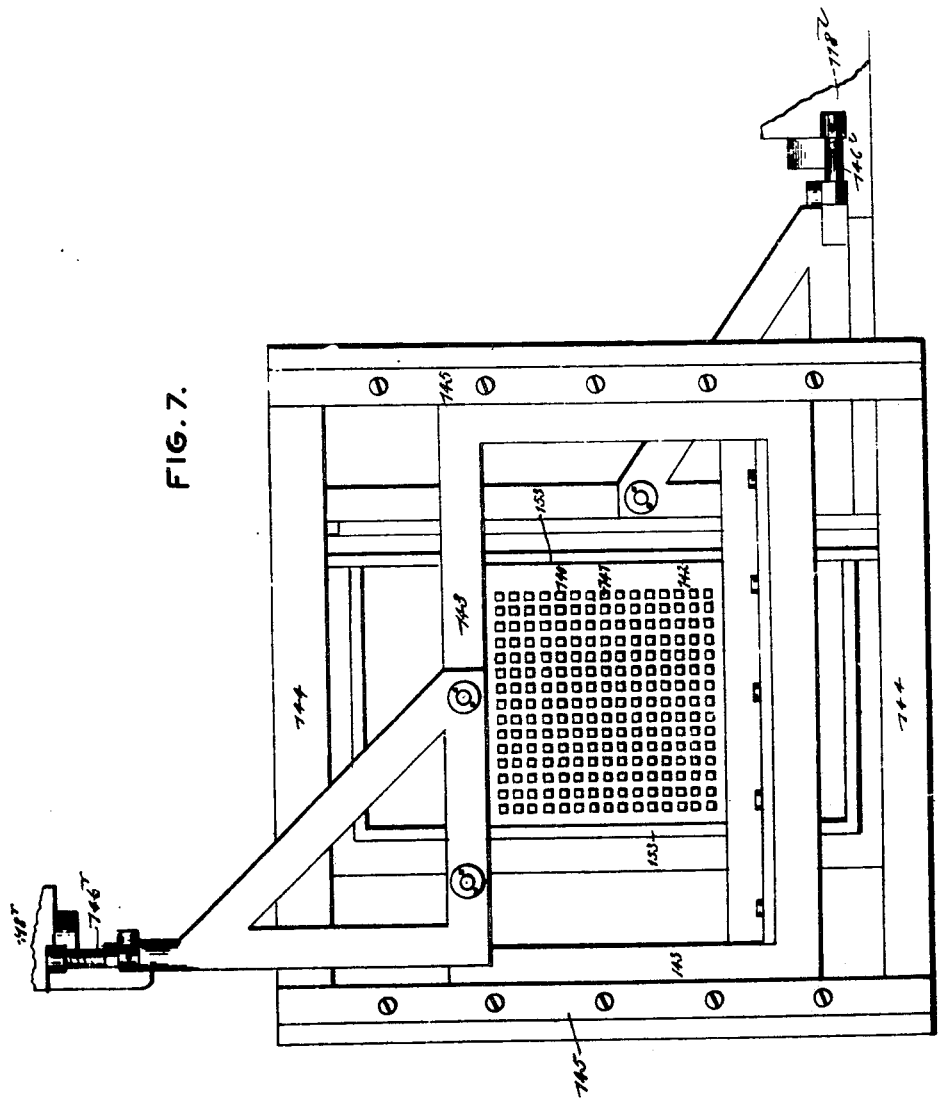
Figure 8:
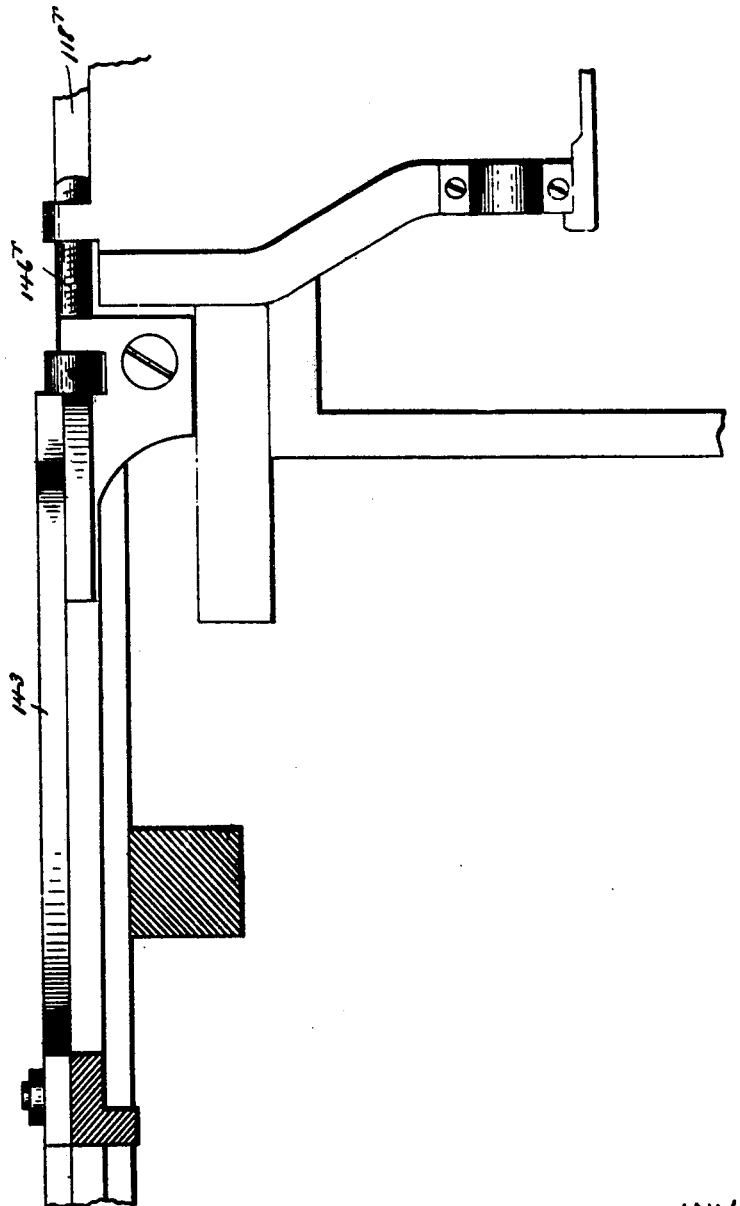
Figure 9:
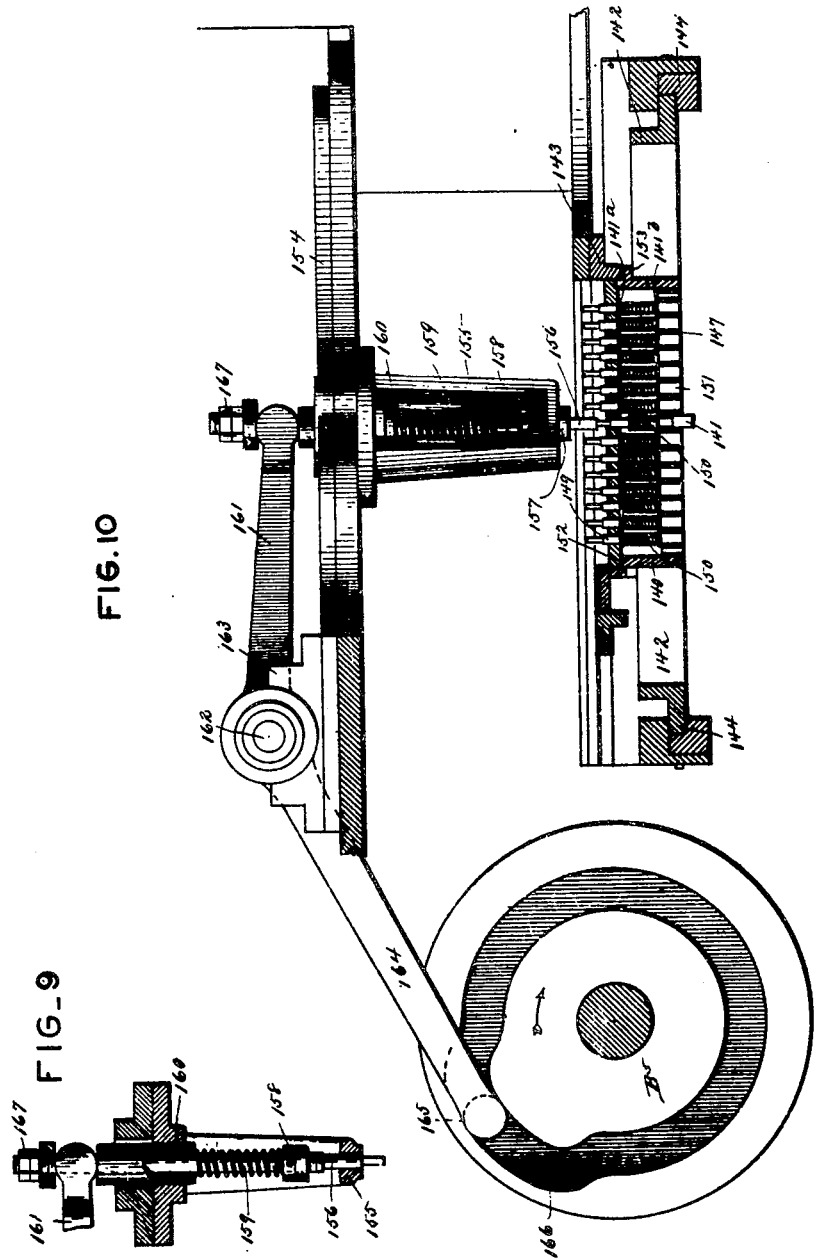
Figure 10:
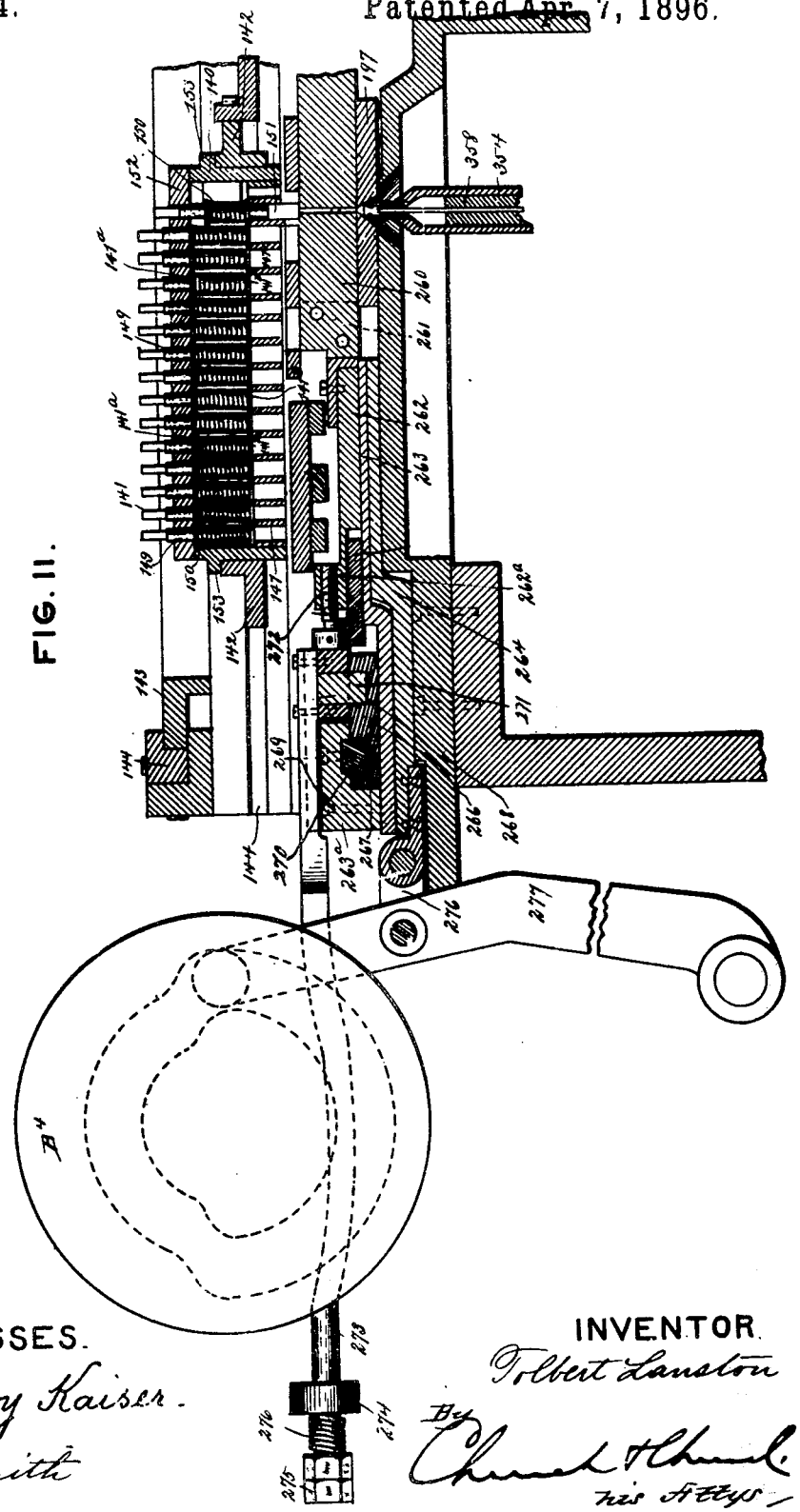
Figure 11:
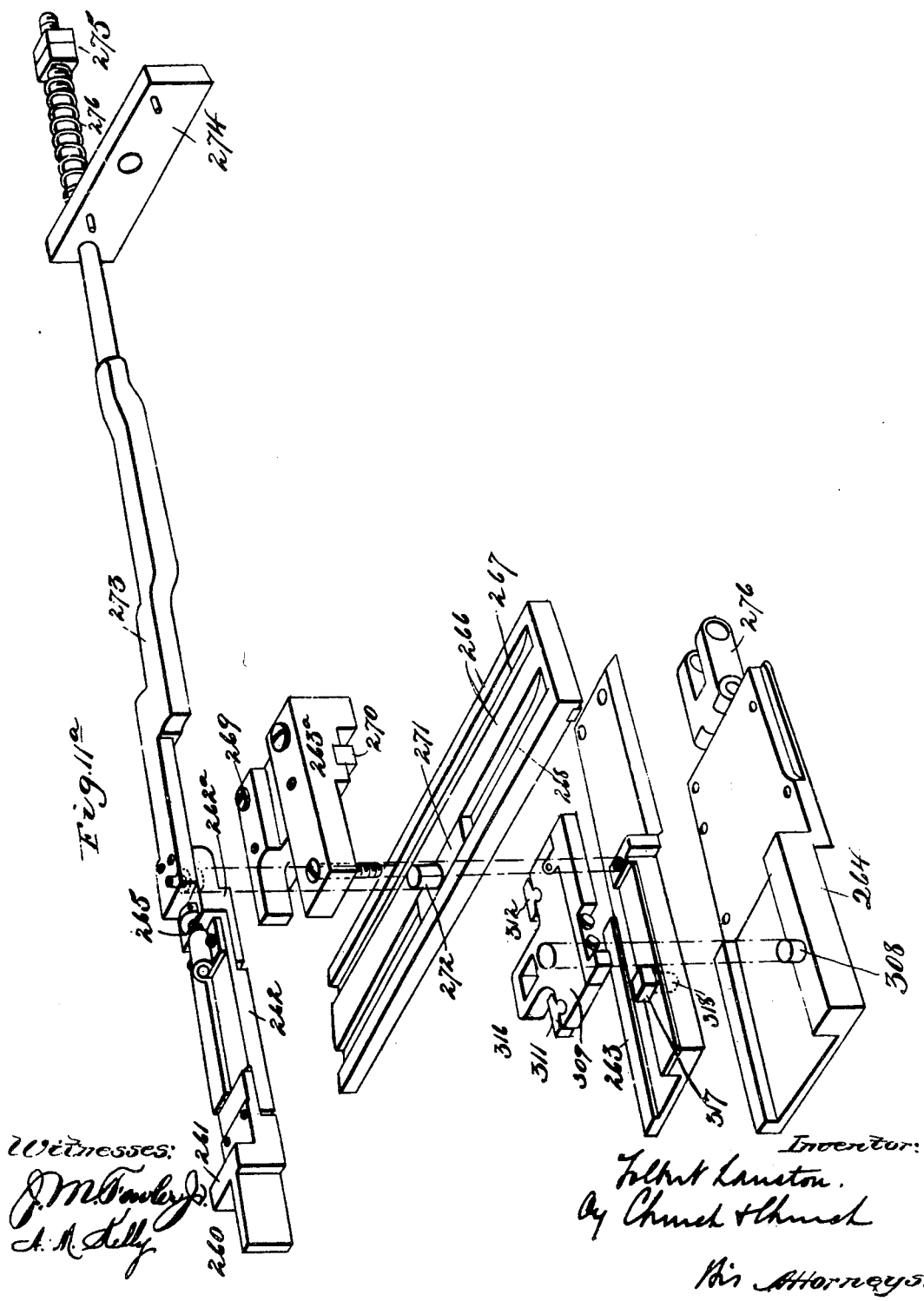
Figure 12:
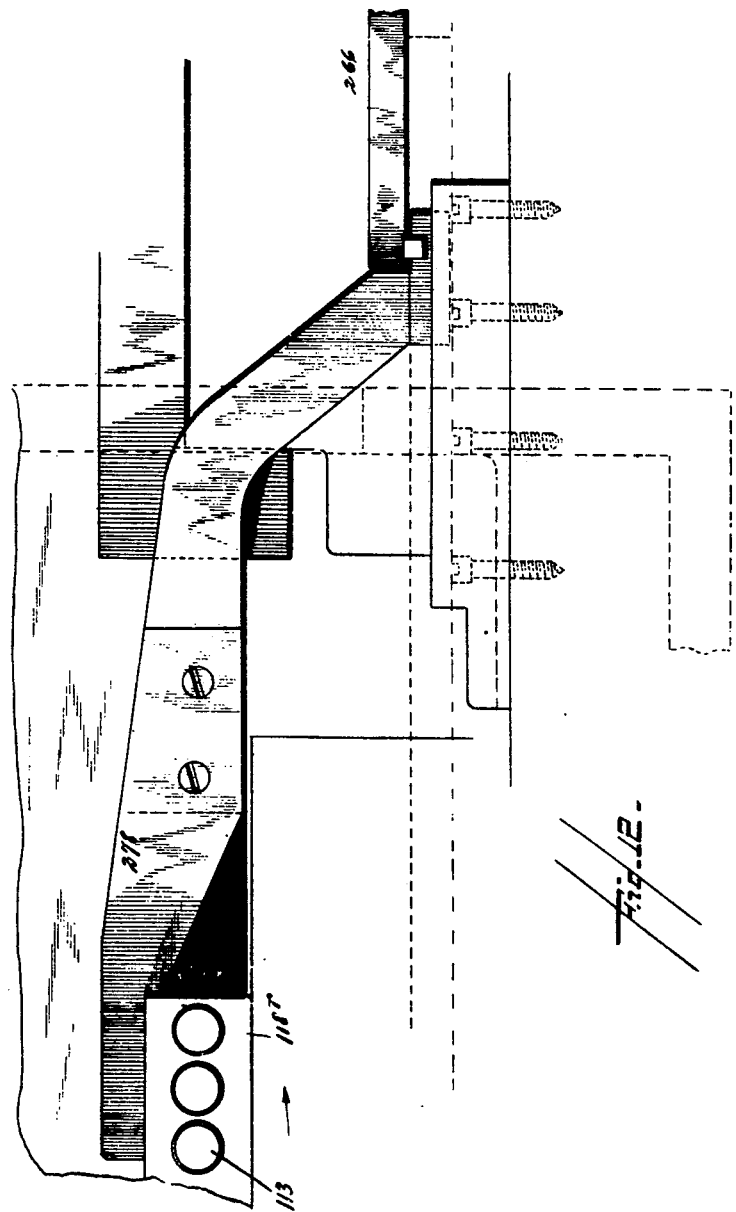
Figure 15:
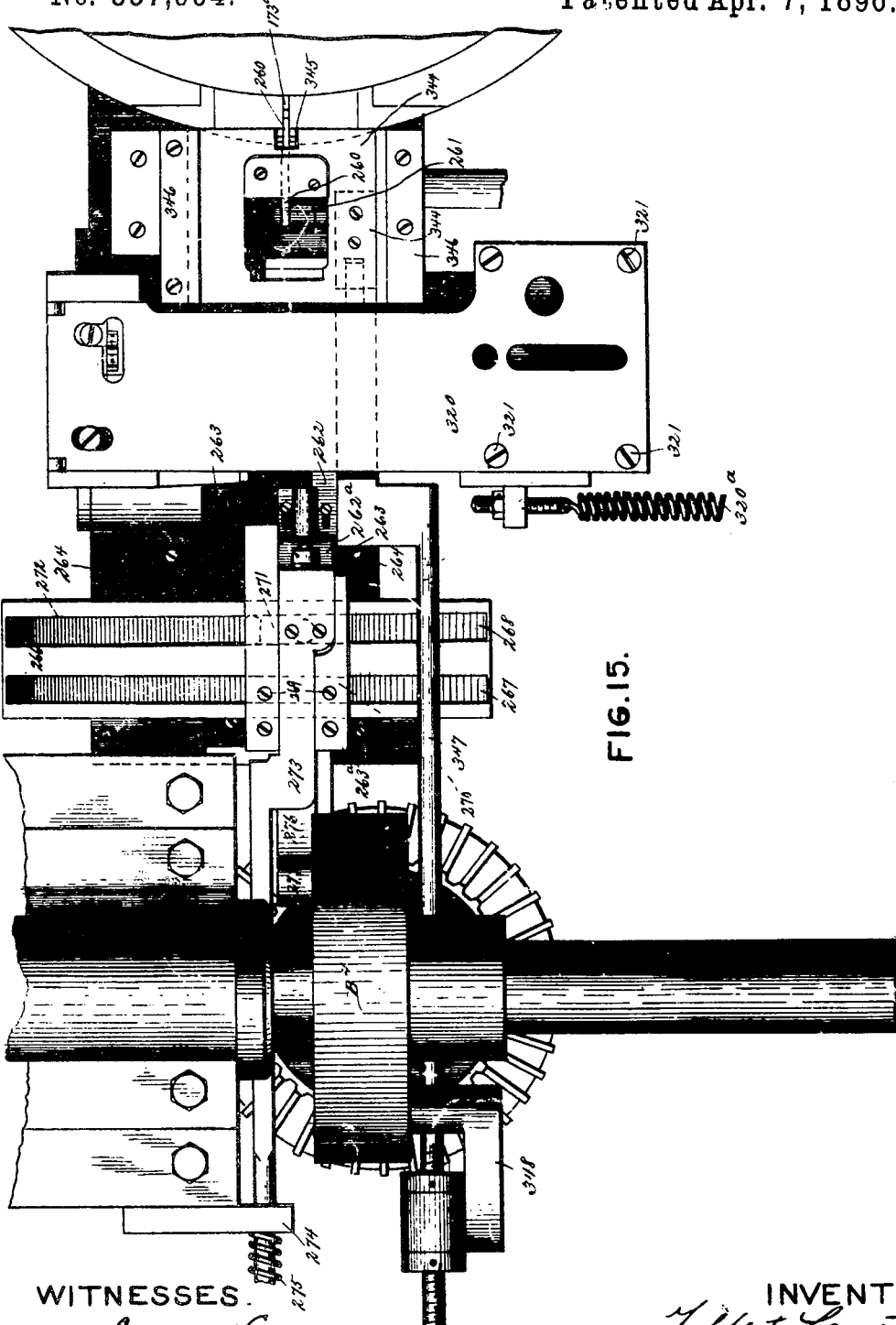
Figure 16:
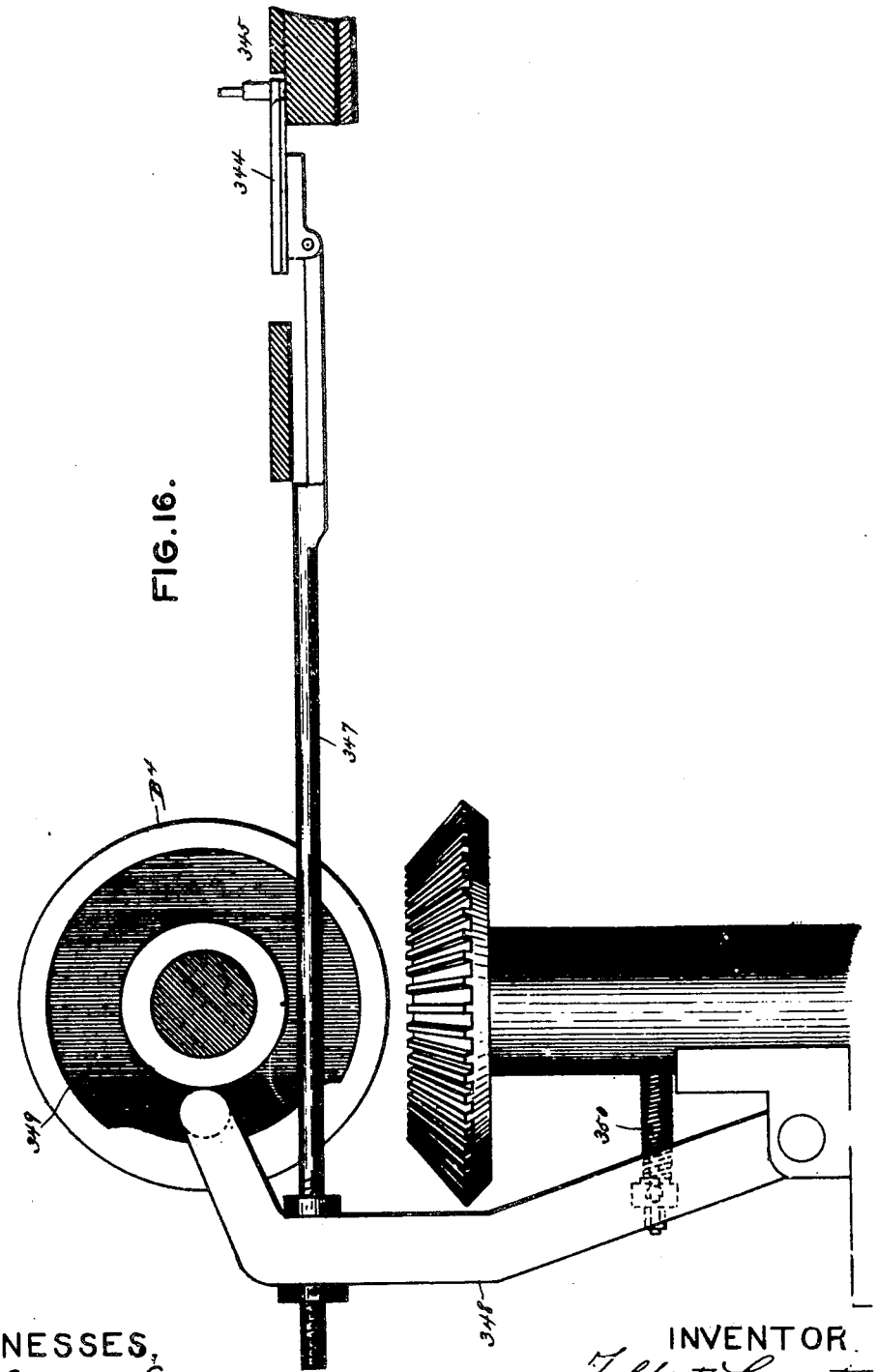
Figure 17:
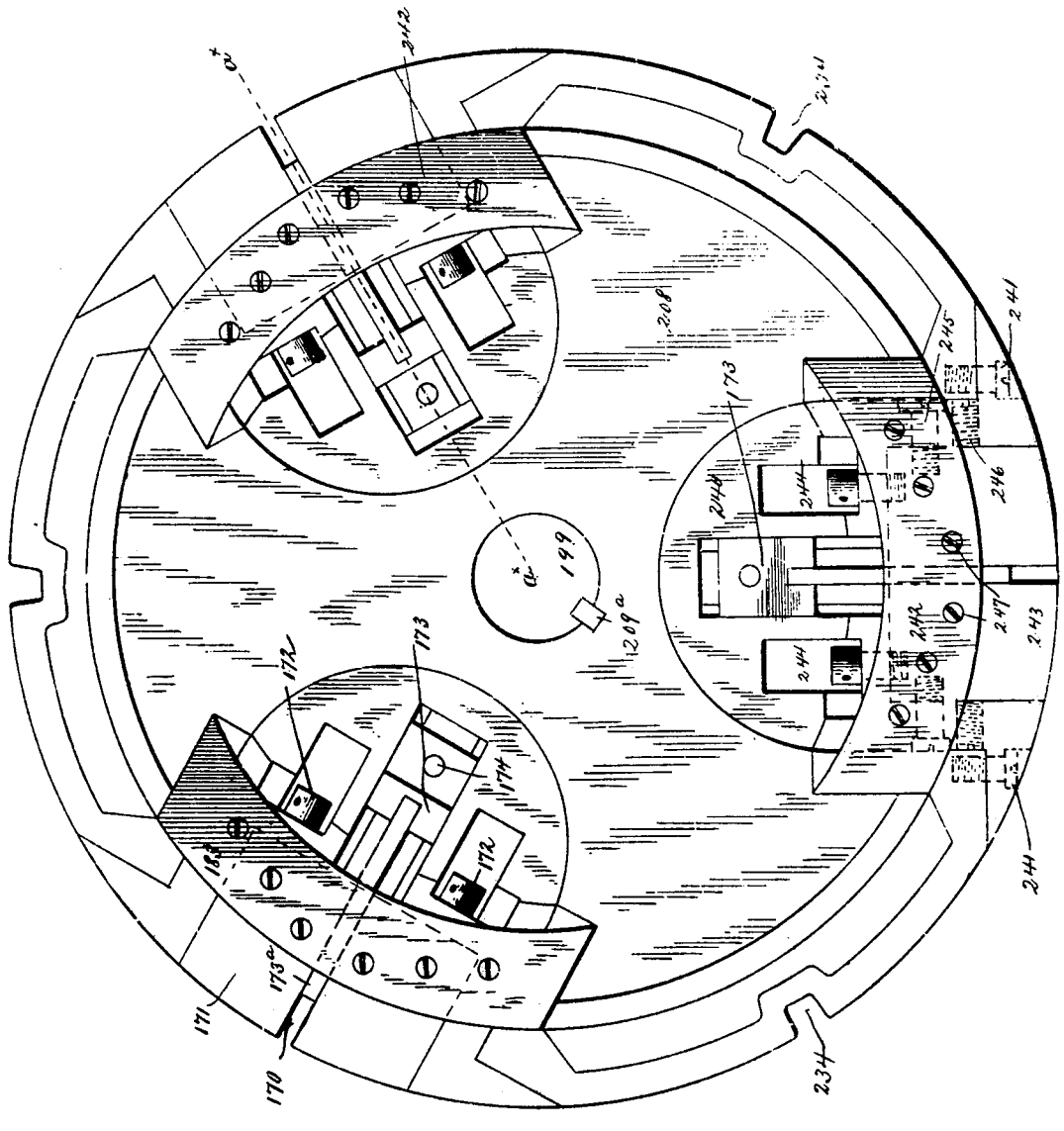
Figure 22:
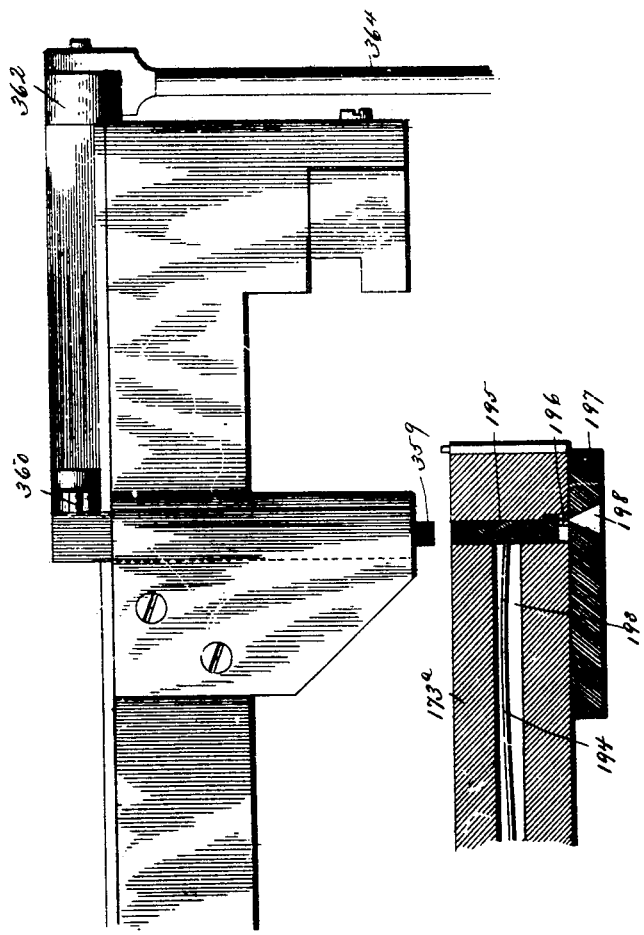
Figures 30, 31:
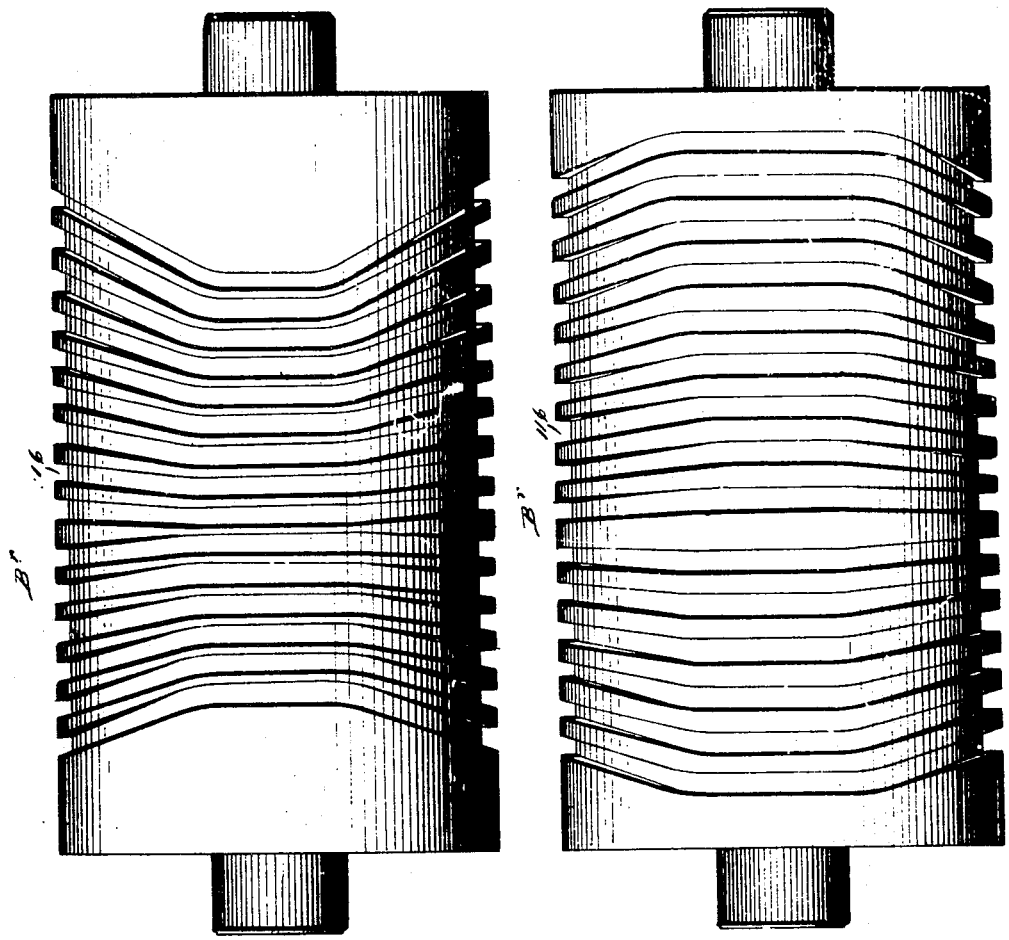
Figures 32, 33:
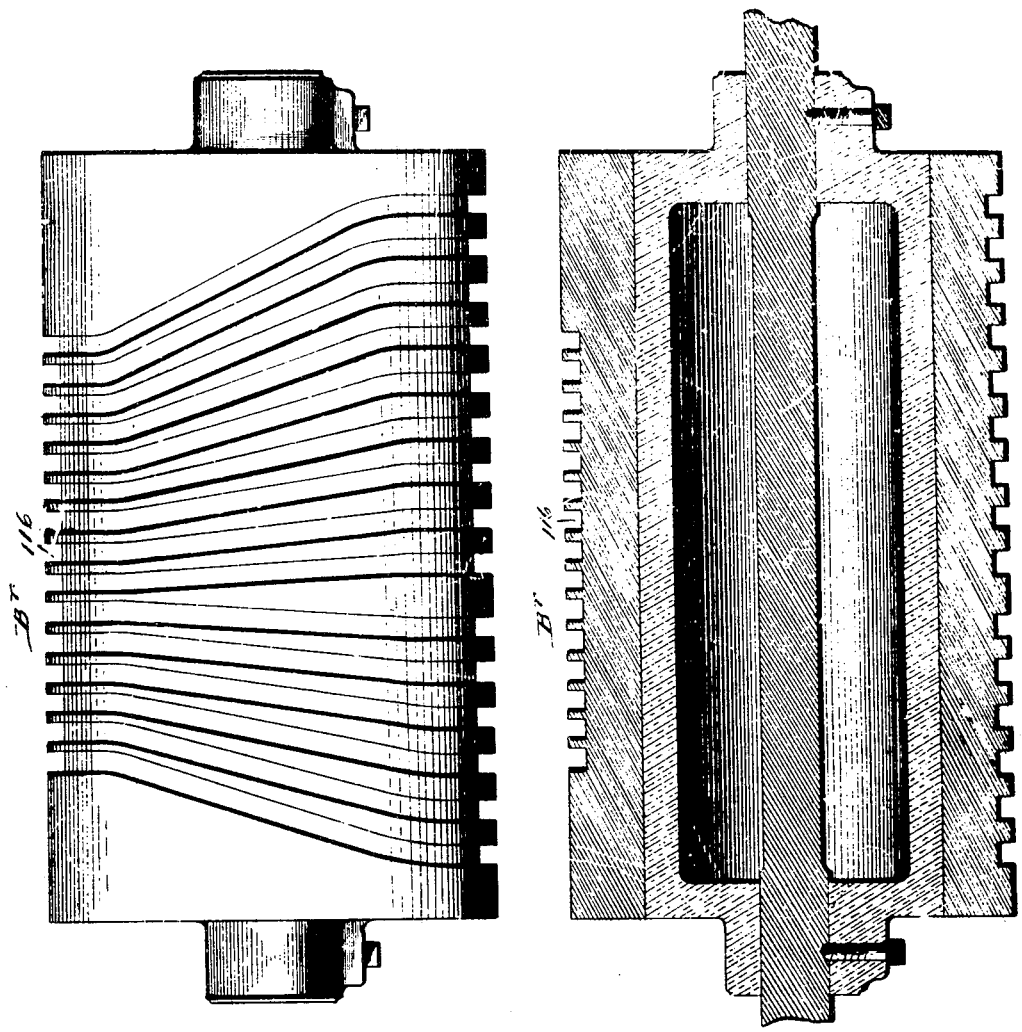
Figure 73:
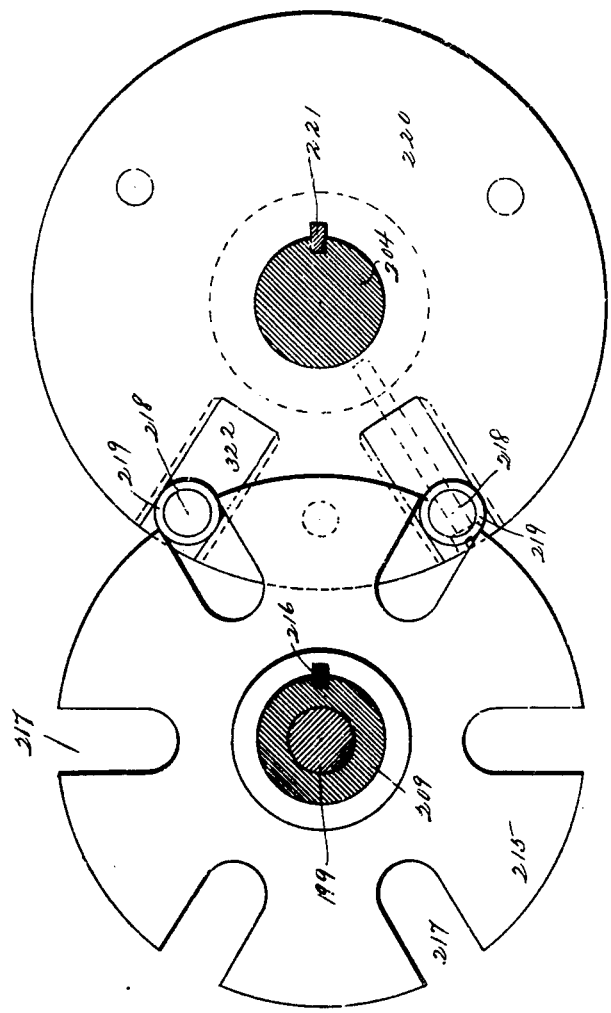
Figure 74:
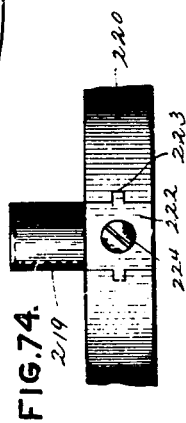
Figure 75:
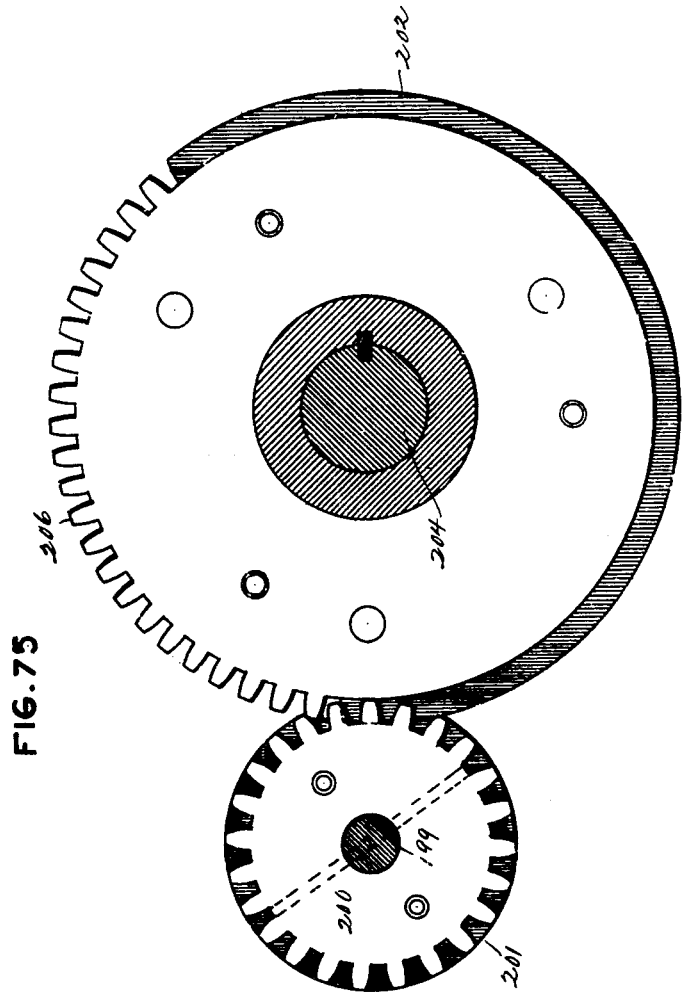
Figure 76:
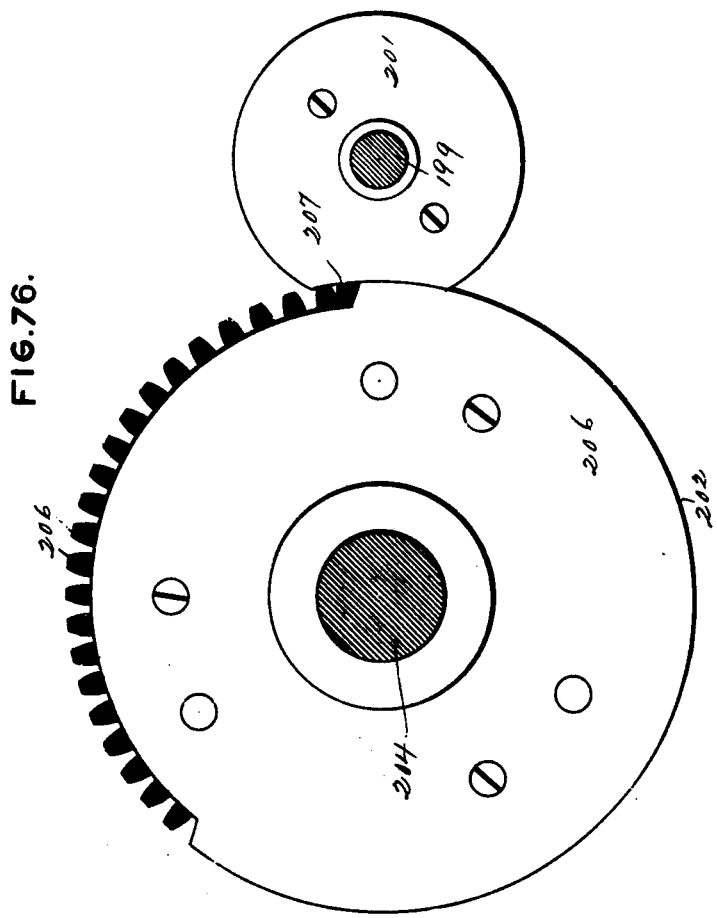
Figure 81:
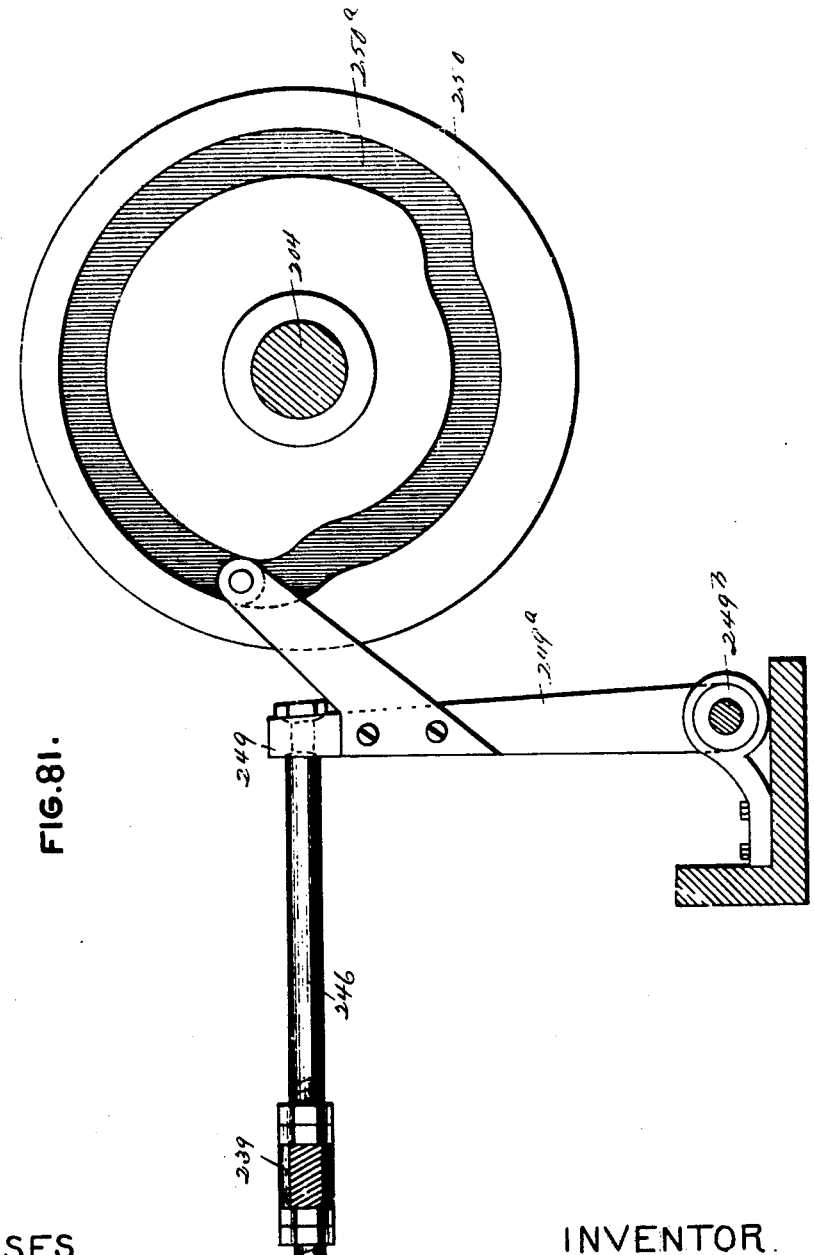
Figure 99:
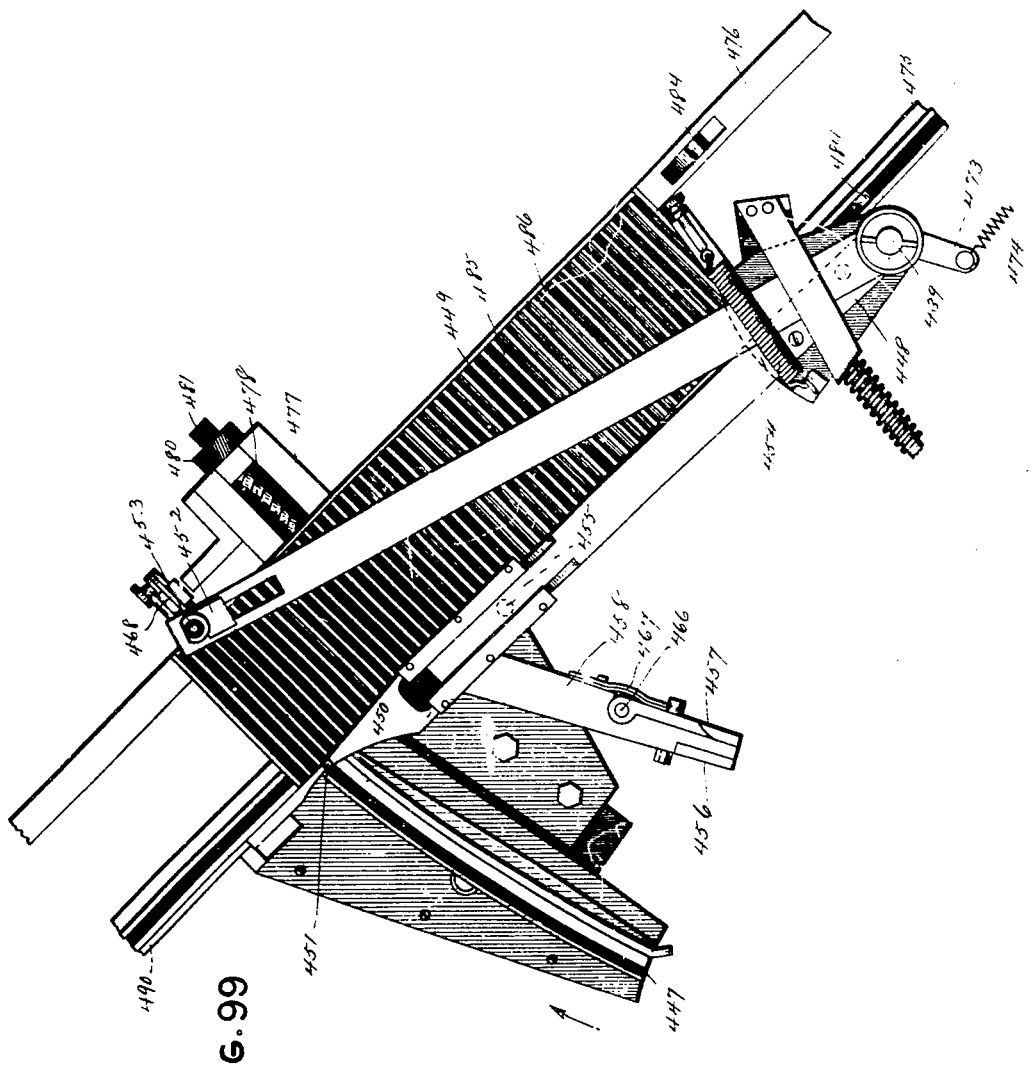

Figure 1 is a plan view of the machine. Fig. 2 is a side elevation of the end of the right-hand side and of the inside of the left-hand side of the machine. Fig. 3 is an elevation of the end of the left-hand side and of the inside of the right-hand side of the machine. Fig. 4 is an elevation of the rear of the left-hand side of the machine; Fig. 5, an elevation of the rear of the right-hand side of the machine. Fig. 6 is a bottom plan view of the die-case and dies. Fig. 7 is a top plan view of the die-case and of the movable frames for shifting it. Fig. 8 is a view of one of the frames employed to shift the die-case, showing the connection of said frame to the pin-carriage. Fig. 9 is a detail view of the plunger for depressing the die at the centering-point. Fig. 10 is a view, partly in section, showing the die-case and dies, the frames for shifting them, the plunger for depressing the center die, and the means for operating said plunger. Fig. 11 is a vertical sectional view showing particularly the mold-die, pump-nozzle, and pump-plunger in the position which they respectively occupy when the metal is being injected into the mold to form a type, also the mechanism for adjusting and operating the plunger which forms one side of the mold and by which the width of the aperture in the mold, and consequent thickness of the type, is regulated. Fig 11ª is a perspective view of parts of the mechanism for adjusting and operating the mold-plunger. Fig. 12 is a side elevation of a portion of the pin-carriage on the right side of the machine, showing also the connection between the said carriage and the slide which controls and adjusts the plunger constituting the outer wall of the mold in making type of normal size. Fig. 13 is a top plan view of the same, and Fig. 14 an end view looking in the direction of the arrow in Fig. 13. Fig. 15 is a top plan view of a portion of the mold-wheel, the devices for moving and adjusting the plunger, which constitutes the outer wall of the mold, and the plate which guides and accurately centers the die when brought to the centering-point and depressed. Fig. 16 is a view of the die-centering plate and of the mechanism for operating it, showing also a die in coöperation with said plate. Fig. 17 is a plan view of the mold-wheel and the portions of the mold carried thereby. Fig. 18 is a vertical section taken on the line $a\ x$ of Fig. 17 through the mold-wheel and mold, showing the position of the mold when the metal is injected into it. Figs. 19 and 20 are respectively views of the outer side and inner side of the adjustable block to which the plunger constituting the inner wall of the mold is secured. Fig. 21 is a similar view showing the position of the inner plunger of the mold after the formed type has been ejected, and showing also the manner in which the button of metal which is left in the bottom of the mold in the casting operation is automatically removed. Fig. 22 is an elevation of the plunger and connections which operate the button-ejector. Fig. 23 is a top plan view of the cam-plate which guides the mold-plunger carried by the mold-wheel. Fig. 24 is a sectional view taken on the line $x\ x$ of Fig. 23, and Fig. 25 a similar view taken on the line $y\ y$ of Fig. 23. Fig. 26 is a plan view of the cam and slide for operating the inner plunger of the mold to eject the type. Fig. 27 is a bottom plan view of the slide shown in Fig. 26. Fig. 28 is an end view of the slide shown in Fig. 27 looking in the direction indicated by the arrow in said last figure. Fig. 29 is a plan view showing the main drive-shaft, the cam-cylinders on the right and left hand side of the machine driven thereby for operating the pin-carriages, also showing the manner in which the mold-wheel receives motion and a number of cams for operating various parts of the machine not herein enumerated. Fig. 30 is a view of one of the main cam-cylinders, showing prominently the straight portions of the grooves therein in which the pins of the pin-carriage enter when first projected. Fig. 31 is a view of the other side of said cam-cylinder, showing in like manner the straight portions of the grooves through which the projected pin travels during the casting operation. Fig. 32 is another view of said cam-cylinder, showing prominently the curved portions of the grooves that operate upon the projected pin to shift the position of the pin-carriage Fig. 33 is a longitudinal section taken vertically through the cylinder, as represented in Fig. 32. Fig. 34 is a top plan view of the mechanism rendered operative by the paper record-strip to effect the projection of the pins of the pin-carriage. Fig. 35 is a similar view with the pin-levers and the hinged frame which carries them removed. Fig. 36 is an elevation of the outside of the paper-strip-feeding mechanism on the right side of the machine. Fig. 37 is an elevation of the same, taken from the inside of said paper-strip-feeding mechanism. Fig. 38 is a longitudinal vertical section of the paper-strip-feeding mechanism and the pin-projecting mechanism, taken on the line $w\ w$ of Fig 34. Fig. 39 is a detail view of the mechanism for imparting motion to the drum of the paper-strip-feeding mechanism, this view having been taken, unlike the other views, from the paper-strip-feeding mechanism of the left-hand side of the machine, both said mechanisms being, however, substantially alike. Fig. 40 is a view of the cam from which, through intermediate connections, the feeding-drum of the paper-strip-feeding mechanism receives motion. Fig. 41 is a cross-sectional view of the paper-strip-feeding mechanism, taken on the line $v\ v$, Fig. 34. Fig. 42 is a top plan view of the sliding plate which controls the descent of the bars by which the pins are projected. Fig. 43 is an elevation of the cam mechanism by which the sliding plate represented in Fig. 42 is moved back and forth. Fig. 44 is an elevation of the cam mechanism for operating the finger that raises the pin-lever to lift the pins out of contact with the record-strip. Fig. 45 is an elevation designed particularly to show the cam mechanism for oscillating the cross-bar which raises the coupling-bars back to normal position. Figs. 45$^a$ and 45$^b$ represent, respectively, a portion of the record-strip for the right side of the machine and a portion of the record-strip for the left side of the machine. Fig. 46 is a sectional view of a portion of one of the cam-cylinders, one of the pins coöperating therewith, and the vibratory frame by which the pins are projected and retracted, the pin in this view being shown retracted. Fig. 47 is a similar view of the same parts, showing the pin projected into the groove of the cylinder. Fig. 48 is a sectional view taken on the line $u u$, Fig. 47. Fig. 49 is a view showing particularly the cam mechanism for operating the vibratory frame that shifts the pins into and out of engagement with the cam-cylinder. Fig. 50 is a plan view of the several slides that operate the movable plunger of the mold constituting the outer wall thereof and of portions of the justifying mechanism for adjusting the position of said slides for producing type-bodies varying from the normal. Fig. 51 is a plan view of the plate which covers the mechanism shown in Fig. 50. Figs. 52, 53, and 54 are views of details of the justifying mechanism, the last-named view representing a section taken on the line $t l$ of Fig. 55. Fig. 55 represents a sectional view taken on the line $s s$ of Fig. 50, also certain coöperating parts of the justifying mechanism not shown in Fig. 50. Fig. 55$^a$ is a sectional view taken on the line $a'$, Fig. 56. Fig. 56 is an elevation of a portion of the justifying mechanism, showing particularly the rack actuated from the pin-carriage and the spring-drum winding mechanism wound thereby, the alarm-bell, a portion of the devices for releasing the justifying mechanism and permitting their return by the spring-drum to normal position, and a portion of the coupling and uncoupling mechanism of the justifier. Fig. 56$^a$ is a detail view showing the manner in which the actuating-pawl of the justifying mechanism is thrown into and out of operation. Figs. 57, 58, 59, 60, and 61 show various details of the justifying mechanism; Fig. 62, an elevation of a portion of the coupling and uncoupling mechanism of the justifier, showing also the cam mechanism for imparting the final adjusting movement of the justifying mechanism. Fig. 63 is a sectional view on the line $r r$, Fig. 62. Fig. 64 is a sectional view of the spring-drum, taken on the line $q q$, Fig. 56. Fig. 65 is a sectional view on the line $p p$, Fig. 64, showing the ratchet and pawls for giving the preliminary tension to the spring of the spring-drum. Figs. 66, 67, and 68 are respectively a side view, a top view, and an end view of portions of the releasing devices of the justifying mechanism. Fig. 69 is an elevation of the pin-carriage and pins on the left-hand side of the machine, showing particularly the connections by which the movements of the justifying mechanism are initiated. Fig. 70 is a sectional view on the line $o o$, Fig. 69. Fig. 71 is a similar view on same line, different position, Fig. 69. Fig. 72 is an elevation, partly in section, showing the manner in which the mold-wheel shaft is driven. Fig. 73 is a sectional view on the line $m m$, Fig. 72. Fig. 74 is an edge view of a portion of the wheel shown at the right in Fig. 73 and showing the manner in which the block carrying the friction roller or sleeve is inserted and held within said wheel. Fig. 75 is a sectional view taken on the line $l l$, Fig. 72, looking downward. Fig. 76 is a similar view taken on the line $k k$, Fig. 72, looking upward. Fig. 77 is a detail view of the mechanism for locking the mold-wheel with the parts in locked position. Fig. 78 is a vertical sectional view of the same. Fig. 79 is a side elevation of said locking mechanism in unlocked position. Fig. 80 is a sectional view taken on the line $j j$ of Fig. 79, the lever being shown in elevation. Fig. 81 is a view of the cam mechanism for operating the mold-wheel lock. Fig. 82 is a top plan view of the melting-pot, showing the pump therein. Fig. 83 is an elevation, partly in section, of the same. Fig. 84 is a detail section view of the pump cylinder and nozzle. Fig. 85 is an elevation showing the cams and levers that operate the pump plunger and nozzle. Fig. 86 is a sectional view taken on the line $i i$, Fig. 85. Figs. 87 and 88 represent different positions of the cams which operate the plunger and nozzle of the pump. Fig. 88$^a$ is a detail view showing the yielding connections of the pump mechanism. Fig. 88$^b$ is a sectional view taken on the line $b x$, Fig. 89. Fig. 89 is a front view of a portion of the devices which give motion to the plunger and nozzle of the pump, and also of the mechanism for coupling and uncoupling the said plunger and nozzle from such operating devices. This view also shows a portion of the mechanism for ejecting the metal buttons from the bottom of the mold. Fig. 90 is a top plan view of that portion embraced within the lines $h h$, Fig. 89. Fig. 91 is a plan view of the shafts and connections by which the pump mechanism is operated and also by which the justifying mechanism is thrown into operation. Fig. 92 is a front elevation of the parts of Fig. 91 embraced within the lines $g g$. Fig. 93 is a sectional view taken on the line $f f$, Fig. 91. Fig. 94 is a sectional view taken on the line $e e$, Fig. 91. Fig. 95 is a front view of that portion of Fig. 91 embraced by lines $d d$. Fig. 96 is a top plan view showing the guide in which the type are formed into a line, the mechanism for transferring the completed line to the galley, and a portion of the galley-feeding mechanism, the galley itself being removed. Fig. 96$^a$ is a sectional view on the line $d^x d^x$, Fig. 96. Fig. 96$^b$ represents, on an enlarged scale, the finger 453, Fig. 96. Fig. 97 is an elevation showing the guide or trough for receiving the formed types. Fig. 98 is a sectional view of the same, taken on the line $c c$, Fig. 96. Fig. 99 is a top plan view of the galley and of the devices for transferring the line of type to the galley. Fig. 100 is an elevation showing a portion of the mechanism for imparting motion to the arms which transfer the lines of type to the galley. Fig. 101 is a sectional view taken on the line $b b$, Fig. 100. Fig. 102 is an elevation showing the pins and pin-carriage of the left side of the machine and a portion of the mechanism by which the motion of the pin-carriage is caused to actuate the line-transferring devices and the galley-feed. Fig. 103 is an end view showing a portion of the pin-carriage and the levers and connections operated thereby to throw into operation the line-transferring and galley-feed mechanisms. Fig. 104 is a detached view of a portion of the line-transferring and galley-shifting mechanism. Fig. 105 is another detail view of a portion of the same mechanism. Figs. 106 and 107 are detail views of portions of the galley-shifting mechanism, the former figure representing a section taken on the line $a a$ of Fig. 107; Figs. 108 to 116, views of other details of the galley-shifting mechanism. Fig. 117 is a bottom plan view of the galley. Fig. 118 is a side view of the same, taken from the front; and Fig. 119, a similar view taken from the rear. Fig. 119$^a$ is a cross-sectional view on the line $c^x c^x$, Fig. 1.

Similar letters and numbers of reference in the several figures indicate the same parts.

Referring particularly to Figs. 1, 6, 7, and 11, the part numbered 140 represents the case or holder in which the dies or matrices are contained. In this particular machine the die-case is adapted to accommodate two hundred and ten dies, as shown in the bottom plan view, Fig. 6, though of course this number may be varied, if desired. Each of the dies consists of a squared portion or head 151, having the character represented by the die formed in intaglio in its face, Fig. 11, and guided in one of the correspondingly-shaped apertures formed by the partitions 147 and 148 of the die-case, Fig. 6, a rounded shank portion 149, guided in the upper plate 152 of the die-case and provided with washers 141$^a$ and 141$^b$, between which a coil-spring 150 is arranged, so that when a die is depressed by a pressure upon its upper end it will be returned automatically to normal position by means of the spring.

The die-case is provided with a flange 153 and rests upon and is supported by a sliding frame 142, the said frame embracing two opposite sides of said die-case, Figs. 7 and 11. At right angles to the frame 142 is another sliding frame, 143, which embraces the two remaining opposite sides of the die-case, as shown in Fig. 7. 144 represents the guides for the lower frame 142, and 145 represents the guides for the upper frame 143.

The lower sliding frame 142 is connected to the pin-carriage 118$^1$, Figs. 7, 8, and 69, by an adjustable screw connection 146$^1$, Fig. 7, while the upper sliding frame 143 is in like manner connected to the pin-carriage 118$^r$ on the right-hand side of the machine, Figs. 1 and 7, by an adjustable screw connection 146$^r$, Fig. 7. From the manner in which the die-case is embraced by the two sliding frames it is evident that the motion of one frame will move it in one direction and that the motion of the other frame will move it in a direction at right angles to the movement caused by the other frame. In order therefore to bring any particular die to the centering-point, or, in other words, beneath the depressing-plunger 156, Fig. 10, it is only necessary that one sliding frame shall move the die-case till the row of dies in which the die desired to be centered is located is brought in line with the said plunger and that the other sliding frame shall move so as to advance said die along that line till it stands beneath the plunger, which movements of the sliding frames might be either simultaneous or successive; but in this machine they are designed to be simultaneous, as the two pin-carriages are simultaneously operated by the record-strips and the intervening mechanism.

In this particular machine each of the pin-carriages, of which the right one is shown in Fig. 3 and the left one in Fig. 102, is provided with a series of sliding pins 113, fifteen in number, Figs. 46, 47, 48, and 38. Each of these pins, at its rear end, is perforated vertically, and through it extends a vertical pin 111, that has a head 110 on its lower end, while its upper portion is surrounded by a spring 112, that is confined between two washers 112$^a$ 112$^b$, the former of which bears against a pin 112$^c$ and the latter of which rests upon the pin-frame, as shown in Figs. 46, 47, and 48. Normally the vertical pins 111 are kept raised by their springs 112, as shown in Figs. 46 and 48, so as to be out of the path of the vibratory bar 120, said last-mentioned bar being mounted on arms 121, secured to a rock-shaft 122, Figs. 46, 47, and 102, that is rocked back and forth by means of a crank 125$^1$, rod 126$^1$, rocking lever 128$^1$, mounted on shaft 129$^1$, having a pin and roller 130$^1$, which engages a cam-groove 131$^1$, formed in the side of a cam-wheel B$^1$, Fig. 49. Another arm 121$^a$, Figs. 46 and 47, mounted upon the rock-shaft 122 and connected to and moved with the arms 121, carries a bar 121$^b$, whose upper or operating edge is at all times in the plane of the head 110 of the vertical pin 111, from which construction it results that when the vertical pin 111 is depressed it will be struck by the vibrating bar 120 in its forward throw and driven forward till its front end engages with the corresponding cam-groove in the cam-cylinder B' or B¹, as shown in Figs. 46, 47, and 29, and when the bar 121ᵇ is vibrated backward it will strike the head of said pin 111 and move it back out of engagement with the said cylinder and into normal position.

As shown in Figs. 46 and 48, the sides of the vertical pin 111 are flattened at 111ᵃ and at 111ᵇ, so that said pin may be prevented from turning in the slot 113ᵃ of the pin-carriage in which said pins work. In this connection I would state that when a depressed pin 111 is struck by the bar 120 and pushed with the pin 113 forward the shoulders on the head 110 of said pin 111 lie beneath the pin-carriage, thus preventing the rising of the pin until the pin 113, which carries it, has been retracted to normal position. I would also state that when the pin 113 is thus retracted and the vertical pin 111 is caused by its spring to rise the head of pin 111 stands opposite the lower plate of the pin-carriage and prevents the pin 113 from being pushed forward. A bar or plate 110ᵃ arrests the pin 113 on its backward movement, as shown in Fig. 46.

To avoid confusion in the reading of this specification, I would state that wherever the letter "l" or letter "r" is referred to in connection with the number of a part it is meant to indicate that the particular part belongs to the left or to the right side of the machine and is a duplicate of a part on the other side of the machine.

It will be next in order to describe the mechanism by which the vertical pins 111 are depressed by the operation of the paper strip and intermediate mechanism, so as to render inoperative the pins 113 of the pin-carriage.

Referring to Figs. 34 to 37, and particularly to Fig. 38, 1 represents a spool upon which the perforated record-strip 64 is wound; 54, a friction and guide roll mounted in swinging arms 63 for pressing upon the record-strip and giving it proper tension.

6 are springs provided with adjusting-screws for varying the pressure of the roll 54.

100 is another guide-roll for the strip; 97, a cylinder provided with perforations 105, over which the paper strip passes, and 18 a spool upon which the strip is rewound.

41 are a series of pins which depend from a series of levers 2, that are pivoted at their front ends at 3 and each of which has connected to its rear end a vertical bar 102, Fig. 38.

9 is a cross-bar extending across the tops of all the levers 2.

9ᵃ, Fig. 41, are a series of pins pivoted to the upper portions of the levers 2 and extending up into hollow screws 4, carried by the cross-bar 9 and having springs 9ᵇ, surrounding them and interposed between their heads and the said screws 4. These springs 9ᵇ are employed to press the pins 41 down upon the record-strip, and by adjusting the screws 4 their tension can be regulated.

5 represents a frame to which the levers 2 are pivoted and which carries the cross-bar 9, above referred to. This frame is pivoted at 101 to the main frame, and it can be swung up on said pivot, so as to give access to the perforated cylinder 97. 8ᶠ is a locking-bolt for securing the said frame when it is swung down and in operative position.

Each of the vertical bars 102, Fig. 38, is provided with a recess 104, into which a cross-bar 29, carried by arms 28 28, Fig. 34, projects. These arms 28 are hung loosely upon a cross-shaft 30, as shown in Fig. 34. An arm 66 projects beneath the cross-bar 29, as shown in Figs. 34 and 38, said arm 66 being secured rigidly to the shaft 30 by a pin or otherwise. On the end of the shaft 30, Figs. 34, 45, and 4, is a crank-arm 73, to which is connected a rod 74, Figs. 4 and 45, that in turn is jointed to the upper end of a vibratory lever 75, Figs. 44 and 45, pivoted at 76, and having on its lower end a pin and friction-roller 95, that engages with a cam-groove 96 in the side of a cam-wheel B', Figs. 44 and 5.

The cam B' is geared to the main shaft and moves constantly while the machine is in operation. Consequently the arm 66, Fig. 38, is constantly vibrated up and down, and carrying with it the cross-bar 29. The result is that each time the outer end of the arm 66 rises the cross-bar 29 will be raised and will lift all of the vertical bars 102 and raise the connected pin-levers 2, so as to raise their pins above the surface of the record-strip and permit the latter to be fed forward, while each time the outer end of said arm 66 is depressed the cross-bar 29 will drop with it and permit any pin-lever whose pin happens to register with a perforation in the record-strip to descend and carry with it its connected vertical bar 102.

Below the normal position of the ends of the vertical bars 102, Fig. 38, is a horizontal plate 80, provided with a succession of shoulders, as shown in Fig. 42, and connected to a horizontally-movable plate 81. This plate 81 is slotted, as shown at 83, and in each slot a notch 82 is provided, the notch in each successive slot being farther removed from the front edge of the plate, as shown in Fig. 42, and corresponding with the succession of shoulders upon the plate 80. The plates 80 and 81 are kept constantly moving back and forth by means of a connecting-rod 85, Figs. 42 and 43, vibrating lever 88, shaft 89, lever 90, pin and roller 168, and cam-groove 169 in cam-wheel B³, Fig. 5.

Working in the slots 83, Fig. 42, are a series of vertical bars 43, Fig. 38, that are guided at their upper ends in guides 43ᵃ and at their lower ends in guides 43ᵇ. Each of these vertical bars 43 is provided with a spring 44, which tends to keep it lowered, and the upper end of each of said bars is bent or provided with a shoulder, as shown at 32, beneath which extends a cross-bar 33, connected to vibrating arms 34, secured to a shaft 35, which shaft is provided with crank-arms 77, Figs. 2, 4, 5, 34, and 45, that in turn are connected by rods 79 to vibratory levers 78, mounted upon pivots 76 and having at their lower ends pins and rollers 95', which engage with cam-grooves 96' in cam-wheels B² B³, Fig. 42. Each of the bars 43, Fig. 38, is also provided with a rib or projection 104, that is adapted to fit and at the proper time pass through the corresponding notch 82, Fig. 42, in the plate 81.

At each dead-stroke of the machine (which occurs when no pin-lever 2 is actuated by the record-strip) the slotted plate 81 and the notched plate 80 connected to it are moved forward and backward, the bars 102 offering no obstruction, and the cross-bar 33 holding elevated all of the bars 43 while the notches 82 are passing back and forth beneath the ribs or projections 104 on said bars 43. When, however, a perforation in the record-strip comes beneath the pin of one of the pin-levers, that particular pin-lever descends and carries down its connected vertical bar 102, so that the end of said bar is brought in the path of the shouldered plate 80, and on the advance of said shouldered plate the said bar 102 will engage with the appropriate shoulder on said plate 80 and will arrest said plate 80 and the slotted plate 81, to which it is connected, before said plates have made a full stroke.

The shoulders on the plate 80 bear such relation to the notches 82 in the slotted plate 81 as that the arrest of both said plates by the engagement of the end of the bar 102 with one of the shoulders of said plate 80 will cause one of the said notches 82 to be left immediately beneath the rib or projection 104 of the corresponding bar 43, and when in the stroke of the machine the cross-bar 33 releases all of said vertical bars 43 the spring 44 upon the particular bar whose rib or projection has thus been brought into alinement with the notch will draw said bar 43 downward and cause its lower end to strike and depress the pin 111 of the corresponding operating-pin 113, and the vibrating bar 120 will then force the said operating-pin into engagement with the cam-cylinder, as before explained. Before the completion of the stroke of the machine the cross-bar 33 will again rise and restore the lowered bar 43 to its original position.

Inasmuch as the depression of one of the bars 102 causes the arrest of the connected plates 80 and 81 before they have made a full stroke, it becomes necessary, in order to avoid breakage of the parts, to provide a yielding connection between the operating-lever 88, Fig. 43, and the rod 85, Figs. 42 and 43, and I therefore pass the end of the rod 85 through a swivel-block 87, held in the upper end of the lever 88, and screw one or more nuts 87ª upon its end, and I interpose between the said swivel-block and a fixed collar or nut 87ᵈ upon said rod 85 a spiral spring 87ᶜ By this provision it will be seen the motion of the lever 88 is transmitted to the rod 85 through the said spring 87ᶜ, and when the plates 80 and 81 are arrested the spring is compressed without doing damage to the parts, as will be readily understood.

It is of course important that there should be no slipping of the record-strips upon the feeding-cylinders, and also that provision should be made to prevent said cylinders from overthrowing or advancing too far when motion is imparted to them to feed the strips. I obtain the first result by providing each of the feeding-cylinders with a circumferential row of teeth 97ª at each end, and I provide each of the record-strips with corresponding lines of perforations for coöperating with said rows of teeth. The second result I obtain by the employment of the following construction: To the shaft 97ᵇ, upon which the feeding-cylinder is mounted, I rigidly secure a ratchet-wheel 12, Figs. 34, 35, 36, 39, and 41, and upon the hub of said ratchet-wheel I mount a second ratchet-wheel, 68, Figs. 34, 35, and 41, whose teeth incline in a direction opposite to that of the teeth of the first-named ratchet-wheel. I secure these two ratchet-wheels together and provide for their adjustment with respect to each other by the employment of an adjusting-screw 12ª, arranged within an opening 12ᵇ in the ratchet-wheel 12 and coöperating with a nut 68ª, secured to the ratchet-wheel 68, and by the employment of screws 68ᵇ, passing through slots 12ᶜ in the ratchet-wheel 12 and screwed into the ratchet-wheel 68, as shown in Fig. 39. By operating the screw 12ª the proper relative position of the two ratchet-wheels is secured, and by tightening the screws 68ᵇ they are held in such position.

Mounted loosely upon the shaft 97ᵇ is a three-armed lever 23, Figs. 35, 39, and 41, which is adapted to be vibrated by means of a connecting-rod 24, lever 69, shaft 70, arm 71, stud-roller 72, cam 91 on the end of the cam-cylinder B' and spring 94 on rod 93, as shown in Figs. 1, 4, 5, 39, and 40. To one of the lateral arms of the lever 23 is pivoted an actuating-pawl 21, which is normally held by a spring 21ª in engagement with the outer ratchet-wheel 12 and operates to turn said ratchet-wheel when the lever 23 is vibrated in one direction. A pawl 11 operates to prevent the backward movement of the ratchet-wheel 12.

19 is a pawl pivoted to the side of the frame and having its lower end normally kept out of engagement with the inner ratchet-wheel 68 by means of a spring. The upper end of this pawl 19 is provided with an incline 19ª, with which the opposite arm of the lever 23 is adapted to engage when said lever is vibrated. The operation is as follows: When the connecting-rod 24 is pushed in the direction indicated by the arrow, Fig. 39, the pawl 21, being in engagement with the outer ratchet-wheel 12, turns the latter, and when it has moved the length of one tooth the other arm of the lever 23, which has engaged the incline 19ª of the pawl 19, throws the lower or operative end of said pawl 19 into engagement with the inner ratchet-wheel 68, thus arresting both ratchet-wheels and preventing any overthrowing of the same by the impulse given by the pawl 21. Upon the backward movement of the rod 24 the pawl 21 will slip back until it engages the next tooth of the ratchet-wheel 12, and the pawl 19 will by its spring 15 be again thrown out of action, the pawl 11 operating the while to prevent any backward movement of either ratchet-wheel.

Also mounted upon and secured to the shaft 97$^b$ of the perforated feed-drum is a hand-wheel 16, Figs. 34, 35, 36, and 41. This hand-wheel affords a convenient means for rotating and adjusting the feed-drum when necessary. Around it passes a belt 13, which communicates motion through a pulley 53, Figs. 35 and 36, to the winding-spool 18, upon which the perforated record-strip is rewound. On the opposite end of the feeding-drum shaft 97$^b$ is secured a gear-wheel 60, Figs. 35, 37, and 41, which meshes with a smaller gear 61, Fig. 37, on the shaft of the friction-roller 100, Fig. 38. The record-strip, it will be remembered, is drawn between the feed-drum 97 and this friction-roll 100, and the rows of feeding-teeth on said feed-cylinder enter corresponding recesses in the friction-roll to prevent, by any possibility, the record-strip from becoming disengaged from said feeding-teeth. A pivoted arm or hook 62 secured to the swinging frame 5, Fig. 37, operates, when said frame 5 is swung up beyond a vertical line, to engage with the shaft 97$^b$, Fig. 37, and maintain the frame in said position.

In the operation of the machine it becomes necessary at times to stop entirely the feeding of both record-strips, and thus cause the machine to make dead-strokes, during which no type are formed. I therefore provide the following means by which the feed mechanisms on both sides of the machine may be simultaneously thrown into and out of operation.

Referring particularly to Figs. 1, 34, 35, 36, and 39, 42 represents a cross-shaft extending across the frame which supports the record-strip-feeding mechanism beneath the arms 38, loosely hung on the shaft 30, as shown. Secured to this shaft 42 are two arms 27, which when the shaft is turned in one direction operate to raise the swinging arms 28, as shown in Fig. 38, so as to cause the cross-bar 29 above said swinging arms to be raised and lift the series of vertical bars 102, and with them the series of pin-levers 2, so that their pins will be raised from engagement with the record-strip and entirely above the surface of the latter. The same movement of the shaft 42 which causes this raising of the arms 27 into vertical position causes the actuating-pawl 21 to be thrown out of engagement with the ratchet-wheel 12, connected to the feed-drum, and held in that position by the operation of a screw, Figs. 34, 35, 36, and 39, secured to the side of one of the arms 27 upon a slotted bar 25, connected to the said actuating-pawl 21, thus stopping the rotation of the feed-cylinder notwithstanding the continued vibration of the three-armed lever 23, upon which the actuating-pawl is mounted.

To insure the simultaneous rocking of the shafts 42 on both sides of the machine, I provide each of said shafts with a bevel-gear or gear-segment 57, Figs. 34 and 35, and I mesh with said gears 57 corresponding gears 58, secured to opposite ends of a common rock-shaft 59, extending from side to side of the machine and provided with a weighted handle 59$^a$, as shown in Figs. 1 and 5. By shifting this handle to one side or the other the attendant is enabled to throw the record-strip-feeding mechanism on both sides of the machine instantly into or out of operation, the weight of the lever being sufficient to hold the parts in the position to which either of said movements shall throw them.

The Mold-Wheel and Molds.

The construction of the molds in which the type are cast is as follows, special attention being given to Figs. 17 to 28: Number 208, Figs. 17, 18, and 21, represents the mold-wheel proper. This wheel has formed upon it a hollow tapering hub 208$^a$, which sets within a tapering bearing 211, with its lower end resting upon a loose friction-collar 212, that is in turn supported upon the adjustable threaded sleeve 214, that screws into the bearing and is held in adjusted position by means of a locked nut 213.

Arranged within the mold-wheel are a series of molds or casting-boxes, and as they are all alike a description of one only will be necessary. Each mold consists of a main mold-frame 240, inserted in the mold-wheel and held therein by means of screws 241, Fig. 17, passed through it and into the edge of the mold-wheel, and by a plate 197, Figs. 18 and 21, screwed to its bottom and by another plate 242, Fig. 17, secured to its top. Within this frame 240 are two blocks 243, which form the side walls of the mold, said blocks each being held and adjusted by means of screws 244 245 246, the screws 244 being tapped into the coöperating block and the screw 246 bearing against said block, as clearly shown in the dotted lines, Fig. 17. Screws 247, passing through the top plate 242, and corresponding screws passing through the bottom plate further serve to hold the said blocks 243 in position.

A sliding block 173 is guided in the frame 240 and is provided with a plunger 173$^a$, as shown clearly in Figs. 17, 18, and 21. Inasmuch as the face of the plunger 173$^a$ forms the inner wall of the mold, and as it is with reference to its position when immovable that the extent of movement of the outer plunger, which forms the opposite wall of the mold, is regulated to form a type-body of the desired width, it is necessary that the proper position of the face of said plunger 173$^a$ be accurately maintained and that adjustment of said face may be made to compensate for any wear that may take place. I therefore make the block 173 in two parts united by a dovetail joint, as shown in Figs. 18, 19, 20, and 21, and I tap into the upper part opposite adjusting-screws 181 182, Fig. 18, and arrange them so that their heads will bear upon opposite sides of the lower part 179. By manipulating these screws the proper adjustment of the face of the plunger can be maintained. Upon the bottom of the lower part 179 a curved projection or tongue 175 is formed, which fits accurately in the concentric portion 176 of a groove in a fixed guide-plate 177, as seen in Figs. 18 and 23. When a type is being formed in the mold, the tongue 175 is held in this concentric portion, as shown in Fig. 18; but after the type has been formed and the mold-wheel rotates the said tongue passes out of the concentric portions of the groove to the point 176ª, Fig. 23, so as to enable the block 173 and the connected plunger 173ª to be moved out radially into the position shown in Fig. 21 and cause the plunger to eject the type from the mold. The devices for imparting to the block and plunger this outward movement consist of a slide 185, that works back and forth in fixed guides 185ª, Figs. 18, 21, 26, 27 and 28. This slide is provided at one end with ribs 189, Figs. 26 and 27, that are adapted, when the block 173 is brought to the proper point, to embrace a stud 174, projecting from the top of said block, and is provided at the other end with a stud 187, bearing a friction-roller 190, that works in a cam-groove 188, Fig. 26, in a plate 191, secured to a vertical shaft 199, Figs. 18, 21, and 26. This shaft 199 extends down through the shaft 209, Fig. 18, to which the mold-wheel is secured, and receives motion through gears 200 206, Figs. 72 and 75, from a vertical drive-shaft 204, Figs. 29, 72, and 75.

The timing of the movements of the mold-wheel and of the described devices for moving the inner plunger of the mold will be better understood from the following: As shown in Fig. 17, the mold-wheel proper is rigidly secured to the mold-wheel shaft 209 by a key 209ª. Upon the lower end of said shaft 209 there is secured by a key 216, Figs. 72 and 73, a wheel 215, which is provided with a series of slots 217, Fig. 73, with which friction-rollers 219, mounted on studs 218, projecting from blocks or fixed slides 222 of a wheel 220, are adapted to engage, Fig. 73. These rollers 219 are so positioned upon the wheel 220 as to enter successively two adjoining slots 217 of the wheel 215 and effect together the turning of said wheel 215, and consequently the turning of the mold-wheel proper one-third of a revolution.

As it is important that the movements of the mold-wheel should be accurate, blocks 222, Figs. 73 and 74, are connected to the wheel 220 by tongue-and-groove connections and are adjusted and held at the point of adjustment by means of screws 224, as shown in Fig. 74. By manipulating these screws wear of the parts can be compensated for and the proper movement of the mold-wheel regulated to a nicety.

The requisite intermittent movement of the slide 185, Figs. 18, 21, and 26, is secured by providing teeth upon a portion only of the circumference of the gear-wheel 206, which drives the pinion 200 on the end of the shaft 199, as shown in Figs. 75 and 76, the former representing a top view of the two pinions and the latter a bottom view of the same.

During the time the mold-wheel is in motion the blank portion of the gear-wheel 206 is presented to the gear-wheel 200, and a plate 206ª on the bottom of said gear 206 coöperates with a concaved or cut-away portion 207 of a plate 201 on the bottom of the gear 200 to keep the latter gear stationary; but when the mold-wheel has made one-third of a revolution, as before described, and is arrested the plate 206ª disengages plate 201 and the toothed portion of gear-wheel 206 engages with the gear 200 and rotates the latter, thereby causing the plate 191, secured to the upper end of the shaft 199, to rotate and its cam-groove 188 to move outward the slide 185 and cause said slide to operate upon the stud 174 on the plunger-block, which stud by the arrest of the mold-wheel has been brought between the ribs 189 of the slide, Figs. 18, 21, and 27. The outward movement of the slide causes the plunger 173ª to be moved outward and the completed type to be ejected by the latter from the mold, as shown in Fig. 21.

At the moment the slide 185 reaches the limit of its outward movement its roller 190 comes into engagement with the concentric portion of the cam-groove 188, as shown in Fig. 26, and while said concentric portion of the groove is passing the mold-wheel again begins to rotate and carries the stud 174 of the plunger-block out from between the ribs 189 of the slide, so that when the latter is acted upon by the succeeding portion of the cam-groove to draw it inward said stud 174 is free from it. The projected plunger, when thus freed from the slide 185, is moved back again to normal position, Fig. 18, by the engagement of the stud 175 on the plunger-block with the eccentric portion 176ᵇ, Fig. 23, of the stationary cam-plate 177, as will be readily understood.

Mechanism for Locking the Mold-Wheel.

For the purpose of locking the mold-wheel each time it has completed one-third of a revolution and for keeping it securely locked while the type is being formed in one of its molds and a previously-formed type is being ejected from another of its molds the following mechanism is provided:

Upon the vertical drive-shaft 204, Fig. 29, is secured a cam-wheel 250, Figs. 81 and 77, having a cam-groove 250ª in its upper surface, in which projects a pin and roller 249, carried by an arm 249ª, that is mounted upon a pivot 249ᵇ and has connected to it a rod 246, which is in turn secured to the lower end of a vibrating lever 239 by adjusting-nuts 247, as shown in Fig. 77. The said lever 239 is pivoted at 245 to a fulcrum secured to the frame of the machine, and its upper end is bifurcated or forked, as shown in Fig. 80, so that it will embrace a sliding bolt 236, connection between its bifurcated end and the bolt being secured by means of a pin 238, that passes through said bolt and into slots 239ª in said lever, as shown in Figs. 77 to 80. At its forward end the sliding bolt 236 is made tapered or beveled, as shown in Fig. 77, and is adapted to fit corresponding recesses 234, formed in the edge of the mold-wheel, as shown in Figs. 77 to 80 and particularly in Figs. 17 and 77.

At each one-third of a revolution of the mold-wheel one of the recesses 234 is brought opposite the end of the locking-bolt 236, and the bolt by means of its operating mechanism just above described is thrown forward into said recess, thus securely locking the wheel from further movement in either direction.

The taper given the end of the locking-bolt and the recess insures the engagement of the bolt and the proper centering of the wheel even should the wheel from any cause stop slightly short of or slightly beyond the proper locking-point.

For the purpose of preventing shock in the engagement of the locking-bolt with the mold-wheel and also to insure at all times the projection of the bolt so that the sides of its beveled end will fit tightly the sides of the recess into which it is projected I preferably make the body of the bolt hollow throughout the greater portion of its length and insert in it a spring 240, between which and the cross-pin 238 I interpose a follower 240ª, and I elongate slightly the opening in the side of the bolt through which the said pin 238 passes, all as shown in Fig. 78. By this construction the motion of the lever 239 is transferred to the bolt through the spring 240, and the result is that the end of the bolt is forced into the recess in the wheel under yielding pressure, thus peventing shock and yet insuring the proper engagement of the parts, as before explained.

By reference to Fig. 17 it will be noticed that each of the recesses 234 in the mold-wheel for receiving the locking-bolt is located diametrically opposite one of the molds and in line with the opening into which the outside plunger, which is to form the outer wall of the mold, enters. Now, inasmuch as the fitting of such plunger must be very accurate to prevent the formation of fins upon the type, it is of course absolutely essential that the plunger and the mold-opening into which it passes should be in absolute alinement. This alinement I secure by regulating the lateral position of the locking and centering bolt. To this end I mount said bolt in a head or stock 237, which is rendered laterally adjustable upon a rigid support 241 by means of set-screws 242, tapped into said stock and bearing with their heads upon opposite sides of the support 241, as shown in Figs. 77 to 80 and particularly in Fig. 80. By adjusting these screws 242 the opening of the mold is enabled to be brought in exact alinement with the outside plunger.

*The Formation of Type Having Bodies of Normal Width.*

My present machine, like my former patented one, is adapted to form type whose bodies are of normal width, or what are termed "normal" type, as well as type whose bodies or some of whose bodies, and preferably the bodies of space-type, are of abnormal width, and made so in order to properly justify the lines for which they are formed. I will first describe the mechanism for adjusting the mold to form normal type, and will then describe the mechanism for producing abnormal or justifying type.

The side walls of each of the molds in the mold-wheel, when once properly set, remain so and need no further adjustment in the formation of individual type. The inner wall of the mold, as we have seen, is formed by the inner plunger 173ª, Figs. 17 and 21, and in the formation of every type always occupies the same position with relation to the side walls. The outer wall of the mold, however, formed as it is by the face of the outer plunger 260, Figs. 11 and 18, varies in position accordingly as a narrow or a wide type is to be formed, and it is therefore upon this portion of the mold that the mechanism which I am about to describe operates.

Referring particularly to Figs. 11, 15, and 55, 261 represents a block to which the outer plunger 260 of the mold is secured, said block in turn being secured to a slide 262. I call this slide the "inner" slide to distinguish it from an intermediate slide 263 and from an outer or main slide 264, which will be hereinafter again referred to. Said inner slide is in fact made in two parts—viz., 262 and 262ª— united by an adjustable screw connection 265, as shown in Fig. 11, which enables the part 262 to be moved away from or toward the part 262ª, so as to project or retract the plunger, and thereby decrease or increase the size of the normal opening in the mold.

Extending transversely of the slides 262 263 264 is another slide 266, which for convenience of description I term the "normal" slide, and which has two grooves 267 and 268, Figs. 11, 11ª, and 15. Secured to the intermediate slide 263 by screws 269 is a block 263ª, which carries a guide-block 270, that projects down into the groove 267 of the normal slide 266 and serves to guide said normal slide in its back-and-forth movements. The groove 268 in the normal slide is not parallel with the guide-groove 267, but is formed at an angle thereto, as shown in Figs. 11ª, 13, and 15. In it is adapted to slide a block 271, which is provided with a pin 272, that fits an aperture in the portion 262ᵃ of the inner slide.

Connected to the portion 262ᵃ of the inner slide is a rod 273, which passes through a guide 274, Figs. 11, 11ᵃ, and 15, and is provided at its end with nuts 275, and between said nuts and the bearing 274 is a spring 276, which tends to keep the block 271 at all times pressed against the inner wall of the groove 268, Figs. 11 and 15.

The outer or main slide 264 is connected by a link 276 to a vibratory arm 277, which is moved back and forth by means of a cam-wheel B⁴, Figs. 1, 5, 11, and 29.

Now it is apparent that since the grooves 267 and 268 in the normal slide, Figs. 11 and 15, are at an angle to each other the movement of said slide longitudinally will by the operation of the walls of the inclined groove 268 upon the block 271 cause the inner slide 262 and the plunger connected to it to be adjusted outward or inward to an extent proportioned to the amount of longitudinal movement given said normal slide, and it will be also apparent that the vibration of the arm 277 by the cam-wheel B⁴ will cause the main slide 264 and the intermediate and inner slide carried by it to be moved bodily forward or backward, so as to cause the plunger 260 to move into or out of the mold in the mold-wheel, Fig. 15.

In the making of normal type it is only necessary to change the position of the inner slide 262 by the movement of the normal slide 266 in order that the plunger may be so set as that when all the slides are advanced by the vibration of the arm 277, Fig. 11, the plunger will enter the mold the distance required for the production of the particular type of normal width; but in the making of abnormal or justifying type the position of the intermediate slide 263, as well as that of the inner slide 262, is required to be adjusted before the plunger enters the mold, as will be in due course explained; but as we are now concerned in understanding how the adjustment of the plunger is secured to effect the formation of normal type it will only be necessary at present to refer to the mechanism which is employed in giving the adjusting motion to the normal slide.

Upon the projection of the corresponding pins from the right and left pin-carriages into their respective cam-cylinders both pin-carriages are moved longitudinally the distance required to bring the designated die to the centering-point. During this movement one of the pin-carriages—viz., the one at the right side of the machine—through the medium of a connecting-bar 278, Figs. 12, 13, and 14, moves the normal slide so as to project or retract the outer plunger of the mold more or less, according to the width of the normal type to be formed.

If the machine is used simply for making normal type to be hand-set, as ordinarily, or set by a common type-setting machine, the mechanism so far described will be competent for the purpose; but in order that justified lines of type may be formed the following additional mechanism is required to further control the adjustment of the outer plunger of the mold before the space-type for a given line are begun to be formed.

*The Mechanism for Forming Justifying Type.*

While the two perforated record-strips that are fed into the right and left sides of the machine are provided with corresponding coöperating perforations for conjointly effecting the centering of the several dies of the die-case, the left-hand record-strip alone has special perforations, called "justifying-perforations," for providing, through mechanism to be presently described, a justifying adjustment of the outer plunger of the mold, which is availed of each time a space-type is to be formed. These justifying-perforations occur at intervals along the record-strip and immediately precede the perforations that operate to center the dies for the production of each line of type, one or more justifying-perforations occurring before the die-centering perforations of any given line.

In this machine each pin-carriage carries fifteen pins, and all of the pins of each carriage are employed in the shifting and centering of the die-case. The pins of the carriage on the left side of the machine, or some of them have additional functions, functions which they perform while the pins of the right-hand carriage are inoperative or not in use. For instance, the first pin, commencing at the right, Fig. 69, is employed for releasing the justifying mechanism and coupling the type-setting mechanism, as will be further on explained, and the eighth, ninth, tenth, eleventh, twelfth, thirteenth, and fourteenth pins are employed in the justifying operation.

It is with pins 8 to 14 that we have now to deal in describing the justifying mechanism. When any one of these pins is thrown into coöperation with the cam-cylinder by the action of a justifying-perforation in the record-strip of the left side of the machine, the pin-carriage is caused to move more or less, according to which pin is projected in the direction indicated by the arrow, Fig. 69, which causes a hanger or depending arm 279 on the pin-carriage to draw upon a rack-bar 280, as shown in Figs. 56 and 69. This rack-bar 280 is in engagement with a pinion 281, mounted loosely upon a shaft 282 and having connected to it a disk 283, which carries a pawl 284, Fig. 55, that in turn engages with ratchet-wheel 285, that has secured to it a pinion 286 and is connected to the shaft 282 by a spline-and-groove connection 287, as shown in Fig. 56ᵃ, so as to cause said ratchet and connected pinion to be rotated when the shaft rotates and yet permit of an independent longitudinal movement of the shaft. The pinion 286, Figs. 55 and 56, meshes with a large gear-wheel 288, Figs. 56 and 64, that is mounted loosely on a shaft 289 and carries a drum 290, within which is a helical spring 291, which is connected at one end to the drum and at the other end to the said shaft 289. Upon the shaft 289 is keyed a ratchet-wheel 292, Figs. 64 and 65, with which spring-pawls 293 on a stationary portion of the framework are adapted to engage, and the outer end of said shaft 289 is squared to receive a crank for giving preliminary tension to the spring.

From this description it will be apparent that when the gear 281 is rotated by drawing forward the rack-bar 280 the pawl 284, operating upon the ratchet-wheel 285, will turn the pinion and partially rotate the shaft 282, also that the gear 286 will turn the gear 288 and further wind up the spring within the drum of the latter.

A spring-pawl 294, mounted upon a pivoted arm 295, Fig. 56, acts upon the ratchet-wheel 285, and when the rack-bar 280 moves back for another stroke holds said ratchet and the connected parts in check and prevents backward movement of them.

The main portion of the shaft 282 is mounted in a bearing 282ª, Fig. 55, which permits it to move back and forth longitudinally, and its inner or reduced end has bearings in what I term the "justifying-slide" 305. (Shown in Figs. 55 and 62.) Upon the shaft 282, between its bearings in the justifying-slide 305, is formed a screw-threaded portion 282ˣ, Figs. 50, 53, and 55, which engages a screw-threaded block 297. (Shown in section in Fig. 55, in plan in Figs. 50 and 53, and in end elevation in Fig. 54.) This screw-threaded block has connected to it by screws 298 a pair of slides 299 300, the latter being provided on its inner edge with teeth 301, Fig. 53, which mesh with a toothed segmental arm 302, mounted loosely upon a pin 303, Figs. 50, 53, and 55, and having secured to it a pinion 304, so that said pinion and segmental arm will move together.

Mounted upon the justifying-slide 305, on opposite sides of the gear-wheel 304, are two sliding rack-bars 306 307, that are at all times in engagement with the gear 304, so that when the shaft 282, Fig. 55, is turned the gear 304 will be likewise turned through the described intermediate connections and cause one of the rack-bars 306 307 to be retracted and the other of said rack-bars to be simultaneously projected, as shown in Fig. 50.

In describing the manner in which the outer plunger of the mold is adjusted to form normal type I referred, it will be remembered, to the three slides—viz., the inner slide 262, the intermediate slide 263, and the outer slide 264, (shown in Figs. 11, 11ª, 50, and 55,) and which are all advanced by the vibrating arm 277, Fig. 11, when the outer plunger 260 is projected into the mold-wheel. If attention is now directed to Figs. 50 and 11ª, which show these three several slides in plan, there will be found to be projecting upwardly from the outer slide 264 a pin 308. (Shown also in Figs. 11ª and 55.) Upon this pin is mounted so as to turn freely a block 309, which is provided on opposite sides of the pivot-pin 308 with self-adjusting blocks 311 312, one of which, 311, is adapted to coöperate with the end of the sliding rack-bar 307 and the other of which, 312, is adapted to coöperate with the other sliding rack-bar, 306, as will be farther on explained. To the block 309 is hinged at 310 another block 313, Fig. 50, the relative position of said two blocks 309 313 being adjusted and preserved by means of two screws 314 315. The block 309 is further provided at its middle with a projection 316, which is perforated and receives the square head 317 of a round pin 318, projecting upward from the intermediate slide 263, Figs. 50, 55, and 11ª.

While normal types are being made all three of the slides 262 263 264 are moved forward and backward together, the intermediate slide 263 and the outer slide 264 carrying the blocks 309 313 and maintaining them in the position shown in Fig. 50, the outer edge of said block 313 sliding in contact with a stationary block 319, secured to the under side of the plate 320, Fig. 55, which forms the top of the justifying-slide 305, being secured thereto by screws 321, as shown in Figs. 15, 50, and 51. The block 319 is kept in contact with the sliding block 313 by a spring 320ª, applied to plate 320, as shown in Fig. 15.

It is therefore seen that in the formation of normal type the blocks 309 313 are neutral and perform no function whatever except as guides, and the same may be said of the sliding rack-bars 306 307, which remain in position shown in Fig. 50 out of engagement with the self-adjusting blocks 311 312; but when a justified line is to be produced and the space-types are to be rendered abnormal to accomplish the justification as provided for in this machine the sliding rack-bars 306 307 are required to be adjusted by the action of the justifying-perforation in the record-strip, as hereinabove described, before the type for the given line are begun to be formed, and the justifying-slide 305, Figs. 50, 55, and 62, is required to be advanced each time a space-type is to be formed, so as to strike the self-adjusting blocks 311 312 and cause the block 309 to be rocked more or less on its pivot 308, and thereby through the coöperation of the projection 316 with the pin 317 on the intermediate slide 263, Figs. 11 and 50, cause the said intermediate slide 263 to be moved longitudinally upon the outer slide 264 and carry with it the inner slide 262 and the connected plunger 260, thus adjusting the plunger so as to produce an opening in the mold wider or narrower than the opening required to produce a normal-space-type body, or, in other words, provide for the production of an abnormal justifying space-type. It is after all these slides 262 263 264 have been advanced by the operation of the vibratory arm 277, Fig. 11, to carry the outer plunger 260 into the mold and to bring the self-adjusting blocks 311 312 opposite the rack-bars 306 307, that the said rack-bars are advanced to engage with the self-adjusting blocks and give the final adjustment to the plunger, as above detailed.

From the description already given it will be plain that the extent of movement imparted to the rack-bars 306 307 and the consequent extent of the plunger's final adjustment will depend upon the extent of movement which is given to the pin-carriage to which the rack-bar 280, Figs. 56 and 69, is connected, and the throw of the pin-carriage will in turn depend upon which of its pins is thrown into the cam-cylinder by the action of the justifying-perforation. No further description therefore is needed at this point of the manner in which or the means by which the rack-bars 306 307 are operated; but the mechanism by which the advance of the justifying-slide 305, Figs. 50, 54, 55, 57, and 62, upon which the said rack-bars 306 307 are mounted, (see particularly Figs. 50 and 57,) is effected when a die for forming a space-type is centered remains to be described and will next receive attention.

The pin of the pin-carriage of the left side of the machine, which coöperates with a pin on the carriage at the right-hand side of the machine to center a space-die, is the outer or fifteenth pin, (numbered 113ª, Figs. 69 and 70.) This pin is formed with projections 322, which embrace the extremity of an arm 323, projecting downwardly from a rock-shaft 324, Figs. 56, 63, 66, and 69. Also secured to the rock-shaft 324 is another arm 325, Figs. 63, 66, and 67, to which is secured the upper end of a rod 326, Figs. 56 and 63, that carries at its lower end a rack-bar 327, which meshes with a pinion 328, (shown detached in Fig. 60,) having a squared opening in it, Figs. 60 and 63, and mounted upon the squared portion 329 of a shaft 330, Figs. 57, 58, 61, and 62.

The pinion 328 is prevented from longitudinal movement by bearings 331, Fig. 57; but the shaft 330 is free to slide back and forth longitudinally within the pinion. The hub 332 of the pinion (shown in Fig. 60) is provided with a right-angled projection 333, which normally is in engagement with a recess 334, formed in the justifying-slide 305, as shown in Fig. 57, and the shaft 330 is likewise formed on its extended rounded portion with a projection 335, Fig. 58, which normally plays back and forth in a longitudinal groove 336 in the justifying-slide, as shown in Fig. 57, but which, as hereinafter described, is adapted to be locked in engagement with a recess 387 in said justifying-slide. (Shown in said last-mentioned figure.)

The outer end of the shaft 330 is coupled, by a coupling 338, which permits of the independent turning of the shaft, to a threaded rod 339, Figs. 57 and 63, that passes through a lever 340 and is provided with nuts 341 on the outer side of said lever and with a spring 342 between a shoulder formed upon it and a washer interposed between said spring and the lever, as shown in Figs. 57 and 63. A pin and sleeve on the upper end of the lever 340 coöperate with a cam-groove 343 in a cam-wheel B⁵, Figs. 1, 4, and 63.

When the machine is in operation, the cam B⁵ is kept in constant rotation and, through the rod 339, imparts reciprocating back-and-forth motion to the shaft 330. Upon the projection of the space-pin 113ª the arm 323 rocks the shaft 324 and causes the arm 325 to raise the rack 327, Figs. 61 and 63, thereby turning the pinion 328, and with it the shaft 330. This turning of the pinion and shaft causes the projection 333 on the pinion to be unlocked from the recess 334 in the justifying-slide and to enter the longitudinal slot 336 in said slide, and simultaneously therewith causes the projection 335 of the shaft to pass from said longitudinal groove 336 into the recess 387 in the justifying-slide, the result being the unlocking of the pinion from the slide and the locking of the shaft to the slide, so that the slide will partake of the longitudinal movement of the shaft and in its advance carry the justifying rack-bars 306 307, supported upon it, into engagement with the self-adjusting blocks 311 312, as before described. After the justifying space-type has been formed, the justifying-slide is drawn back by the operation of the cam B⁵, Fig. 63, the space-pin is retracted, and the shaft 330 is unlocked from the justifying-slide and the pinion 328 locked thereto, as at first.

After a justified line of type has been formed it becomes necessary to return the justifying mechanism to normal position, in order that it may be ready to be set for the production of the type for the next line. The record-strip for the left side of the machine is therefore provided, after the die-centering perforations for each line, with a perforation which operates to set the first pin 113ᵇ of the carriage on the left-hand side of the machine. This special pin 113ᵇ is provided, as shown in Fig. 68, with projections 113ᶜ, between which projects the transversely elongated portion 113ᵈ of an arm 113ᵉ, secured to a hollow rock-shaft 113ᶠ, as shown in Figs. 66 and 68.

To the rock-shaft 113ᶠ is secured an arm 113ᵍ, that is united by a ball-and-socket connection to a rod 113ʰ, whose lower end is likewise connected by a ball-and-socket connection to the arm 295, carrying the spring-pawl 294, that holds the ratchet-wheel 285, Fig. 56, of the justifying mechanism in check. When the pin 113ᵇ, Fig. 68, is projected into its coöperating cam-cylinder, the shaft 113ᶠ is rocked, and, through the medium of the arm 113ᵍ, connecting-rod 113ʰ, and arm 295, Fig. 66, the pawl 294 is thrown out of engagement with the ratchet-wheel 285, whereupon the spring-drum 290 operates, through the gear 288 and pinion 286, to rotate the shaft 282 and bring all the parts of the justifying mechanism connected to said shaft 282 back to normal position, as will be readily understood. In this resetting operation a pin 288ª, Fig. 56, on the gear-wheel 288 strikes a stop-arm 288ᵇ and arrests the further rotation of said wheel.

To prevent any overwinding of the spring 291 in the spring-drum 290, a bell-trip 289ª and bell 289ᵇ are provided for giving a warning to the attendant that he may stop the machine in time to prevent any damage being done.

Inasmuch as the rack-bar 280, Figs. 56 and 69, is reciprocated each time the pin-carriage on the left side of the machine reciprocates, it is obvious that the shaft 282, Fig. 55, would be turned and a spring-drum 290 wound up each time the pin-carriage on the left side of the machine was moved unless provision were made for preventing such a result. I have found it most convenient in dealing with this problem to control the actuating-pawl 284, Figs. 55, 56 and 56ª, in such manner as to cause said pawl to be thrown out of action when both pin-carriages are coöperating to center a die and to be thrown into action and to remain in action only when the pin-carriage on the left side of the machine is independently moved in response to a justifying perforation in the left-hand record-strip. The means for so controlling the pawl are as follows:

Referring to Figs. 55, 56 and 56ª, and particularly to the last-named figure, it will be seen that the ratchet-wheel 285 is surrounded or inclosed by a plate 530, which is screwed or otherwise secured to the frame of the machine. Between the disk 283, Figs. 55 and 56ª, to which the pawl 284 is pivoted, and the inner edge of the plate 530 there is a space, or, in effect, a groove 531, and in the side of the plate 530 there is formed another groove 532, which is concentric with the groove 531. Pivoted to the plate 530 at 533 is a switch 534, which has a groove 535 struck from the same center as the outer groove 532, and projecting into the groove of the switch is a pin or offset 536 on a finger 537, mounted upon the pivot of the pawl 284 and having a rearward extension which abuts against a similar extension on the pawl, so that the raising of the finger 537 will cause the pawl to be raised also. A spring 538, interposed between the finger and the pawl, operates to permit the pawl to ride over the backs of the ratchet-teeth of the ratchet-wheel 285.

Connected to the switch is a rod 539, Fig. 56, which is jointed at its upper end to an arm 540 on the end of the shaft 372ʳ of the right-hand side of the machine. When, through the operation of the pin-carriages on both sides of the machine, the two shafts 372ˡ and 372ʳ, Figs. 55, 56, and 91, are simultaneously rocked, as will be hereinafter fully explained in connection with the pump-operating mechanism, the arm 540 is raised against the tension of spring 541, Fig. 56, and swings up the switch 534, thereby, through the action of the finger 537, raising the pawl 284 out of engagement with its ratchet-wheel 285 and bringing the stud 536 of the finger 537 into position to enter the outer groove 532 of the plate 530 when the disk 283, upon which the pawl is mounted, is oscillated back and forth by the action of the rack 280, Figs. 55 and 56, upon the pinion 281, fixed to said disk. On the other hand, when the pin-carriage on the left-hand side of the machine only is operated in response to a justifying perforation in the left-hand record-strip, the shaft 372ˡ, Fig. 91, will alone be rocked, the shaft 372ʳ remaining stationary, as also hereinafter described, and the arm 540, Figs. 91, 55, and 56, will not be raised, and the pawl 284 will remain in engagement with its ratchet and will operate upon the same to rotate the shaft 282, Fig. 55, and wind up the spring-drum of the justifying mechanism, the pin 536 on the pawl-finger 537 during such operation working in the inner groove 531.

*The Mechanism for Depressing the Centered Die or Matrix.*

After the die-case has been shifted to bring the die for the particular type to be formed at the centering-point above the mold in the mold-wheel, and after the plungers forming part of the mold have been finally adjusted, a plunger 156, Figs. 1, 2, 9, and 10, is depressed, so as to force the centered die 141 downward and cause its end or face bearing the character selected to form the top of the mold, as shown in Fig. 11. The said plunger 156 is guided at its lower end in a yoke 155 secured to a cross-piece 154 on the frame, Figs. 1, 2, and 10, and at its upper end in a sleeve 160, Figs. 9 and 10, the extremity of its upper end being passed through an opening in the ends of a vertically-vibrating arm 161 and provided with adjusting-nuts 167. Between the sleeve 160 and nuts 158 on the plunger is interposed a spring 159, and when the arm 161 descends its motion is communicated to the plunger through the sleeve 160, spring 159, and nut 158, thus causing the plunger to seat the die depressed by it under yielding pressure against the top of the mold, thereby insuring its proper seating. The vibrating arm 161 is mounted upon a rock-shaft 162, Figs. 1 and 10, to which is also rigidly attached an arm 164, having a pin and roller 165 upon its lower end that engages a cam-groove 166 in a cam-wheel B⁵, Figs. 1, 4, 10, and 29. After the plunger has depressed the centered die and the type has been formed in the mold the action of the cam-groove 162 causes the plunger to be lifted and the spring around the die to restore the latter to normal position in the die-case.

Device for Guiding and Holding the Depressed Centered Die.

In order that the centered die when depressed may be guided with the greatest accuracy to its proper position on the top of the mold and that it may be held in that position while the type is being formed, I employ a guide-plate 344, Figs. 15 and 16, which has an opening 345 in its forward edge, slightly tapered upward and outward and a width at the bottom corresponding as near as practicable to the width of the lower end of the dies. This plate 344 moves back and forth in guides 346, Fig. 15, and is actuated through a rod 347 from a vibratory lever 348, that is controlled by a cam-groove 349 in a cam-wheel B⁴, Figs. 1, 5, 15, 16, and 29. Before the centered die is depressed this guide-plate 344 advances over the mold, and when the die is forced down it passes through the opening 345 in the plate and is guided thereby to its proper position upon the mold. Should the die, through an imperfect adjustment of the centering devices, fail to be properly centered, or, in other words, be in a slight degree out of alinement with the mold, this defect will be corrected by the guide-plate, the inclined walls of the opening in the latter bringing the die to the proper center with unfailing accuracy. When the type has been formed, the guide-plate is retracted by the action of a spring 350, applied to the vibratory arm 348, Fig. 16, as will be readily understood, and then the die is raised into the die-case by its spring.

The Apparatus for Injecting Molten Metal into the Mold to Form the Cast Type.

Having now shown the construction of a complete mold, I will next describe the apparatus for injecting molten metal into the mold to form the cast type.

Referring to Figs. 82, 83, and 84, 351 represents the melting-pot or crucible in which the metal, preferably type-metal, is placed and by suitable appliances well known in this art maintained in a molten condition. Within this melting-pot is arranged a metal pump consisting, essentially, of a cylinder 352, a plunger 353, and an adjustable nozzle 354. The cylinder 352 is provided with ports 355 for the ingress of the molten metal and with a port 356 for the egress of the metal when forced out by the operation of the plunger 353. The nozzle is made in two sections—a movable or outer section 354 and an inner or stationary guiding-section 357, as shown in Fig. 84. Extending up through the nozzle is a rod 358, which operates to keep the nozzle-orifice clear. As shown in Fig. 83, the end of the nozzle stands normally beneath an aperture 198 in the plate 197, which constitutes the bottom of the mold, and when a type is to be cast the movable section of the nozzle is raised so that its end will enter the aperture 198 in said plate 197 and make close connection therewith, as shown in Fig. 11, after which the plunger 353 of the pump advances and forces metal from the pump-cylinder up through the nozzle and into the mold, completely filling the latter, which done the plunger of the pump moves back and the nozzle descends to first position. In the formation of a type in this way a small button of metal 361 is left in the aperture 198 of the mold-plate 197, as shown in Fig. 18.

After the type is cast the mold-wheel makes one-third of a revolution, as before explained, during which the type is sufficiently cooled to be ejected and handled. Its ejection from the mold is effected, as we have seen, by the outward movement of the inner plunger 173ᵃ, Figs. 18 and 21. During such outward movement of the plunger the bottom of the type is severed from the attached button 361 by the coöperation of the knife-like edges of the mold-plate at the opening 198, and by the time the plunger has fully ejected the type from the mold a button-discharger 195, Figs. 18 and 21, carried by the plunger, is brought over the opening 198 in the mold-plate, and a plunger 359, Figs. 21, 22, and 89, descends and causes said button-discharger to be depressed, a pin 196 on its lower end passing into the opening 198 and discharging the metal button 361 from the latter, as shown in Fig. 21. Before the mold-plunger moves back again the vertical plunger 359 rises and a spring 194 within the mold-plunger lifts the button-discharger back to its normal position within the mold-plunger, as shown in Fig. 18.

Motion is given the plunger 359 by means of arms 360 362 on rock-shaft 363, a connecting-rod 364, a vibratory lever 365, Figs. 29 and 85, to which said rod 364 is connected, and a pin 366 on the gear-wheel 225.

Since a type is to be cast each time a die of the die-case is centered by the movements of the pin-carriages on both sides of the machine, it is important that the pump nozzle and plunger should be operated each time both said carriages are moved, and it is equally important that when the pin-carriage on the left-hand side of the machine is alone moved for the purpose of actuating the justifying mechanism no movement of the pump nozzle and plunger should be made, for at such time the mold is not closed and not ready to receive the metal. I have therefore provided the following automatic mechanism for attaining these results: At each side of the machine (see Fig. 91) is arranged a rock-shaft 129, Fig. 91, which is constantly rocked back and forth while the machine is in motion by means of the forward arm of a lever 128, bearing a pin and roller 130 and a cam-groove 131 in the end of the cam-cylinder B′, with which said pin and roller engage, Fig. 49. Upon the inner end of each of these shafts 129, Figs. 91 and 92, is secured an arm 367, which is provided with an offset 368, in which a perforation 369 is made. The said offset 368 overlaps a corresponding perforated offset 370 on an arm 371, secured to a shaft 372, as shown in Fig. 92. Below the offset 370 of the arm 371 is formed another perforated offset 373, and a sliding pin 374 is arranged to work back and forth in said two offsets 370 373 and is provided with a spring 375 and collars 376 for holding said pin normally retracted and out of engagement with the offset and of the arm 367, as shown in Fig. 92.

Secured to the shaft $372^l$ on the left side of the machine is a beveled gear $377^l$, which engages with a corresponding gear $378^r$, fixed to the end of a hollow shaft $379^r$, surrounding a portion of the shaft $372^r$ on the right-hand side of the machine, Fig. 91. Rigidly secured to the opposite end of the hollow shaft $379^r$ is a depending arm 380, and to the shaft $372^r$, adjacent to the arm 380 on the hollow shaft, is secured a spring-arm 381, Figs. 93, 94, and 95. Hung loosely upon the shaft $372^r$ is a third arm 382, to the lower end of which is connected a rod 383, Figs. 89, 93, and 94, which operates the coupling devices for coupling the pump-plunger and the pump-nozzle with the means by which they are respectively operated.

The arm 380, Figs. 93, 94, and 95, is provided with a lateral projection $380^a$, which overlaps the loose arm 382 and bears against the same through a screw $383^a$, and the said loose arm 382 is in turn provided with a lateral projection $382^a$, which overlaps the spring-arm 381 and is secured thereto by a rivet or in any other suitable manner so as to move with it.

From this described arrangement of shafts and arms it will be evident that when the shafts $372^l$ and $372^r$ on the left and right hand sides of the machine, respectively, are simultaneously rocked in the direction indicated by the arrows, Fig. 93, the spring-arm 381 on the shaft $372^r$ and the rigid arm 380 on the hollow shaft 379 will move in unison, and the intermediate loose arm 382 will, through the spring-arm 381, be swung inward and will push the rod 383 and couple the pump-plunger and pump-nozzle to their respective operating mechanism. It will be equally apparent that if the shaft 372 on the left-hand side of the machine is alone rocked, the shaft $372^r$ on the right-hand side of the machine remaining stationary, that the arm 380, Figs. 89 and 95, will alone be moved and will have no effect whatever upon the loose arm 382, and if the shaft $372^r$ on the right-hand side of the machine alone is rocked, the shaft $372^l$ on the left-hand side of the machine remaining stationary, the loose arm 382 will be prevented from movement by the operation of the spring-arm 381, owing to the obstruction which the lateral projection $380^a$ of the rigid arm 380 presents, and said spring-arm will simply be bent or flexed. The pump-coupling devices are thus prevented from being thrown into operation except by the simultaneous rocking of the shafts 372 on both sides of the machine.

Having explained the effect of rocking the shafts $372^r$ $372^l$, I will now show how the rocking of said shafts is accomplished. Upon examining Fig. 38 it will be seen that each of the vertical bars 43, controlled by the perforations in the record-strip, is provided with a shoulder 106 near its lower end, which, when said bar is moved downward, is adapted to engage with and rock a rocking plate 107, extending across all the bars 43, cause a bifurcated arm $108^a$, secured to said plate, to strike against a shoulder 384, Figs. 38 and 92, upon the pin 374, Fig. 92, and raise said pin and by it couple the arms 367 and 371 together, thus causing the rocking motions of the shafts $129^r$ $129^l$, Fig. 91, (which, it will be remembered, are constant,) to be communicated to the shafts $372^r$ and $372^l$. Each time therefore any two bars 43 on the right and left sides of the machine, respectively, are simultaneously released by the operation of the two record-strips the coupling-pins 374 at each side of the machine will be thrown into engagement and the metal-pumping devices actuated, as hereinabove described. Upon the resetting of the bars 43 to normal position the lower ends of the coupling-pins 374 will drop into sockets 385, Fig. 38, and hold the shafts 372 rigid.

The mechanism for imparting motion to the pump-nozzle and pump-plunger and the coupling devices for coupling said mechanism to said parts require more detail description.

Referring to Figs. 82, 83, and 89, 386 represents the lever connected to and operating the pump-nozzle through links 388 and 387, the lever connected to and operating the pump-plunger through a link 389. 390 is a rod made hollow at its lower portion and provided at its upper end with a head 391, having a perforation through which and a corresponding perforation in the end of the nozzle-lever 386 a pin 392 of the coupling devices is adapted to slide, as shown in Fig. 89. The hollow portion of the rod 390, Fig. $88^a$, receives the upper end of a smaller rod 393, and between a key 394, secured in the inner rod 393 and a nut 395 on the outer shaft is interposed a spring 396, through which the motion of rod 393 is transferred to rod 390. The lower end of the rod 393 is connected to an arm 397, projecting from a sleeve 398, which sleeve is provided with another arm 399, having a pin and roller upon it which project into a cam-groove 400 of a cam 401, Figs. 3, 4, and 85 to 88.

Duplicates of the rods 390 393 and their spring connection are adapted to be connected at the top by a pin 402 of the coupling device to the lever 387 of the pump-plunger 389 and at the bottom to an arm 403 on a sleeve 404, which sleeve has another arm 405, provided with a pin and roller that engage with another cam-groove 406 in the cam-wheel 401, Figs. 3, 4, 85, and 86.

The coupling device of the pump, which has already several times been referred to, is shown particularly in Figs. $88^b$, 89, and 90 and is constructed as follows: Upon a shaft 407 are fixed three collars 408 409 410, and between these collars are mounted two loose sleeves 411 412. The sleeve and the shaft 407, as well, is provided with a slot 413, through which extends a coupling-bar 414, which is provided at its lower end with the coupling-pin 392, before referred to, and at its upper end with a cross-pin 415.

Normally the end of the coupling-pin 392 rests within the aperture in the end of the nozzle-lever 386, and the cross-pin 415, at its upper end rests upon a fixed slotted plate 416, as shown in Figs. 89 and 90. The sleeve 412 and the shaft within it is in like manner slotted, and through them passes another coupling-bar 417, having upon its lower end a coupling-pin 402, which normally rests within the aperture in the outer end of the lever 387, connected to the pump-plunger and having in its upper end a cross-pin 418, which normally rests upon a fixed slotted plate 419.

The cam-wheel 401, Figs. 85, 87, and 88, which operates the rod 390, to which the pump-nozzle lever is adapted to be coupled, and the rod 390ª, to which the pump-plunger lever is adapted to be coupled, are connected rigidly to the shaft 204, Fig. 29, upon which the large gear-wheel 225 is secured, and said gear-wheel 225 is driven constantly from the main drive-shaft 134 of the machine, Fig. 29, through the medium of gears 137 138, shaft 139, gears 232 231, shaft 230, Fig. 5, gear 229, pinion 228, shaft 227, and pinion 226, and it will thus be seen that the rods 390 390ª are kept constantly moving up and down while the machine is in operation. Whenever, therefore, through the simultaneous rocking of the two shafts 372ʳ 372ˡ on the right and left sides of the machine, the arm 382 is moved in the direction indicated by the arrow 420, Fig. 89, the pins 392 and 402 are advanced so as to couple the nozzle-lever and the pump-plunger lever, respectively, to the said rods 390 390ª, the nozzle will be raised to the mold, and the pump-plunger caused to make a stroke and inject the metal into the mold, and upon the return of the shafts 372ʳ 371ˡ to normal position, ready for the next operation, the said pins 392 402 will again uncouple the nozzle-lever and pump-plunger levers, and the coupling-bars to which said pins are connected will be again suspended by the pins 415 418 from the slotted plates 416 419, in position for the next stroke.

*Mechanism for Assembling the Type and Transferring them to the Galley.*

As before stated, each time a type is cast in one of the molds of the mold-wheel a completed type is ejected from another mold and passes into a trough or guide 447, Figs. 1 and 96 to 99. Coöperating with this type-guide are two arms 448 449, Figs. 96 and 99, the former of which is fixed to a hollow shaft 438, Fig. 100, and the latter of which is mounted so as to turn freely upon a fixed shaft 439, which passes up through the hollow shaft 438. The lower arm 448 is provided with a slide 450, Fig. 99, which has a finger 451 at its outer extremity that is adapted to fit the type-guide 447 and to normally stand at the entrance to said groove in the position shown in Fig. 96. The upper arm 449 is also provided with a slide 452, Figs. 96 and 99, which, in like manner, carries a finger 453, which projects also into the type-groove 447. An adjustable spring 454, connected at one end to a projection on the arm 448 and at the other end to a projection on the arm 449, operates to draw the two arms toward each other and to keep their respective fingers together in the type-groove.

The slide 450 of the lower arm 448 is provided with a pin or stud 455 on its under side, which normally rests between lugs 456 457 on the outer end of an arm 458, Fig. 99, that is mounted upon and secured to a vertical shaft 459, Figs. 1, 96, and 114. Also secured to this shaft is another arm 460, Figs. 2 and 114, to which is connected a rod 461, that is connected to a slide 462, which is in turn connected to a vibrating lever 463 by another connecting-rod 464. This lever 463 is vibrated at each stroke of the machine by means of a cam-groove 465, (shown in dotted lines in Fig. 114 and in section in Fig. 115 and in full lines in Figs. 1, 2, and 4,) and the result is that through the described intermediate mechanism the slide 450 is moved backward, so as to cause its finger 451 to uncover the entrance to the type-guide 447 and permit the finished type ejected from the mold-wheel to be forced into said type-guide, and then upon the withdrawal of the plunger which has thus brought in the type the said finger 451 is again advanced in front of the entrance to the said guide, this back-and-forth motion of the slide and its finger taking place upon the ejection of each type from the mold-wheel until the types for a line have been assembled in the guide. As the finger 451, carried by the arm 448, is retracted to admit a type into the type-guide, the finger 453, carried by the upper arm 449, is struck by the type and advanced the thickness thereof, and when the said first-named finger 451 is again brought back to first position behind the entered type the latter will be held between both fingers, and as each succeeding type is pushed into the guide all its predecessors are pushed along before it, thus causing the retreat of the pin 453 and the arm upon which it is mounted, the spring 454 operating to maintain the vertical position of the type. When all the type for a line have thus been assembled in the type-guide, the arm 448 is caused to swing around in the direction indicated by the arrow, Fig. 96, sweep the said line from the type-guide into one of the divisions of a galley 465 and assume the position shown in Fig. 99. The means for thus operating the arm 448 are as follows:

Referring to Fig. 102, the part 421 (seen in dotted lines) is a cam-wheel formed upon or fixed to the side of the gear-wheel 138, Figs. 1 and 5, and it is adapted to impart a vibratory motion to a lever 422, Fig. 102, which in turn imparts reciprocating motion to a bar 423, through the instrumentality of a lever 424 and connecting-bar 425, the said lever 424 and bar 425 being connected by an adjustable slot-and-pin connection 426, which permits of the regulation of the length of the throw of bar 423. The forward end of bar 423 normally works in a guide 427, and just back of this guide there is connected to the bar 423 a link 428, connected to a bell-crank lever 429, the upper arm of which stands in the path of a stud 430 on the hanger or depending arm 279 of the pin-carriage on the left side of the machine. This stud 430 does not strike the lever 429 except when the first pin 113$^b$ of the left-hand carriage is projected into its co-operating cam-cylinder in response to a perforation invariably made in the record-strip of the left side of the machine alone after the type-forming perforations have been made therein; but when said first pin is projected and the said lever 429 is struck it lifts the outer end of the bar 423, so that a recess or socket 431 in the top of said bar will engage with a pin 432 on an arm 433, secured to a shaft 434, upon which is also secured another arm 435, as shown in Figs. 100, 102, and 105. As the bar 423 is constantly being reciprocated back and forth, its engagement with the said arm 433, when lifted, as described, causes the shaft 434 to be rocked and the arm 435 thereon to raise the movable portion 436 of a clutch into engagement with a corresponding clutch portion 437 on the hollow shaft 438. Said movable portion 436 of the clutch is provided with fingers or prolongations 441, which enter corresponding recesses in an arm 440, Fig. 101, and the latter is kept in a constant state of vibration by means of a cam-groove 442, Figs. 1, 3, 96, and 115, through the instrumentality of the lever 443 and a connecting-rod 444, Fig. 3. The movable portion 436 partakes of the motion of the vibrating arm 444 and remains connected whether it is raised or lowered, as will be readily understood.

Bearing in mind the portion 436 of the clutch is in constant motion back and forth, it will be readily seen that when said clutch portion is raised by the operation of the first pin of the pin-carriage through the described intermediate connections it will become coupled to the hollow shaft 438, Fig. 100, and will turn said shaft and cause the arm 448, Figs. 96, 99, and 100, connected to said shaft, to move around and its finger 453 to sweep the line of type into the galley, as before explained. In thus swinging around, the pin 455 on the slide 450, carried by the arm 448, passes out from between the lugs 456 457 of the arm 458. At this point I would call attention to the fact that the lug 457 on the arm 458 is pivoted at the point 466 and is held up to its position by a spring 467, this provision being made to prevent any breakage of the parts should the finger 451, carried by the arm 448, strike the mold-plunger, by which the type is forced into the type-guide, before said plunger is fully withdrawn from the guide, the spring-pressed lug 457, under such circumstances, yielding to the pressure of the pin of the slide 450, that carries the said finger 451.

In the transfer of the assembled line of type from the type-guide to the galley the finger 453, carried by the arm 449, being in advance of such assembled line, is required to pass entirely across the galley, and in order that it may be guided in such passage and that it may be kept elevated and properly guided back after the galley has advanced to bring its next compartment in line with the guide without interfering with the galley I provide a guide-bar 468, Figs. 96 96$^a$, in line with the discharge end of the type-guide and above the galley. This guide-bar is provided at its outer end with a slot 469, through which passes a screw 470 for clamping it to a fixed part 471, Fig. 96, of the galley-supporting frame, while its other end is adapted to enter a locking recess or aperture 472 on the opposite side of the galley. As the arm 449 swings across the galley, its pin 453 rides upon this guide-bar 468 and in the return movement does the like.

The form of the finger 453 is shown in Fig. 96$^b$, 453$^a$ representing the cylindrical portion which permits of its turning in the slide, 453$^b$ the prolongation against which the type rest, and 453$^c$ the slot which prevents it from turning when riding upon the guide-bar 468.

For the purpose of holding the arm 448 in its normal position I provide an arm 473 upon the hollow shaft 438, and connect to said arm a spring 474, whose other end is attached to a rigid part of the frame.

*Galley and Galley-Feeding Mechanism.*

The construction of a galley and the mechanism for feeding it will now be described.

Extending across the front of the machine and secured to the frame thereof is a grooved rail 475. Parallel with this rail extends another rail 476, which is supported upon brackets 477. In each of these brackets there works a screw-shaft 478, that passes through a nut 479, secured to the rail 476. On the outer end of each of these screw-shafts 478 is a spiral gear 480, Figs. 3 and 96, which meshes with one of a series of corresponding pinions 481 on a common shaft 482, Figs. 1, 3, and 96. One end of the shaft 482 is squared, as shown at 483, Figs. 1 and 3, for the application of a crank or handle, and by turning the shaft by means of this crank or handle the rail 476 is caused to be adjusted nearer to or farther from the grooved rail 475 to correspond to the width of the galley employed. Both the grooved rails 475 and the rail 476 are provided with friction-rollers, as at 484, to facilitate the movement of the galley thereupon.

The galley itself is lettered 449, and is shown in top plan in Fig. 99, in bottom plan in Fig. 117, and in front and rear elevation in Figs. 118 and 119, respectively. A cross-section of it is shown in Fig. 119ª.

As seen in Fig. 99, the galley is divided up into compartments for the reception of lines of matter by transverse partitions 485, each compartment being adapted to receive one line only. The front side is closed, as shown at 486, while its rear side is open, so that the lines of type may be swept into the compartments by the operation of the arms 448 and 449. A plate 490, (see Figs. 1 and 119ª,) secured to the grooved rail 475 and extending from the type-slot along the rail toward the advancing end of the galley, is provided for holding the lines of type in the galley after they have been inserted. On the under side near the inner edge it is provided with a guiding tongue or rib 487, which fits within the groove of the grooved rail 475 and rests upon the friction-rollers therein, as shown in Figs. 117 and 119ª. It is also provided on its under side with two racks 488 489, which have oppositely-inclined teeth, as shown in Figs. 117 and 118.

After a line of type has been swept into a compartment of the galley the latter is required to be advanced in order to bring another compartment into position to receive the next succeeding line from the type-guide, and the mechanism for automatically effecting the advance of the galley I will now proceed to describe.

Beneath the galley are located the pawls 491, 492, Figs. 108 to 113, that respectively operate to engage with the rack 489 to advance the galley one tooth at a time and with the rack 488 to arrest and lock the galley after each advance has been made, as seen in Fig. 111. The pawl 491 is adapted to slide up and down in an arm 493, Figs. 111, 112, and 113, an offset or projection 494 formed upon it being acted upon by a spring 496 within a recess in said arm 493 to keep the pawl pressed upward in engagement with the rack 489. A screw 497 in the side of the pawl 491 projects through a slot 498 in an upward extension of the arm 493 and serves to limit the upward movement of the pawl and prevents its being thrown out by the spring when the galley is removed. The arm 493 is secured rigidly to a rock-shaft 499, as seen in Figs. 108, 111, 112, and 113, and when this rock-shaft is rocked in the direction indicated by the arrow, Fig. 108, the said pawl 497 is forced down against the tension of its spring by the riding of its upper end over the back of one of the teeth of the rack 489 until the front of the tooth is reached, when its spring throws it upward in engagement with the face of said tooth, and upon the rocking of the shaft in the opposite direction the galley will be advanced one tooth, so as to bring the next type-compartment opposite the type-guide, as will be readily understood.

Pivoted at 502 to a projection 500 of a stationary frame 501, Fig. 108, are two arms 503 504 of unequal length, the arm 504 being the longer. These two arms are secured together by a screw 506 or otherwise, so that they will move in unison. The longer arm 504 is provided with an inclined slot 507, Fig. 109, into which projects a pin 508 on the arm 493, while the shorter arm 503 is provided with a slot 509, into which projects a pin 510 on the lower end of the vertically-sliding pawl 492, guided by the stationary frame 501, as shown in Figs. 112 and 113. Now when the rock-shaft 499 is rocked in the direction indicated by the arrow in Fig. 108, as before described, so as to cause the pawl 491 to engage with the next tooth of its coöperating rack 489, the pin 508 on the said arm 493, acting in the inclined slot 507 of the longer arm 504, will swing down said arm 504 and its companion shorter arm 503 and cause the latter to draw down the vertically-sliding pawl 492 out of engagement with its coöperating rack 488, and said sliding pawl 492 will not be engaged again with the next tooth of its coöperating rack until the swinging pawl 491 has been moved back to first position and has carried the galley forward one tooth, as before described.

It will thus be seen that the pawl 491 is the one by which the galley is advanced one tooth at a time, and that the pawl 492 is the one which arrests and holds locked the galley after such advance and prevents any possible overthrowing of the galley when advanced.

The oscillations of the rock-shaft 499, Fig. 108, by which the galley-pawls are operated, and the consequent advance of the galley, are effected whenever the movable clutch member 436, Figs. 100, 102, and 104, is raised into engagement with the hollow shaft 438, Fig. 100, by the projection of the first pin 113ʰ of the pin-carriage, Fig. 102, as described in detailing the action of the mechanism for transferring the lines of type from the type-groove into the galley. As shown in Fig. 102, the shaft 434 upon which the arm 435 that operates the movable portion of said clutch is mounted has secured to it a gear-segment 511, as shown in Figs. 100 and 105, which is in mesh with a corresponding segment 512, secured to a short shaft 513, and upon the upper end of the short shaft 513 is secured an arm 514, that is connected by a rod 515 to a slide 516, Figs. 105, 106, and 107, which is guided in a block 517, secured to the grooved rail 475, that supports the galley, as shown in Figs. 1, 2, 3, and 96.

By reference to Figs. 106 and 107 it will be seen that the slide 516 is provided with a transverse groove 516ª, into which projects a square stud 518ª on the head 518 of a pin 518ᵇ. The shank of this pin 518ᵇ fits an opening in a slide 519, to which the rock-shaft 499 of the pawl-operating mechanism is connected by means of a pin 521, Fig. 107, rod 522 and arm 523, Fig. 108. When the slide 516, Figs. 106 and 107, is in normal position within the guide-block 517, the head 518 of the pin 518ᵇ rests in a correspondingly-shaped opening in the block 517, as shown by the dotted lines, Fig. 107; but when the said slide 516 is advanced the head 518 of said pin passes from said opening in the block 517 and enters a corresponding opening 519ᵃ in the slide 520, thus entirely disconnecting the said pin from the block 517. Guided within the block 517 parallel with the slide 520 is another slide 524. (Shown in section, Fig. 106, and in top view, Figs. 107 and 96, and in side elevation, Fig. 3.) This slide is continuously reciprocated back and forth by the action of a cam 525, lever 526, connecting-rod 527, and spring 528, as shown in Figs. 1, 3, 96, 115, and 116, and it is provided with an opening 524ᵃ, as shown in Figs. 106 and 107, that is adapted to receive the end of the shank of the pin 518ᵇ when the slide 516 is pushed forward. Now, bearing in mind that the slide 524 is kept constantly reciprocating back and forth, it will be readily understood that through the turning of the rock-shaft 434, Fig. 102, by the striking of the pin 279 of the pin-carriage against the lever 429 the slide 516, through the described intermediate connections, will be advanced, and the pin 518ᵇ, already connected to the slide 520, will be disengaged from the block 517 and will enter the opening 524ᵃ of the slide 524, and thus couple the two slides 520 and 524 together, thereby causing the slide 520 to partake of the motion of the slide 524 and, through the described intermediate connections, rock the shaft 499, Fig. 108, and operate the galley advancing and blocking pawls. When the rock-shaft 434, Fig. 102, resumes its normal position, the slide 516 will move back again to the position shown in Fig. 106 and the pin 518ᵇ will uncouple the slide 520 from the slide 524 and become itself again locked to the block 517 by the engagement of the head 518 with the opening in said block, as will be readily understood. The spring 529, Fig. 105, operates to hold the slide 516 normally in its above last-named position.

Having thus described my invention, what I claim as new is—

1. In a type-forming machine, the combination, substantially as described, of a die-case carrying a series of dies, two sliding frames moving in planes at right angles to each other for shifting the die-case, pin-carriages, having movable pins, connected to said sliding frames, and rotary cam-cylinders having cam-grooves for coöperating with the pins of the pin-carriages; substantially as described.

2. In a type-forming machine, the combination, substantially as described, of the die-case and its dies, the sliding frames acting upon the die-case, the pin-carriages and their pins, the cam-cylinders having the cam-grooves with which the pins of the pin-carriages coöperate, and the adjustable connections between the pin-carriages and the sliding frames; substantially as described.

3. In a type-forming machine, the combination, substantially as described, of the main cam-cylinders, the pin-carriages and their movable pins, and the actuating-pins working in the pins of the pin-carriage, operating, when raised, to lock retracted said last-named pins, and when depressed, to permit of the projection of said pins.

4. In a type-forming machine, the combination, substantially as described, of the pin-carriage and its pins, the actuating-pins working in the pins of the pin-carriage having the reduced bodies and enlarged heads, and the springs for keeping them normally elevated; as set forth.

5. In a type-forming machine, the combination, substantially as described, of the pin-carriage and its pins, the actuating-pins working in the pins of the pin-carriage, and the vibrating bar operating to strike any depressed actuating-pin and through it project the pin of the pin-carriage which carries said actuating-pin and, at the same time, prevent the depression of any other actuating-pin, as set forth.

6. In a type-forming machine, the combination with the pin-carriage and its pins, the actuating-pins working in the pins of the pin-carriage, and the vibratory bar operating through said actuating-pins to retract the pins of the pin-carriage from the cam-cylinder, as set forth.

7. In a type-forming machine, the combination of the pin-carriage and its pins, the actuating-pins working in the pins of the pin-carriage, and the two vibratory bars for respectively projecting and retracting the pins of the pin-carriage by acting upon their said actuating-pins; substantially as described.

8. In a type-forming machine, the combination with the pin-carriage and its pins, the actuating-pins working in the pins of the pin-carriage, the two vibratory bars for respectively projecting and retracting the pins of the pin-carriage by acting upon the said actuating-pins, and the rock-shaft to which said bars are connected and from which they receive motion.

9. In a type-forming machine, the combination with the pin-carriage and its movable pins, of the actuating-pins working in said movable pins and coöperating with slots in the pin-carriage, said actuating-pins having the reduced body portion and the shouldered head portion and provided with the spring as described, whereby, upon the depression of an actuating-pin and the projection of the pin of the pin-carriage, which supports it, the actuating-pin will engage with the pin-carriage and become locked down.

10. In a type-forming machine, the combination with the pins of the pin-carriage and their spring-pressed actuating-pins, of the vertical bars operating to depress said actuating-pins having the ribs or projections as described, and the horizontally-sliding slotted and notched plate for releasing said vertical depressing-bars; substantially as described.

11. In a type-forming machine, such as described, the combination with the vertical bars which operate to depress the actuating-pins, as described, of the ribs or projections on said bars, the horizontally-moving slotted and notched plate and the connected shouldered plate having shoulders corresponding in number and position to the notches in the slotted and notched plate, the pin-levers of the feeding mechanism, and the bars jointed to said pin-levers coöperating with the said notched plate, whereby, upon the depression of a pin-lever, the bar jointed to it will arrest the advancing shouldered plate by engaging with one of its shoulders and a corresponding notch in the slotted and notched plate will be brought into registration with the rib on one of the vertical sliding bars and permit the latter to descend; substantially as described.

12. In a type-forming machine, such as described, the combination of the grooved actuating cam-cylinder, the pin-carriage and its pins, the pins through which the pins of the pin-carriage are actuated, the vertical bars operating upon said actuating-pins, the slotted and notched plate with which said bars operate, the shouldered plate connected to the slotted and notched plate, the bars for engaging such shouldered plate, the pin-levers and their pins and the perforated feeding-cylinder, all constructed and operating as set forth.

13. In a type-forming machine, the combination with the vertically-movable bars, which operate upon the actuating-pins carried by the pins of the pin-carriage, of the slotted and notched plate with which said bars coöperate, and the vibratory cross-bar for raising the said vertical bars; as set forth.

14. In a type-forming machine, the combination with the pin-levers and the vertical bars jointed thereto, of the cross-bar for raising said bars and pin-levers, and the vibrating finger operating upon said cross-bar; substantially as described.

15. In a type-forming machine, the combination of the pin-levers and the vertical bars jointed thereto, the cross-bar for raising said bars and pin-levers, and the locking-arms, such as described, for locking the said cross-bar in elevated position so as to hold the pin-levers out of contact with the record-strip; substantially as described.

16. In a type-forming machine, the combination with the pin-levers, the vertical bars jointed thereto, and the cross-bars for raising said bars and pin-levers, on both sides of the machine, of the locking-arms, on each side of the machine, for engaging with the said cross-bar and holding the pin-levers elevated, and the common shaft and connections, substantially such as described, for throwing said locking-arms, on both sides of the machine, into or out of action simultaneously; as set forth.

17. In a type-forming machine, such as described, the combination of the shaft, of the perforated feed-cylinder, of the ratchet-wheel secured thereto, a second ratchet-wheel having reversed teeth mounted upon the said first-mentioned ratchet-wheel, means for adjusting the position of said ratchet-wheels relatively, an advancing-pawl for one ratchet-wheel, and a locking-pawl for the other one, and a lever for throwing the actuating-pawl and the locking-pawl into and out of action respectively, and vice versa.

18. In a type-forming machine, such as described, the combination with the shaft of the feeding-cylinder, of the ratchet-wheel fixed thereto, the second adjacent loosely-mounted ratchet-wheel, the nut carried by one of said wheels and the coöperating screw carried by the other for adjusting the relative positions of said wheels; substantially as described.

19. In a type-forming machine, such as described, the combination with the feed-cylinder and the shaft, the ratchet-wheel on said shaft, the vibrating lever carrying the pivoted actuating-pawl and the swinging locking-arms to which said vibrating pawl is connected; whereby, upon the raising of said locking-arms in position to hold elevated the pin-levers, the said actuating-pawl will be thrown out of operation and the further rotation of the feed-cylinder prevented; substantially as described.

20. In a type-forming machine, such as described, the following elements on each side of the machine, viz: the feed-cylinder and its shaft, the ratchet-wheel on said shaft, the vibrating lever carrying the pivoted actuating-pawl, the swinging locking-arms to which said vibrating pawl is connected, in combination with a shaft and connections, substantially such as described, for simultaneously operating the locking-arms on both sides of the machine so as to throw both actuating-pawls out of action and arrest the rotation of both feed-cylinders.

21. In a type-forming machine, such as described, the combination of the plunger for depressing the centered die, the yoke in which said plunger is supported, the sleeve and the spring surrounding the plunger, the adjusting-nuts and the arm for imparting motion to the plunger; substantially as described.

22. In a type-forming machine, the combination of a series of dies mounted so as to move together, mechanism for bringing any one of said dies to a centering-point, an adjustable type-mold of which the centered die forms a part, mechanism independent of the centered die for automatically adjusting the mold and mechanism for injecting molten metal into the adjusted mold; substantially as described.

23. In a type-forming machine, the combination of a die case or carrier containing a series of dies, mechanism for bringing any one of said dies to a centering-point, a rotary mold-wheel having a series of molds, of which the centered die is adapted to form a part, when either of said molds is brought to the centering-point, mechanism for injecting molten metal into the mold at the centering-point to form a type, and means for simultaneously ejecting a completed type from a previously-filled mold; substantially as described.

24. In a type-forming machine, the combination of a mold-carrier having a series of molds, a movable die or matrix independent of the mold-carrier for coöperating with, and forming a part of, the mold at the casting-point, and mechanism for injecting molten metal into each of the molds, in turn, when brought to the casting-point; substantially as described.

25. In a type-forming machine, the combination of a rotary mold-carrier having a series of molds, a movable die or matrix independent of the mold-carrier for coöperating with, and forming a part of, the mold at the casting-point, and mechanism for injecting molten metal into each of the molds, in turn, when brought to the casting-point; substantially as described.

26. In a type-forming machine, the combination of a mold-carrier having a series of molds, a die case or carrier containing a series of dies or matrices, devices for centering any one of said dies at the casting-point, to enable it to coöperate with and form part of the mold at that point, and mechanism for injecting molten metal into the molds at the casting-point; substantially as described.

27. In a type-forming machine, the combination with a rotary mold wheel or carrier having a series of molds, a die-case carrying a series of dies or matrices, devices for centering any one of said dies at the casting-point, to enable it to coöperate with and form part of the mold at that point, and mechanism for injecting molten metal into the mold at the casting-point; substantially as described.

28. In a type-forming machine, the combination with a movable mold-carrier having a series of molds, a die case or carrier containing a series of dies or matrices, devices for centering any one of said dies at the casting-point, to enable it to coöperate with and form part of the mold at that point, mechanism for injecting molten metal into the mold at the casting-point, and mechanism for discharging a completed type from one mold while a type is being cast in another mold; substantially as described.

29. In a type-forming machine, the combination with a movable mold-carrier bearing parts of a mold, a movable die constituting, when depressed, the top of the mold, an external plunger working in the mold and constituting one of its sides, and means, substantially as described, for injecting molten metal into the mold; substantially as described.

30. In a type-forming machine, the combination of a rotary mold-wheel bearing parts of several molds, a movable die at the casting-point constituting, when depressed, the top of the mold, at that point, an external plunger, at the casting-point, constituting one of the sides of the mold, at said point, and means, substantially such as described, for injecting molten metal into the mold, as set forth.

31. In a type-forming machine, the combination with a rotary mold-wheel carrying a series of partly-formed molds, a die-case carrying a series of dies or matrices, devices for centering any one of said dies at the casting-point, to enable it to coöperate with and form part of the mold at that point, an external plunger forming part of the mold at the casting-point, and means for injecting molten metal into the mold at the casting-point; substantially as described.

32. In a type-forming machine, the combination with a rotary mold-wheel carrying a series of partly-formed molds, a die-case carrying a series of dies or matrices, devices for centering any one of said dies at the casting-point, to enable it to coöperate with and form part of the mold at that point, an external plunger forming part of the mold at that point, means for injecting molten metal into the mold at the casting-point, and means for ejecting a type from a previously-filled mold while the type in a succeeding mold is being cast; substantially as described.

33. In a type-forming machine, the combination with a rotary mold-wheel, of the molds, each consisting of the two fixed side walls, the inner plunger constituting the third side wall, the outer or external plunger constituting the fourth side wall, and the vertically-movable die or matrix constituting the top of the mold; substantially as described.

34. In a type-forming machine, the combination with a rotary mold-wheel, of the molds, each having the two fixed side walls, the inner plunger constituting the third side wall, the outer or external plunger constituting the fourth side wall, the vertically-moving die or matrix constituting the top of the mold, and the means for injecting molten metal into the mold from the bottom; substantially as described.

35. In a type-forming machine, the combination with a rotary mold-wheel, of the series of molds, each having the two fixed side walls, the inner plunger constituting the third side wall, and the outer or external plunger constituting the fourth side wall, a movable die-case carrying a series of dies or matrices, devices for centering and depressing one of said dies to form the top of a mold, and means for injecting molten metal into the mold to form the type.

36. In a type-forming machine, the combination with a rotary mold-wheel, of the series of molds, each having the two fixed side walls, the inner plunger constituting the third side wall, the outer or external plunger constituting the fourth side wall, the vertical movable die or matrix constituting the top of the mold, the means for injecting molten metal into the mold, mechanism for withdrawing the outer plunger after the formation of the type, and mechanism for advancing the mold-wheel and arresting it with the next succeeding mold at the casting-point; substantially as described.

37. In a type-forming machine, the combination with a rotary mold-wheel, of the series of molds each having the two fixed side walls, the inner plunger constituting the third side wall, the outer or external plunger constituting the fourth side wall, the vertical movable die or matrix constituting the top of the mold, the means for injecting molten metal into the mold, mechanism for advancing the mold-wheel, and mechanism for actuating the inner plunger to eject the type; substantially as described.

38. In a type-forming machine, the combination with a rotary mold-wheel, of the series of molds each having the two fixed side walls, the inner plunger constituting the third side wall, the outer or external plunger constituting the fourth side wall, the vertical movable die or matrix constituting the top of the mold, means for injecting the molten metal into the mold, mechanism for withdrawing the outer plunger after the formation of the type, mechanism for advancing the mold-wheel, and mechanism for actuating the inner plunger to eject the type.

39. In a type-forming machine, the mold consisting, essentially, of the fixed side walls, the inner and outer movable plungers, the die or matrix and the bottom plate having the aperture through which the metal is injected and by the edge of which the button or surplus metal is severed from the type-body; substantially as described.

40. In a type-forming machine, the combination with the mold constructed substantially as described, of a button-discharger mounted in the inner movable plunger, and means for depressing said button-discharger to eject the button of surplus metal; substantially as described.

41. In a type-forming machine, the combination with the mold constructed substantially as described, of a button-discharger mounted in the inner movable plunger, means for depressing said button-discharger, and a spring for retracting said button-discharger.

42. In a type-forming machine, the combination with the mold constructed substantially as described, of a button-discharger mounted in the inner movable plunger, and having a pin on its end for entering the aperture in the bottom plate or gate of the mold; substantially as described.

43. In a type-forming machine, the combination with the inner plunger of the mold, of the two-part block adjustable with respect to each other, to which said plunger is connected, and the fixed cam-plate having the groove for receiving a tongue on said two-part block and operating to hold the said plunger stationary while the type is being formed.

44. In a type-forming machine, the combination with the inner plunger of the mold, and the block to which it is connected, of the radially-moving slide having the ribs for coöperating with a pin on the plunger-block, and the rotary cam-plate having a groove with which a roller on said slide engages, whereby the said inner mold-plunger is moved outward after the type is formed; substantially as described.

45. In a type-forming machine, the combination with the inner plunger of the mold, and the block to which it is connected, of a stationary cam-plate coöperating with a tongue on the block to hold the plunger stationary while the type is being formed, and also to return the plunger after it has been moved outward, and the radially-moving slide having the ribs for coöperating with the pin on the said plunger-block, and the rotary camplate having a groove with which a roller on said slide engages for moving outward the plunger to eject the type; substantially as described.

46. In a type-forming machine, the combination with the outer plunger of the mold, of the inner slide to which it is connected, the intermediate slide on which the inner slide rests the normal slide connected to the pin-carriage of the right-hand side of the machine having the straight guiding-groove and the inclined adjusting-groove and the blocks on the intermediate and inner slides respectively for coöperating with said grooves whereby the movement of the normal slide moves the inner slide and its connected plunger out or in; substantially as described.

47. In a type-forming machine, the combination with the inner and intermediate slides, of the normal slide having a guiding-groove and adjusting-groove, as described, the blocks on the intermediate and inner slides, respectively, for coöperating with said grooves, and the spring-pressed rod connected to the inner slide and operating to keep the block of said inner slide at all times in contact with the inclined wall of the adjusting-groove; substantially as described.

48. In a type-forming machine, the combination with the outer plunger of the mold, of the inner and intermediate slides, the normal slide connected to the pin-carriage on the right-hand side of the machine, and operating to adjust the inner slide and its connected plunger, and means, substantially as described, for advancing the said inner and intermediate slides together and thereby cause the plunger to coöperate with the other parts of the mold, on the mold-wheel, in the formation of normal type; substantially as described.

49. In a type-forming machine, the combination with the die-case and its dies, the die-centering devices controlled by the movements of the pin-carriage, the normal slide connected to one of the pin-carriages, the inner slide to which the outer plunger of the mold is connected, the intermediate slide upon which the inner slide is mounted, and means substantially as described, for advancing, simultaneously, the intermediate and inner slide so as to adjust the plunger nearer to or farther from its opposite coöperating wall in the mold, in accordance with the throw of the pin-carriage; substantially as described.

50. In a type-forming machine, the combination with the described inner, outer and intermediate slides, and with the plunger connected to the inner slide, of the rocking block mounted upon the outer slide, and engaging with the intermediate slide, the adjustable rack-bars for controlling the position of the said rocking block, and consequently the adjustment of the intermediate slide and the inner slide and connected plunger carried by it; substantially as described.

51. In a type-forming machine, the combination with the described inner, outer and intermediate slides, and with the plunger connected to the inner slide, of the rocking block mounted upon the outer slide and provided near its ends with the self-adjusting blocks, and near its middle with a perforated arm or projection into which the pin on the intermediate slide projects, and the adjustable rack-bars actuated through intermediate connections from the pin-carriage on the left side of the machine for controlling the position of said rocking block, and consequently the adjustment of the intermediate and the inner slide and connected plunger carried by it, whereby the justifying adjustment of the outer plunger is effected.

52. In a type-forming machine, the inner, outer and intermediate slides, the plunger connected to the inner slide, the rocking block mounted upon the outer slide and engaging with the inner slide, and the adjustable rack-bars for controlling the position of the rocking block, in combination with the normal slide operated by the pin-carriage to adjust the mold-plunger in accordance with the type designated, and means for advancing the inner, outer and intermediate slides, and the parts carried by them, substantially as described, whereby the normal slide first adjusts the plunger for the formation of a designated normal type, the inner, outer and intermediate slides are then advanced so as to move the plunger into the mold, and finally the justifying adjustment is given said plunger, as described.

53. In a type-forming machine, the combination with the rack-bars by which the position of the rocking block mounted on the outer slide is controlled, of the movable justifying-slide upon which said rack-bars are mounted, pinion coöperating with said rack-bars, the intermediate connections, such as described, by which said pinion is turned by the rotation of the shaft 282, and the ratchet-wheel, actuating-pawl, gear and rack-bar, by means of which said shaft 282 is turned more or less according to the throw of the pin-carriage on the left-hand or justifying side of the machine; substantially as described.

54. In a type-forming machine, the combination with the rack-bars by which the position of the rocking block mounted on the outer slide is controlled, of the movable justifying-slide upon which said rack-bars are mounted, the pinion coöperating with the said rack-bars, the intermediate connections, such as described, by which said pinion is turned by the rotation of the shaft 282, the ratchet-wheel, pawl, gear and rack-bar, by means of which said shaft 282 is turned more or less according to the throw of the pin-carriage on the left-hand or justifying side of the machine, and mechanism, substantially such as described, by means of which, upon the simultaneous operation of the pin-carriages on both sides of the machine, the said actuating-pawl will be thrown out of operation; substantially as described.

55. In a type-forming machine, the combination with the justifying mechanism, of means, substantially such as described, for automatically throwing the actuating-pawl of said justifying mechanism out of action, when pins of the pin-carriages on the right and left hand sides of the machine are caused to be projected, and automatically throwing said pawl into action when a pin of the carriage of the left or justifying side only of the machine is projected; substantially as described.

56. In a type-forming machine, the combination with the actuating-pawl of the justifying mechanism, of the switch for raising said pawl out of engagement with its ratchet-wheel, the grooved plate with which the finger of said pawl coöperates, the shaft rocked by the coöperation of the pin-carriages on both sides of the machine, and the arm on said rock-shaft connected to the before-mentioned switch; substantially as described and for the purpose specified.

57. In a type-forming machine, the combination with the short shafts 129$^r$, 129$^l$, on the right and left hand sides of the machines, respectively, rocked at each stroke of the machine, of the shafts 372$^r$, 372$^l$, the locking-bolts for coupling shaft 129$^r$ to shaft 372$^r$, and shaft 129$^l$ to shaft 372$^l$, upon the projection of the pins from the pin-carriages on both sides of the machine, the hollow shaft 379 geared to the shaft 372$^l$, the arm 380 on said hollow shaft, the spring-arm 381 on the shaft 372$^r$ and the loosely-hung arm 382 connected to said spring-arm, whereby the engagement of the said locking-bolts on both sides of the machine will cause the rocking of the hollow shaft 379, while the engagement of only one of said bolts will not affect the rocking of said shaft; substantially as described.

58. In a type-forming machine, the combination with the shaft 372$^r$, the hollow shaft 379, the spring-arm 381 secured to said shaft 372$^r$ the loose intermediate arm 382 connected to said spring-arm and the rigid arm 380 secured to the hollow shaft and provided with an offset which overlaps the loose intermediate arm; substantially as described, and for the purpose specified.

59. In a type-forming machine, the combination with the shaft 282 of the justifying mechanism and the pin-carriage, rack-bar, pawl and ratchet-wheel, by which it is turned to, through the described intermediate mechanism, adjust the sliding rack-bars 306, 307, of the gear on the side of said ratchet-wheel, the spring-drum wound up thereby, and the locking-pawl applied to the ratchet-wheel and released, through the described connections, by the projection of the designated pin of the pin-carriage on the left side of the machine, whereby upon the projection of the said pin of the pin-carriage the justifying mechanism is brought back to normal position by the action of the spring-drum.

60. In a type-forming machine, the combination with the justifying-slide, of the reciprocating shaft, means and coupling devices and connections, substantially such as described, whereby upon the projection of a justifying-pin from the pin-carriage on the left-hand side of the machine the said reciprocating shaft and justifying-slide will be coupled, and the said slide carrying the justifying rack-bars will be advanced and brought into engagement with their coöperating parts; substantially as described.

61. In a type-forming machine, the combination with the justifying-slide, having the longitudinal groove and the recess as described, the reciprocating shaft having the squared portion 329 and the projection 335, the gear mounted upon the squared portion of said shaft and provided with the projection 333 and the rack-bar 327 operated through the intermediate connections by the justifying-pin of the pin-carriage on the left side of the machine, substantially as described.

62. In a type-forming machine, the combination with the justifying-slide, the reciprocating shaft and pinion coöperating therewith, the rack for rotating said pinion and shaft to couple and uncouple the shaft to the slide, and the means for advancing the coupled shaft through a yielding spring connection; substantially as described.

63. In a type-forming machine, the combination with the pin 113$^b$ of the carriage on the left side of the machine, of the arm having the elongated outer portion 113$^d$, the shaft 113$^b$ to which said arm is connected, the arm 113$^g$, also secured to said shaft, connecting-bar 113$^h$ and the arm 295 carrying the releasing-pawl of the justifying mechanism.

64. In a type-forming machine, the combination with the space-pin, of the carriage on the left side of the machine, of the arm having the elongated outer portion mounted upon the shaft 324 and coöperating with said pin; the shaft 324, the arm 325 thereupon and the rod 326, rack-bar 327, the pinion 328, shaft 329, and the justifying-slide; substantially as described.

65. In a type-forming machine, the combination with the wheel 215 on the mold-wheel shaft provided with the slots 217, of the wheel 220, by which said wheel 215 is driven, having the adjustable slides 2.2, bearing-sleeves 219 for entering the slots of the said wheel 215, whereby the mold-wheel is moved through a third of a revolution each time, and the accuracy of its movement regulated by the adjustment of the two blocks 222; substantially as described.

66. In a type-forming machine, the combination with the mold-wheel, having the recesses in its edge, of the coöperating locking-bolt and the adjustable support or slide in which said bolt is mounted; substantially as described.

67. In a type-forming machine, the combination with the mold-wheel and the centered die of the die-case, of a guide-plate for directing the die properly to its seat on the top of the mold; substantially as described.

68. In a type-forming machine, the combination with the mold-wheel and the centered die of the die-case, of a guide-plate having a beveled slot for directing the die to its seat on the mold.

69. In a type-forming machine, the combination with the mold-wheel, of the centered die of the die-case, of the guide-plate for directing the die to its seat on the mold, and mechanism for automatically advancing said guide-plate as the die descends; substantially as described.

70. In a type-forming machine, the combination of the rock-shaft 129 provided with the arm 367, of the shaft 372 and its arm 371, the spring-pressed bolt 374 and the socket 108$^n$ with which said bolt normally engages to hold the shaft 372 rigid; substantially as described.

71. In a type-forming machine, the combination of the shaft 129 having arm 367, shaft 372 having arm 371, the spring-pressed locking-bolt 374, the rocking bar 108 and its arm for coöperating with the locking-bolt with the bars 43 released by the operation of the record-strip; substantially as described.

72. In a type-forming machine, the combination with the bars 43 on each side of the machine, depressed, as described, by the operation of the record-strips, the rocking plates 107 having the arms 109, the spring-pressed bolts 374, the rock-shafts 129$^r$, 129$^l$, provided with the arms 367, the shafts 372$^r$, 372$^l$, having the arms 371, the hollow shaft 379 geared to the shaft 372$^l$ and the arms 380, 381, 382.

73. In a type-forming machine, the combination of the shafts 372$^r$, 372$^l$, the hollow shaft 379 geared to the shaft 372$^l$, the rigid arm secured to the said hollow shaft, the spring-arm secured to the shaft 372 and the intermediate arm connected to the said spring-arm, whereby the independent rocking of either shaft 372$^r$ or 372$^l$ will not affect the position of the intermediate arm while the rocking of said shafts simultaneously will cause said intermediate arm to be moved; substantially as described.

74. In a type-forming machine, the shafts 372$^r$, 372$^l$, the hollow shaft 379 geared to the shaft 372$^l$, the rigid arm secured to said hollow shaft, the spring-arm secured to the shaft 372 and the intermediate arm connected to said spring-arm, in combination with the rock-shafts 129$^r$, 129$^l$, rocked at each stroke of the machine, and coupling devices for connecting said rock-shafts to the shafts 372$^r$, 372$^l$, when pins are projected from the pin-carriages on both sides of the machine simultaneously; substantially as described.

75. In a type-forming machine, the combination with the shafts 372$^r$, 372$^l$, the hollow shaft 379 geared to the shaft 372$^l$, the rigid arm secured to the said hollow shaft, the spring-arm secured to the shaft 372, the intermediate arm connected to said spring-arm and the coupling devices connected to said intermediate arm for throwing into operation the metal-pump; substantially as described.

76. In a type-forming machine, the shafts 372$^r$, 372$^l$, the hollow shaft 379 geared to the shaft 372$^l$, the rigid arm secured to said hollow shaft, the spring-arm secured to the shaft 372, and the intermediate arm connected to said spring-arm, in combination with the rock-shafts 129$^r$, 129$^l$, rocked at each stroke of the machine, and coupling devices for connecting said rock-shafts to the shafts 372$^r$, 372$^l$, when pins are projected from the pin-carriages on both sides of the machine simultaneously, and the coupling devices connected to said intermediate arm for throwing into operation the metal-pump.

77. In a type-forming machine, the combination with the pump cylinder and plunger, of an extensible pump-nozzle; substantially as described.

78. In a type-forming machine, the combination with the pump cylinder and plunger, of an extensible nozzle and a rod by which the orifice of said nozzle is automatically cleaned; substantially as described.

79. In a type-forming machine, the combination with the pump cylinder and plunger, of an extensible nozzle and a stationary rod by which the nozzle, when retracted, is automatically cleaned; substantially as described.

80. In a type-forming machine, the combination with the mold, of a metal-pump having an extensible nozzle and means for connecting the nozzle to the mold and for disengaging it therefrom; substantially as described.

81. In a type-forming machine, the combination with a mold, of a pump cylinder and plunger, an extensible pump-nozzle and devices, substantially such as described, for connecting the nozzle to the mold, then operating the plunger to eject the metal, and then disconnecting the nozzle from the mold; substantially as described.

82. In a type-forming machine, the combination with a mold, of a pump cylinder and plunger, an extensible pump-nozzle and automatic devices, substantially such as described, for connecting the nozzle to the mold, then operating the plunger to eject the metal, and then disconnecting the nozzle from the mold; substantially as described.

83. In a type-forming machine, the combination with a mold in which a type is formed, of a metal-pump having an adjustable nozzle which fits within, and partially fills, the gate or channel leading to the interior of the mold; substantially as described and for the purpose specified.

84. In a type-forming machine, the combination with a mold, of a metal-pump having an adjustable nozzle which fits within and partially fills the gate or channel, of a metal-pump having an adjustable nozzle which fits within and partially fills the gate or channel leading to the interior of the mold, and a plunger within the mold which, when the nozzle of the pump retreats, advances and severs the type from the button or sprue-piece left in the gate or channel of the mold, and an ejector carried by said plunger for removing the button or sprue-piece from the gate; substantially as described.

85. In a type-forming machine, the combination with the crucible or melting-pot, of the pump-cylinder having the inlet and discharge ports, the extensible two-part nozzle with means for extending it and the plunger and means for operating it; substantially as described.

86. In a type-forming machine, the combination with the crucible or melting-pot, of the pump-cylinder having the inlet and discharge ports, the extensible two-part nozzle, with means for extending it, the stationary cleaner-rod for preventing the fouling of the nozzle, and the plunger and means for operating it; substantially as described.

87. In a type-forming machine, the combination with the levers connected to the pump nozzle and plunger, respectively, of the reciprocating rods from which the motions of said levers are derived, and the coupling devices for simultaneously connecting said levers to said reciprocating rods; substantially as described.

88. In a type-forming machine, the combination with the pump-plunger, lever and pump-nozzle lever, and the respective reciprocating rods from which they derive motion, of the movable coupling-bars, having pins at their lower ends for connecting the said rods and levers together and cross-pins at their upper ends, the stationary slotted plates leading to the interior of the mold and a plunger within the mold which, when the nozzle of the pump retreats, advances and severs the type from the button or sprue-piece left in the gate or channel of the mold; substantially as described.

89. In a type-forming machine, the combination with a mold, of a metal pump having an adjustable nozzle which fits within or partially fills the gate or channel leading to the interior of the mold, and a plunger within the mold which, when the nozzle of the pump retreats, advances and severs the types from the button or sprue-piece left in the gate or channel of the mold, and an ejector for removing the button or sprue-piece from the gate; substantially as described.

90. In a type-forming machine, the combination with an adjustable mold, a metal-injecting pump connected therewith, a cam and intermediate yielding connections for operating the pump-plunger, whereby the stroke of the plunger is automatically regulated to correspond to the size of the opening in the mold; substantially as described.

91. In a type-forming machine, the combination with the pump-plunger and the lever connected to it, of the rod 390, connected to said lever, the rod 393, springs 396 through which the motion of rod 393 is communicated to rod 390, and the lever 403 and the cam 406 for operating it; substantially as described.

92. In a type-forming machine, the combination with the guide into which the completed types are discharged, a retreating support for said type and an advancing-finger for transferring a completed line of type from the guide to the galley; substantially as described.

93. In a type-forming machine, the combination with the guide in which the completed type are assembled, of means such as described, for opening the entrance to said guide for the admission of a type and closing said entrance after the type has been admitted; substantially as described.

94. In a type-forming machine, the combination of the guide in which the completed type are assembled, a finger at the entrance of said guide, and mechanism for operating said finger to admit the type into the guide as they are discharged from the mold; substantially as described.

95. In a type-forming machine, the combination of the guide in which the completed type are assembled, a finger at the entrance of said guide, and mechanism for operating said guide to admit the type into the guide as they are discharged from the mold, and mechanism for sweeping said finger through the guide to carry the line of type into the galley; as set forth.

96. In a type-forming machine, the combination of the guide in which the completed type are assembled, a finger at the entrance of said guide, mechanism for operating said finger to admit the type into the guide as they are discharged from the mold and a second yielding finger between which and the finger at the mouth of the type-guide, the type are held; substantially as described.

97. In a type-forming machine, the combination of the guide in which the completed type are assembled, a finger at the entrance of said guide, mechanism for operating said finger to admit the type into the guide as they are discharged from the mold, and a second spring-pressed yielding finger between which and the finger at the mouth of the type-guide, the type are held; substantially as described.

98. In a type-forming machine, the combination of the guide in which the completed type are assembled, a finger at the entrance of said guide, mechanism for operating said finger to admit the type into the guide as they are discharged from the mold, and a second yielding finger between which and the finger at the mouth of the type-guide, the type are held, and mechanism for sweeping the first-mentioned finger through the type-guide to carry the line of type into the galley.

99. In a type-forming machine, the combination of the guide, in which the completed type are assembled, a galley into which the assembled line of type is transferred, a finger, in the type-guide, adapted to be advanced by the line of type when the latter is swept into the galley, and a guide for guiding the finger across the galley.

100. In a type-forming machine, the combination of the guide in which the completed type are assembled, a galley into which the assembled line of type is transferred, a slotted finger in the type-guide adapted to be advanced by the line of type when the latter is swept into the galley, and a guide-bar, such as described, for guiding the slotted finger across the galley; substantially as described.

101. In a type-forming machine, the combination with the type-guide, of the finger that normally stands at the entrance to said guide, the slide which carries said finger, the arm upon which said slide is mounted and the mechanism for reciprocating said slide when the lever is in normal position.

102. In a type-forming machine, the combination with the type-guide, of the finger that normally stands at the entrance to said guide, the slide that carries said finger, the arm upon which said slide is mounted and the vibratory arm for reciprocating said slide when in normal position.

103. In a type-forming machine, the combination with the mold, of the type-guide, the finger that normally stands at the entrance to said guide, the slide which carries said finger, the arm upon which said slide is mounted and the vibratory arm for reciprocating the slide backward and forward, said lever operating to advance said slide through a yielding connection; whereby breakage of the finger is prevented should it strike the ejecting-plunger of the mold before the latter has retreated.

104. In a type-forming machine, the combination with the mold, of the type-guide, the finger that normally stands at the entrance to said guide, the slide which carries said finger, the arm upon which said slide is mounted, and the vibratory arm 458 having the lugs, 456, 457, and operating upon a pin or projection on the slide to reciprocate the latter, the lug 457 being hinged and spring-pressed, for the purpose specified.

105. In a type-forming machine, the combination with the type-guide, of the slide 450 having a finger 451, the arm 448 upon which the slide is mounted, and mechanism substantially as described, for vibrating said arm by the motion of the pin-carriage on the left side of the machine; substantially as described.

106. In a type-forming machine, the combination with the type-guide, of the arm 448 and the fingered slide carried by it, the arm 449 and its fingered slide, and the spring operating to draw said arms together; substantially as described.

107. In a type-forming machine, the combination with the mold-wheel, mechanism for advancing and stopping it, the type-guide opposite the discharging-mold, into which the type discharged, one after the other, from the molds, are assembled, a galley, and mechanism, substantially as described, for sweeping the completed line of type into the galley; substantially as described.

108. In a type-forming machine, the combination with a die or matrix, the rotary mold-wheel and its molds, of each of which in turn the die or matrix forms a part, the metal-pump having an adjustable nozzle for connection to and disconnection from the several molds in turn, a type-guide from which the type from the several molds are discharged and assembled, a galley and mechanism, substantially as described for transferring the line of type from the type-guide to the galley; substantially as described.

109. In a type-forming machine, the combination with the series of dies or matrices, mechanism substantially such as described, for centering any one of said dies at the casting-point, a rotary mold-wheel and its molds, means for bringing the centered die into coöperation with a mold, a pump for injecting molten metal into the mold at the casting-point, and a guide or receptacle for receiving the type from the mold at the discharging-point; substantially as described.

110. In a type-forming machine, the combination with a series of dies or matrices, mechanism, substantially such as described, for centering any one of said dies at the casting-point, a rotary mold-wheel and its molds, means for bringing the centered die into coöperation with the mold, a pump for injecting molten metal into the mold at the casting-point, means for advancing and locking the mold-wheel and a guide or receptacle for receiving the type from the receptacle at the discharging-point.

111. In a type-forming machine, the combination with a series of dies or matrices, mechanism substantially such as described, for centering any one of said dies at the casting-point, a rotary mold-wheel and its molds, means for bringing the centered die into coöperation with the mold, a pump for injecting molten metal into the mold at the casting-point, a guide into which the types discharged one after the other from the molds, are assembled into lines, a galley, mechanism for sweeping the assembled line of type from the type-guide into the galley, and mechanism for advancing the galley after it has received a line of type; substantially as described.

112. In a type-forming machine, the combination with a series of dies or matrices, mechanism substantially such as described, for centering any one of said dies at the casting-point, a rotary mold-wheel and its molds, mechanism for advancing and locking the mold-wheel, means for bringing the centered die into coöperation with the mold, a metal-injecting pump having an adjustable nozzle, and means for connecting said nozzle to, and disconnecting it from, the mold at the casting-point, a guide for receiving the types discharged from the molds one after another at the discharging-point, a galley, and mechanism for shifting the assembled line of type from the guides into the galley; substantially as described.

113. In a type-forming machine, the combination with the reciprocating bar 423, means for raising said bar by the motion of the pin-carriage on the left side of the machine, the clutch members 436, 437, thrown into engagement as described, by the raising of the said bar 423, the hollow shaft 438, upon which the clutch member 437 is arranged, the laterally-swinging type holding and transferring arms 458, 459, operated by the turning of said hollow shaft, and the type-guide; substantially as described.

114. In a type-forming machine, the combination with the reciprocating bar 423, the connection 428, bell-crank lever 429 and the pin-carriage by which said bar is raised, the pin on arm 433 for engaging the recess in bar 423 to couple said arm and bar together, the rock-shaft 434, arm 435, clutch members 436, 437, hollow shaft 438, type holding and transferring arms 458, 459, and type-guide; substantially as described.

115. In a type-forming machine, the combination with the galley, the two racks thereon having oppositely-inclined teeth, the vibrating arm 493 carrying the spring-pressed pawl, the vertically-sliding pawl connected to and operated from the swinging pawl through the pin 508, swinging bar 504 having inclined slot 507, connected swinging bar 503 having slot 509 and pin 510; substantially as described.

116. In a type-forming machine, the combination with the reciprocating slide 524, and the normally stationary slide 520 connected to the galley advancing and locking mechanism, of the slide 516 operated, as described, from the pin-carriage on the left side of the machine, and the pins 518, 518$^b$, for connecting said slides 520, and 524 together, as set forth.

117. In a type-forming machine, the combination with the block or support 517, the slide 516 having the transverse groove 516$^a$, the pin 518$^a$, 518$^b$, having the head 518 and projection 518$^a$, with the slide 520 having the aperture 519 and the recess 519$^a$ for the head 518 of the pin; substantially as described;

whereby when the slide 516 is retracted the pin and slide 520 will be held stationary by the engagement of the head of the pin with the block 517, and when said slide 516 is projected said pin will be disengaged from the block and free to travel back and forth with the slide 520; substantially as described.

118. In a type-forming machine, the combination of the reciprocating slide 524, the slide 520 and the galley-advancing mechanism connected to it, the slide 516 and the pin 518, 518$^b$, connecting-rod 515, spring 529, arm 514 geared to rock-shaft 434, reciprocating bar 423, and means for engaging it with the rock-shaft 434 to turn the latter; substantially as described.

119. In a type-forming machine, the combination with the grooved guiding-rail, the coöperating adjustable rail upon which the galley rests and by which it is guided, the adjustable galley-supporting rail, in combination with the screw-shafts working in nuts upon said rail, the common shaft with which said screw-shafts are geared and means for turning said shaft to effect the adjustment of said rail.

120. In a type-forming machine, the combination of a record strip or controller, a series of dies, mechanism actuated from the controller for bringing any one of the dies to a centering-point, an adjustable mold of which the centered die forms a part, mechanism also actuated from the controller for adjusting the mold, and mechanism for injecting molten metal into the adjusted mold; substantially as described.

121. In a type-forming machine, the combination of a record strip or controller, a series of dies, mechanism for bringing any one of the dies to a centering-point, an adjustable mold of which the centered die forms a part, mechanism actuated from the controller for adjusting the mold to form normal type, mechanism also actuated from the controller for adjusting the mold to form justifying-type, and means for injecting molten metal into the adjusted mold; substantially as described.

122. In a type-forming machine, the combination of a record strip or controller, a series of dies, mechanism actuated by the controller for bringing any one of the dies to a centering-point, a mold of which the centered die forms a part, a movable plunger in said mold, mechanism actuated from the controller for regulating the adjustment of said plunger and mechanism for injecting molten metal into the mold after adjustment; substantially as described.

123. In a type-forming machine, the combination of a record strip or controller, a series of dies, mechanism actuated by the controller for bringing any one of the dies to a centering-point, a mold of which the centered die forms a part a movable plunger in said mold, mechanism actuated from the controller for regulating the adjustment of said plunger to form normal type, mechanism also actuated by the controller for adjusting the plunger to form justifying type, and means for injecting molten metal into the adjusted mold; substantially as described.

TOLBERT LANSTON.

Witnesses:
ALEX. J. STEWART,
MELVILLE CHURCH.